United States Patent [19]
Donatelle et al.

[11] Patent Number: 5,925,940
[45] Date of Patent: Jul. 20, 1999

[54] VEHICLE ANTITHEFT SYSTEM CONTROLLING PARKING BRAKE

[75] Inventors: Gary L. Donatelle; Leonard B. Prusakowski, both of East Finley Township, Washington County; Fred H. Bednar, Shaler Township, Allegheny County, all of Pa.

[73] Assignee: P.V. Security, Inc., Claysville, Pa.

[21] Appl. No.: 08/829,844

[22] Filed: Apr. 1, 1997

Related U.S. Application Data

[60] Provisional application No. 60/014,698, Apr. 1, 1996.

[51] Int. Cl.⁶ .................................................. B60R 25/00
[52] U.S. Cl. ........................... 307/10.2; 70/256; 180/287
[58] Field of Search .................................. 307/10.1–10.6; 303/20; 180/287; 123/179.2–179.4; 340/425.5, 426, 825.3–825.32, 825.69, 825.72; 70/256, 288

[56] References Cited

U.S. PATENT DOCUMENTS

| | | | |
|---|---|---|---|
| 4,691,801 | 9/1987 | Mann et al. | 180/287 |
| 5,086,868 | 2/1992 | Fontaine et al. | 180/287 |
| 5,113,427 | 5/1992 | Ryoichi et al. | 307/10.1 |
| 5,274,370 | 12/1993 | Morgan et al. | 340/825.31 |
| 5,570,756 | 11/1996 | Hatcher et al. | 180/287 |

*Primary Examiner*—Richard T. Elms
*Attorney, Agent, or Firm*—Daniel A. Sullivan, Jr.

[57] ABSTRACT

A vehicle antitheft system utilizing the parking brake of a vehicle. If the primary parking brake release mechanism is operated for releasing the brake, the parking brake does not release, because it continues to be held by a secondary system, which is under security control. The system includes a remote control unit for setting the parking brake from locations away from the vehicle.

26 Claims, 52 Drawing Sheets

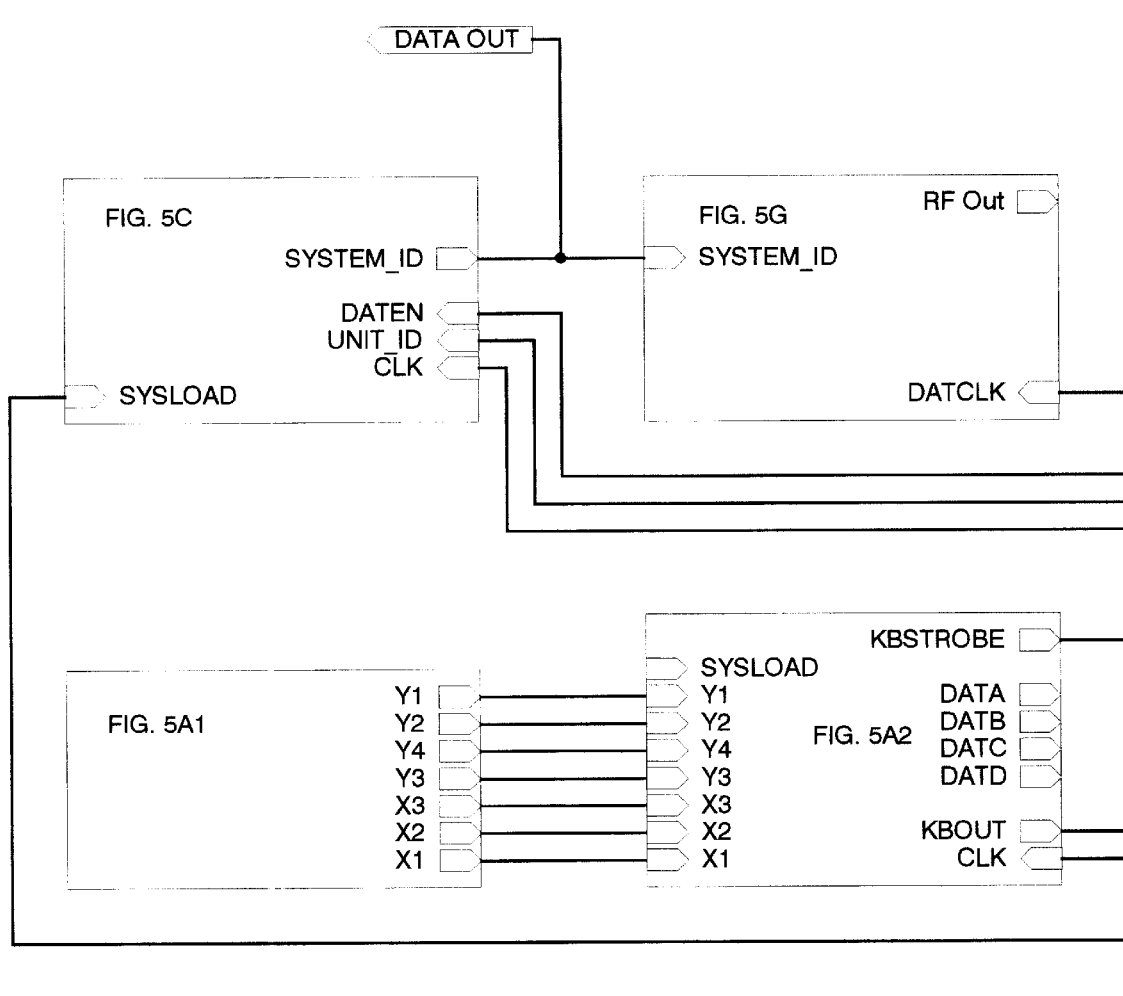
FIG. 5.1

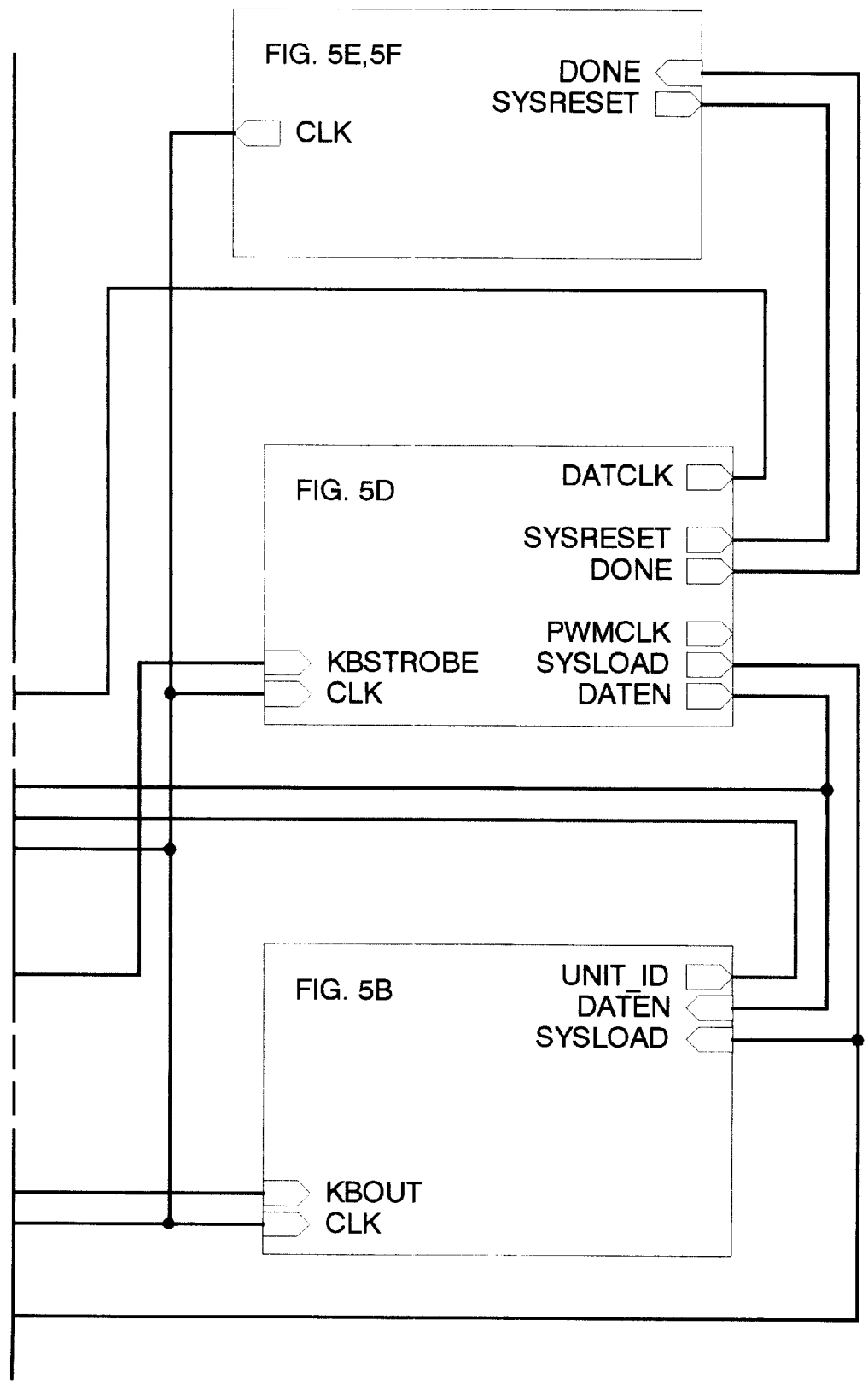
FIG. 5.2

FIG. 5A1

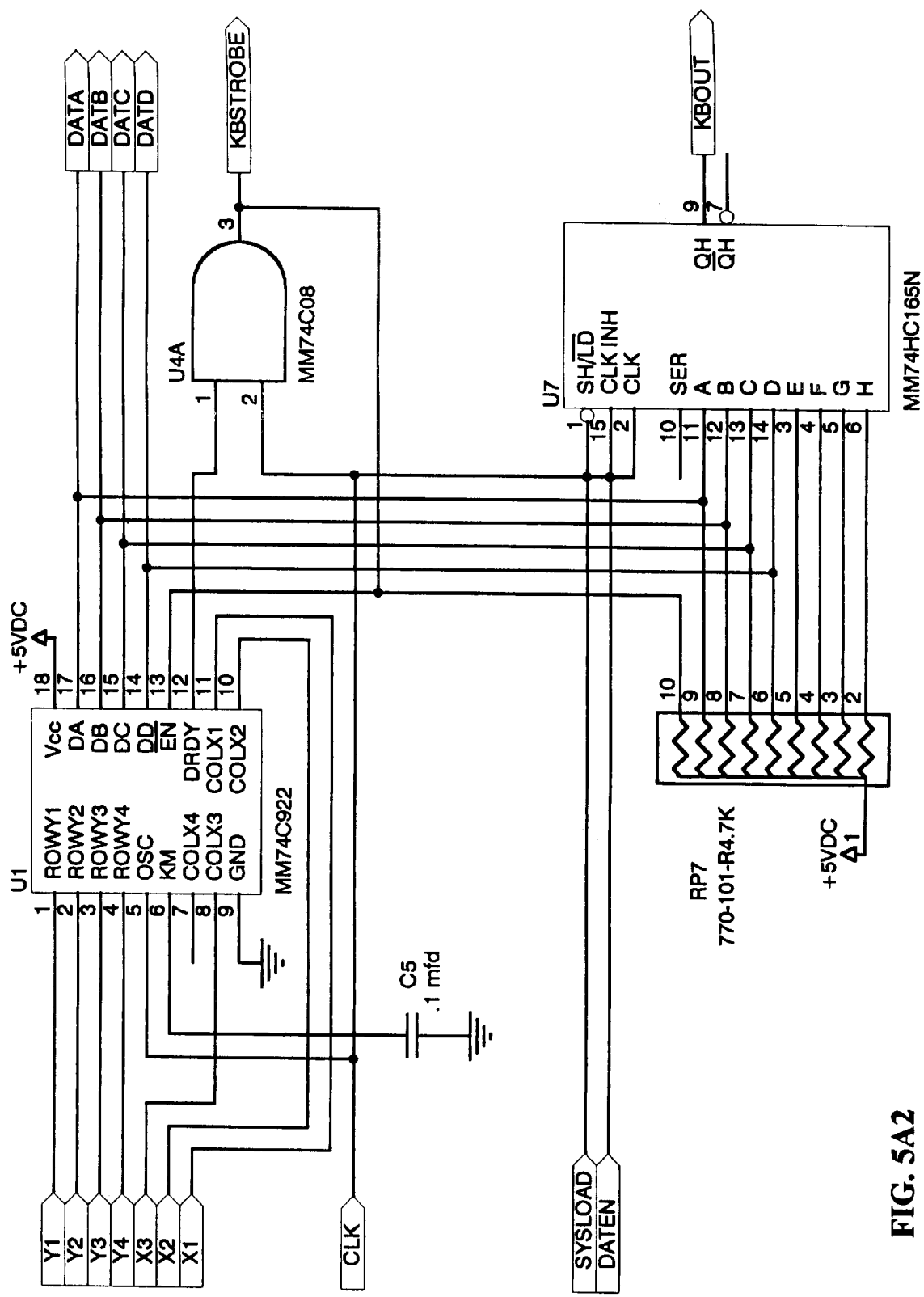
FIG. 5A2

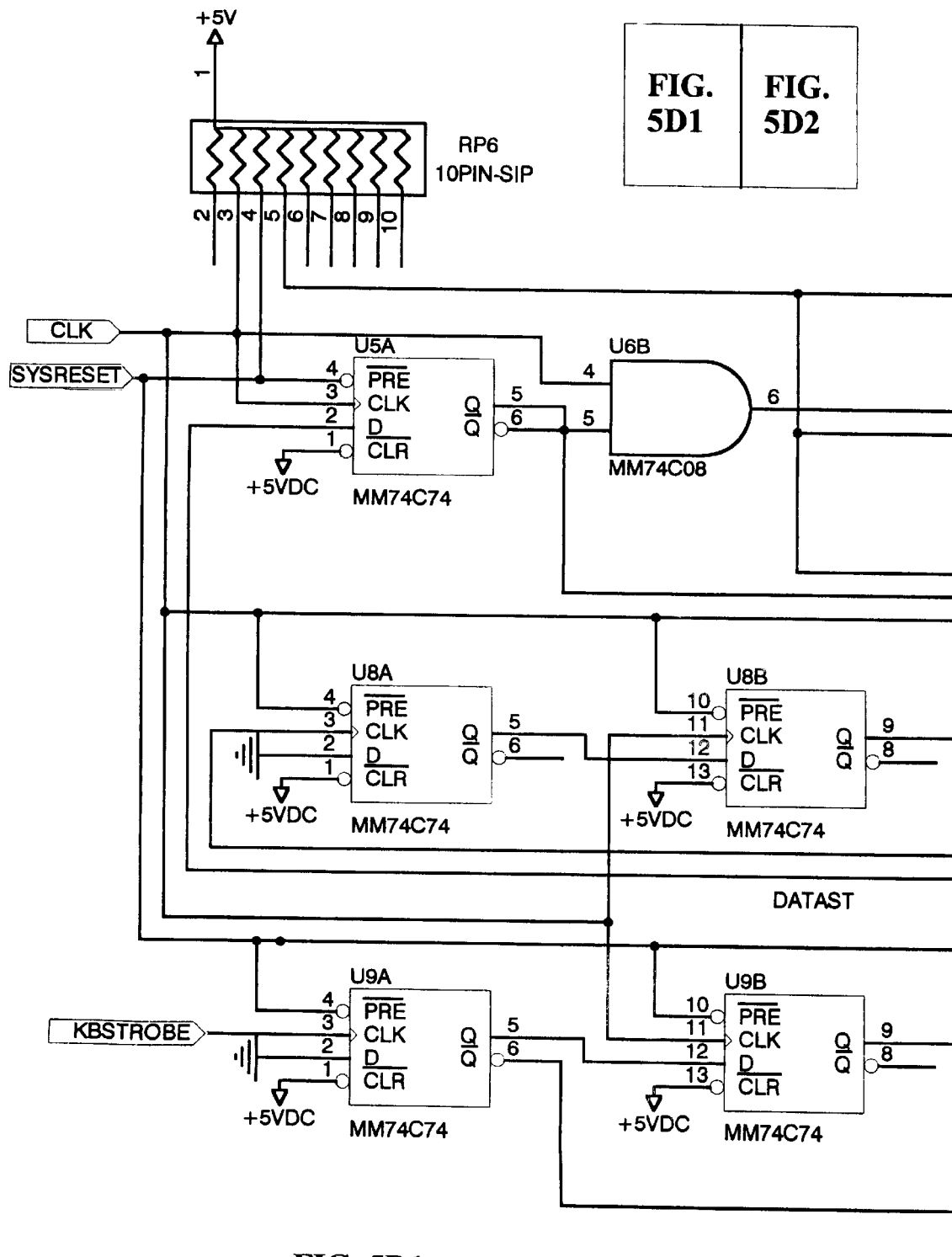
FIG. 5D1

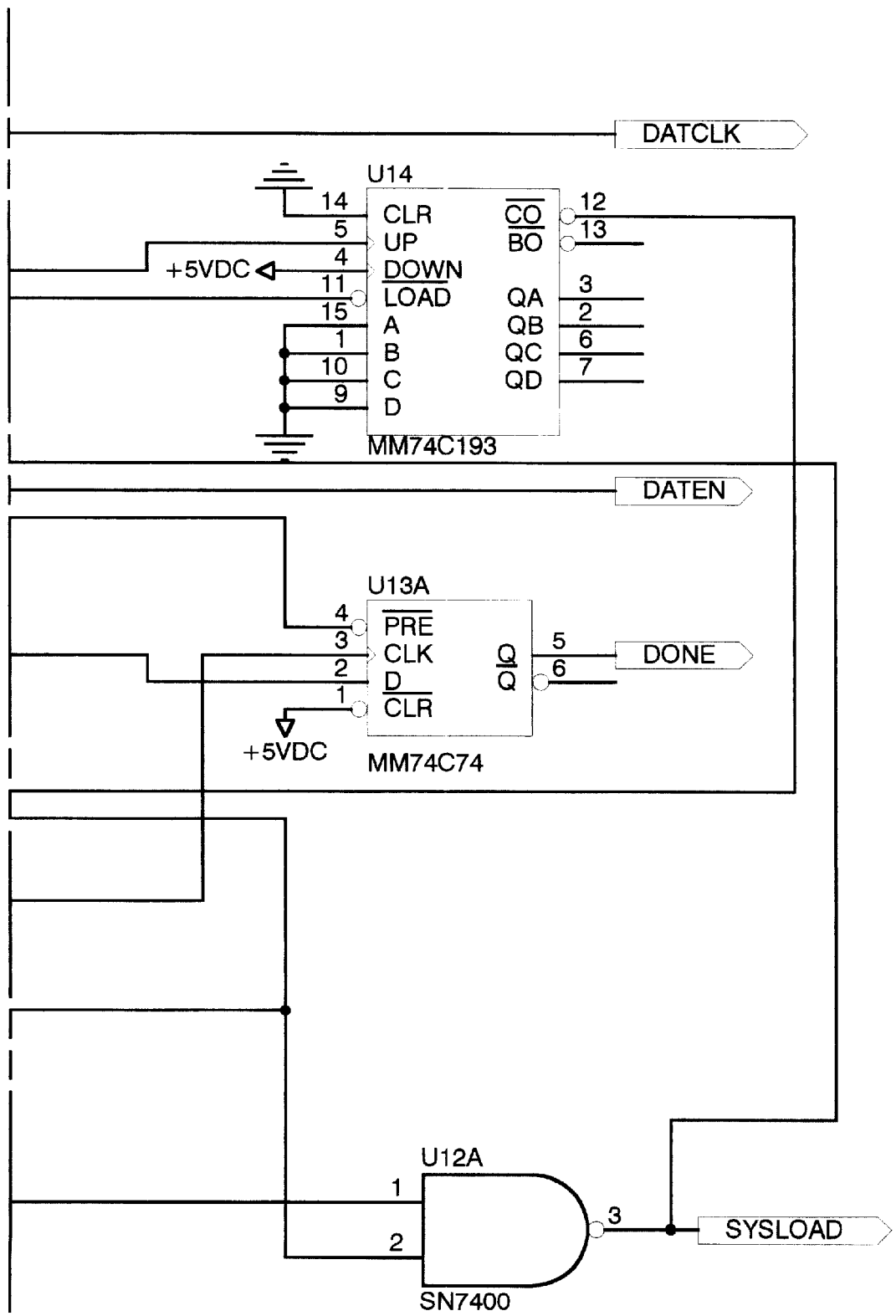
FIG. 5D2

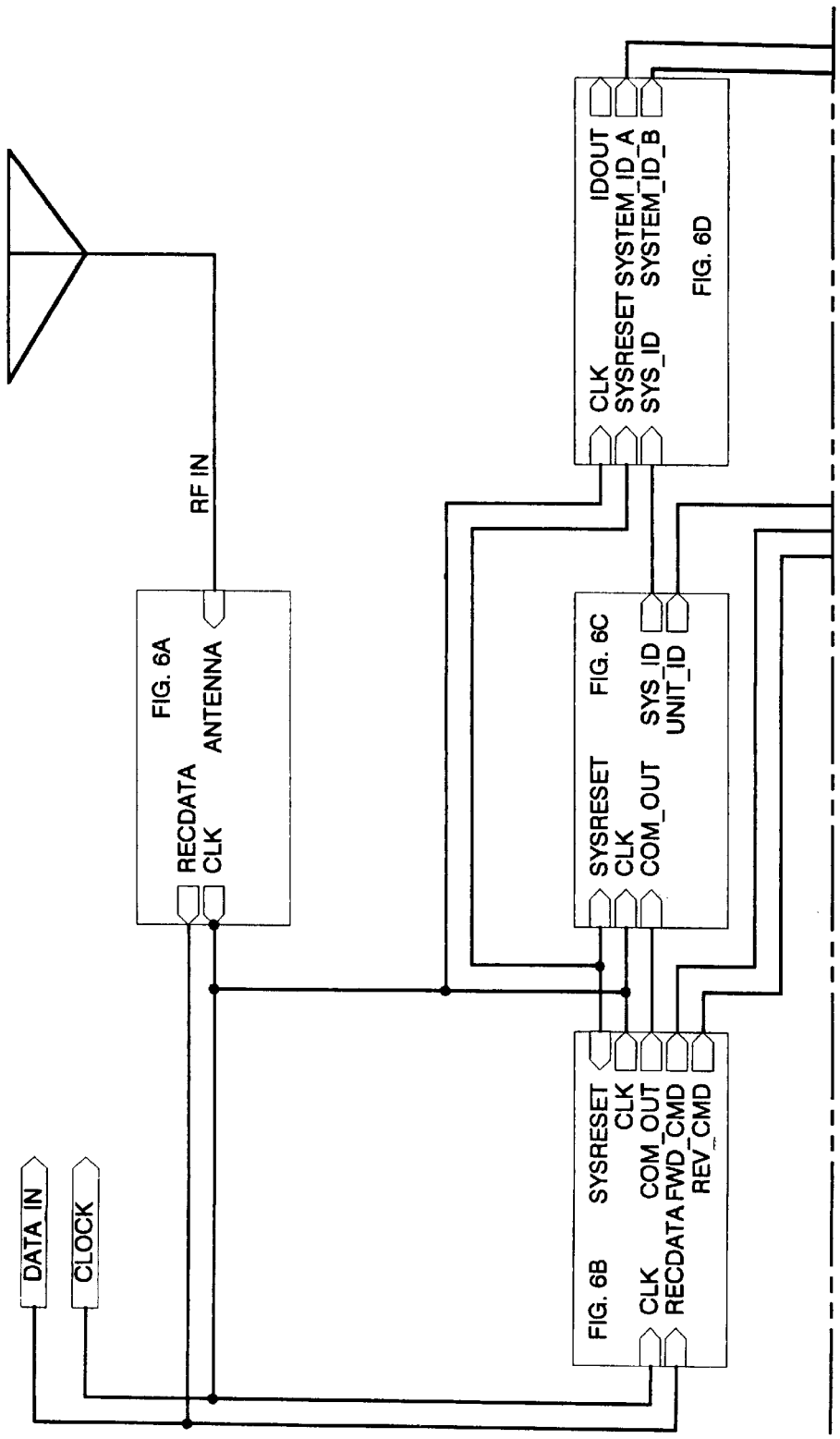
FIG. 6.1
| FIG. 6.1 |
|----------|
| FIG. 6.2 |

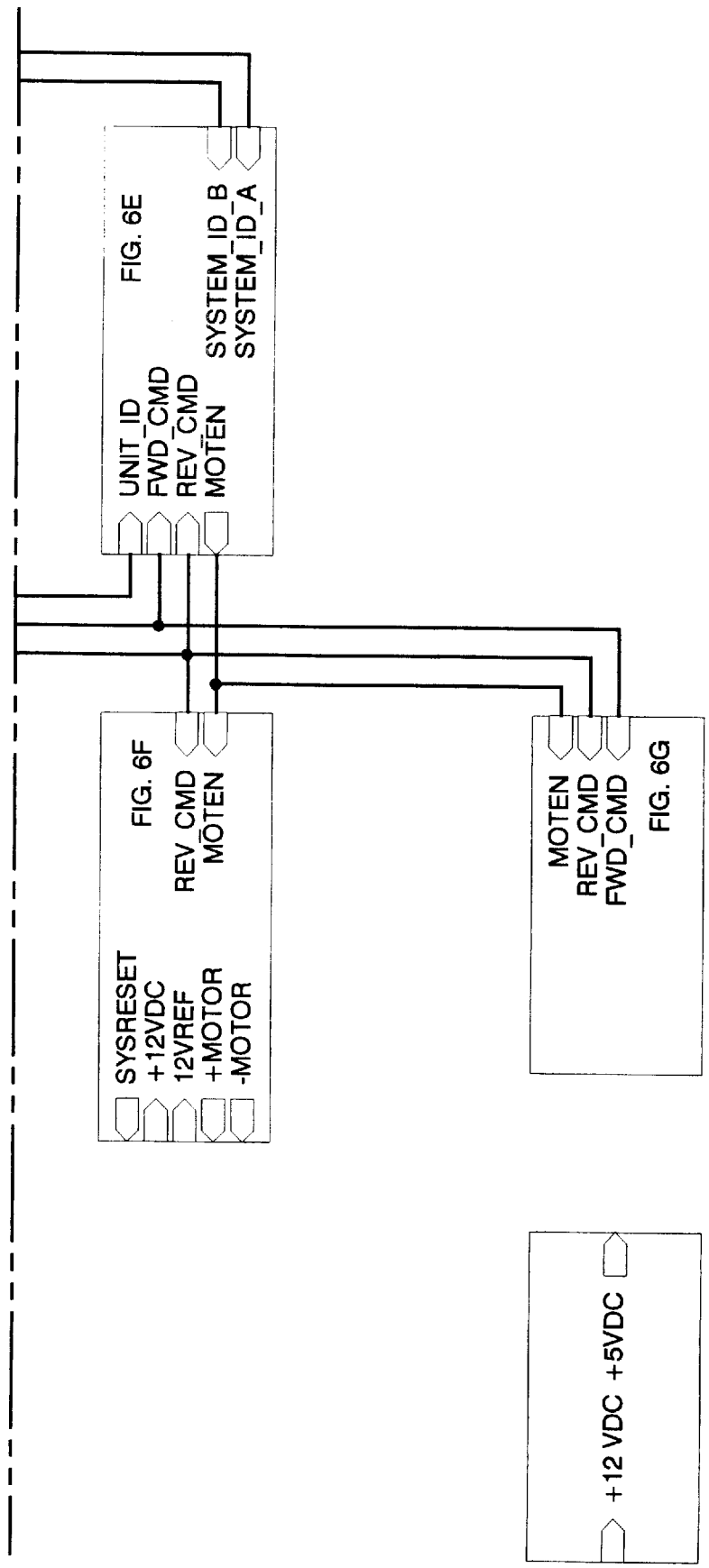
FIG. 6.2

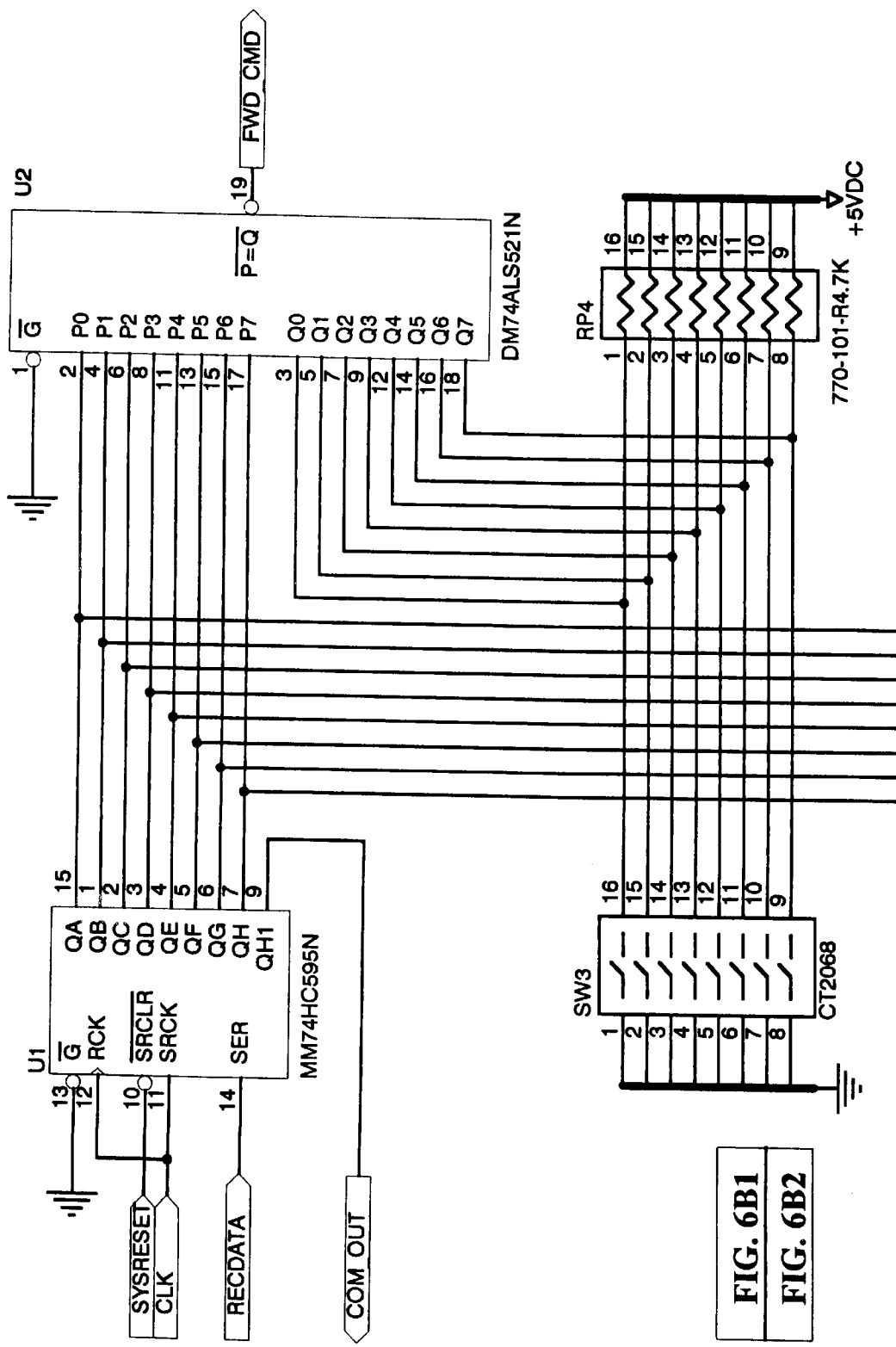
FIG. 6B1

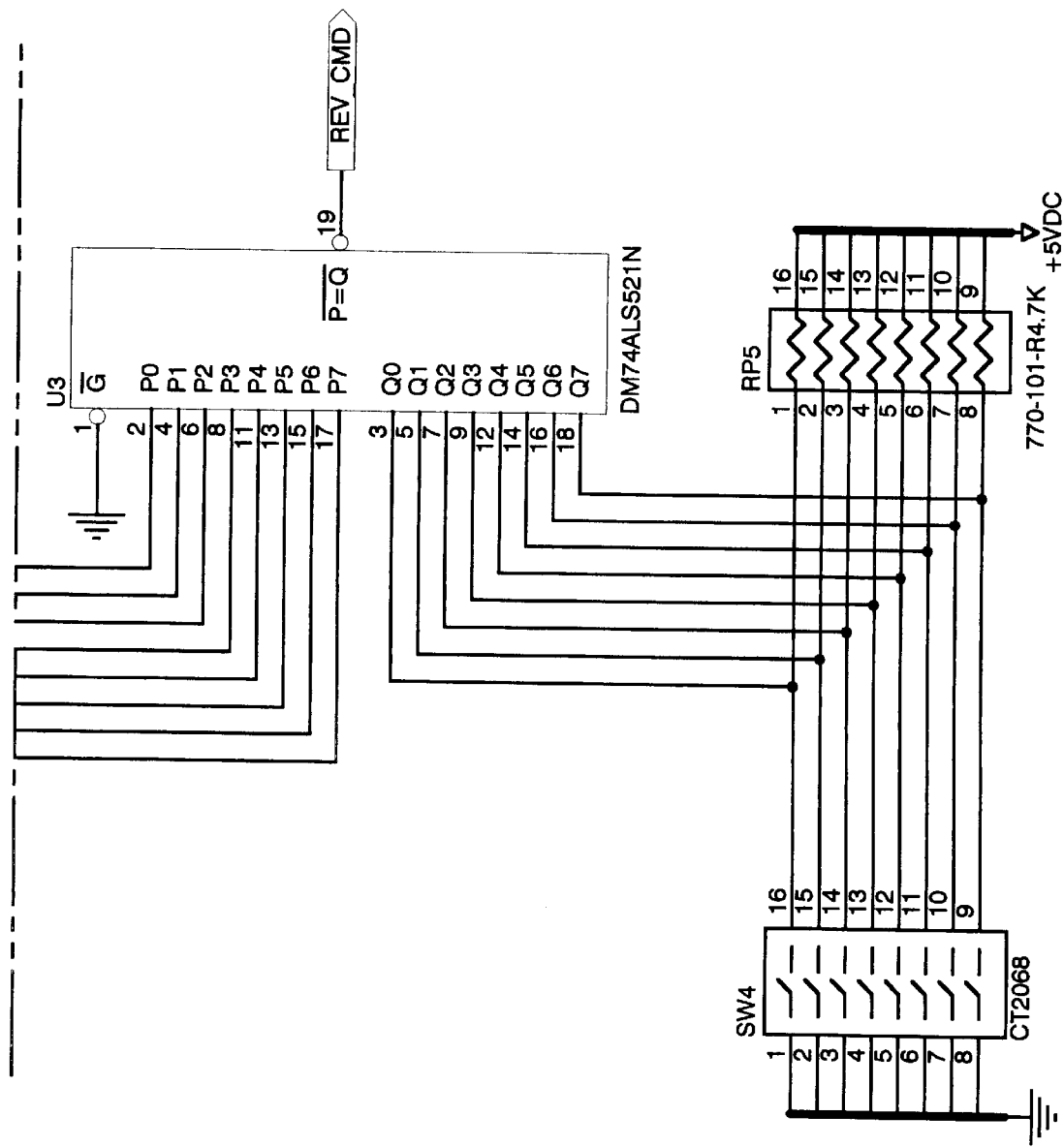
FIG. 6B2

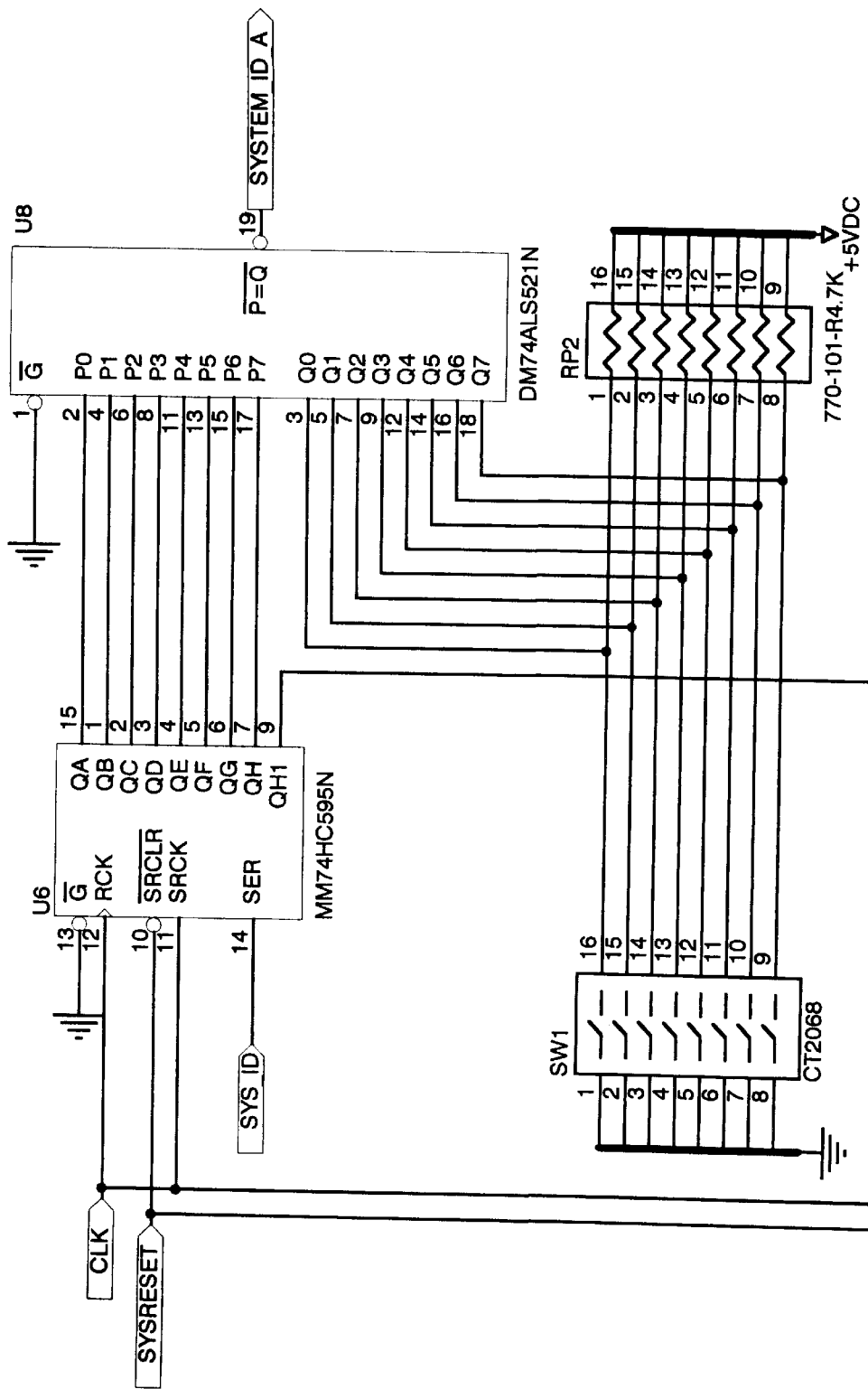

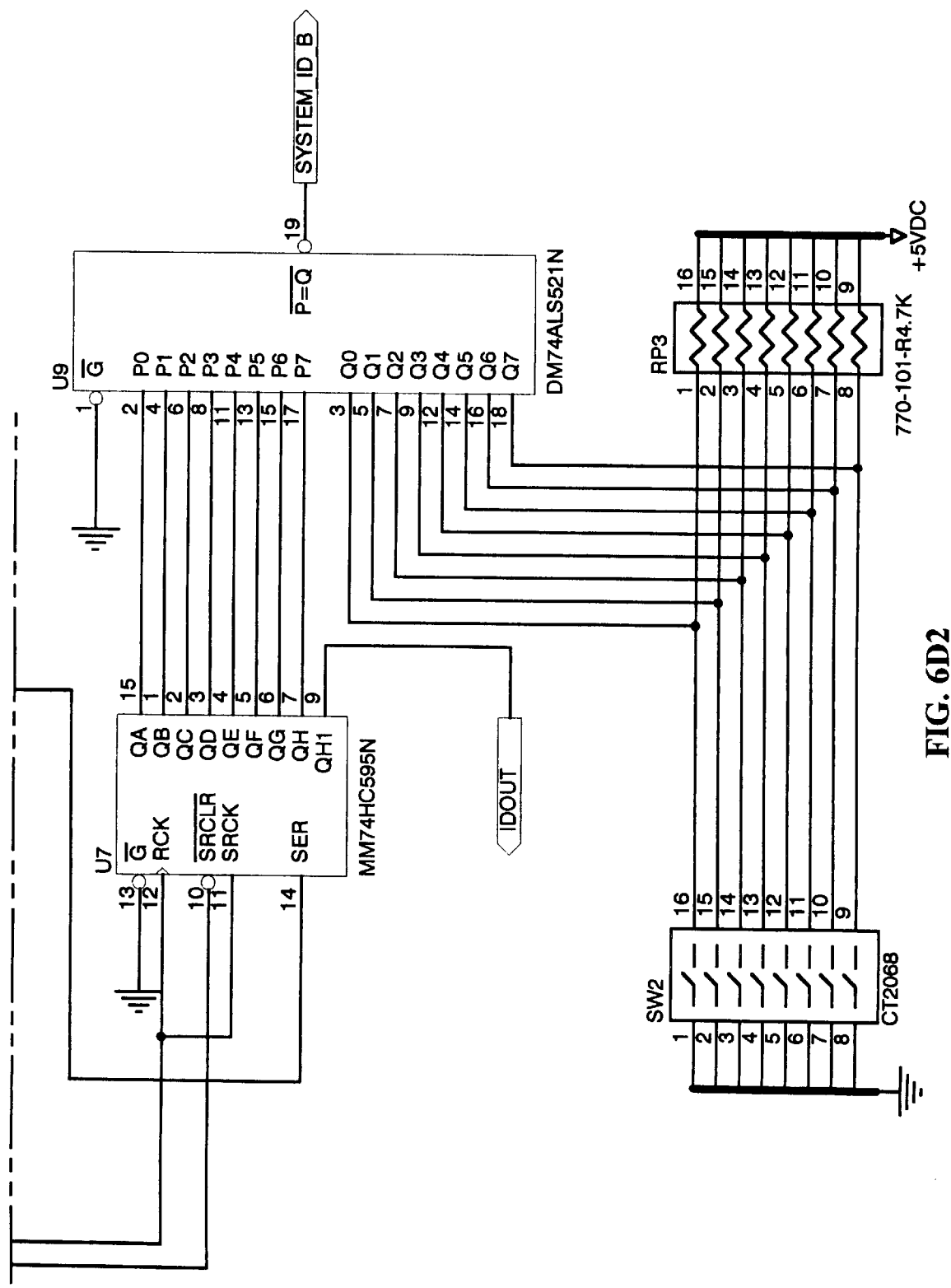
FIG. 6D2

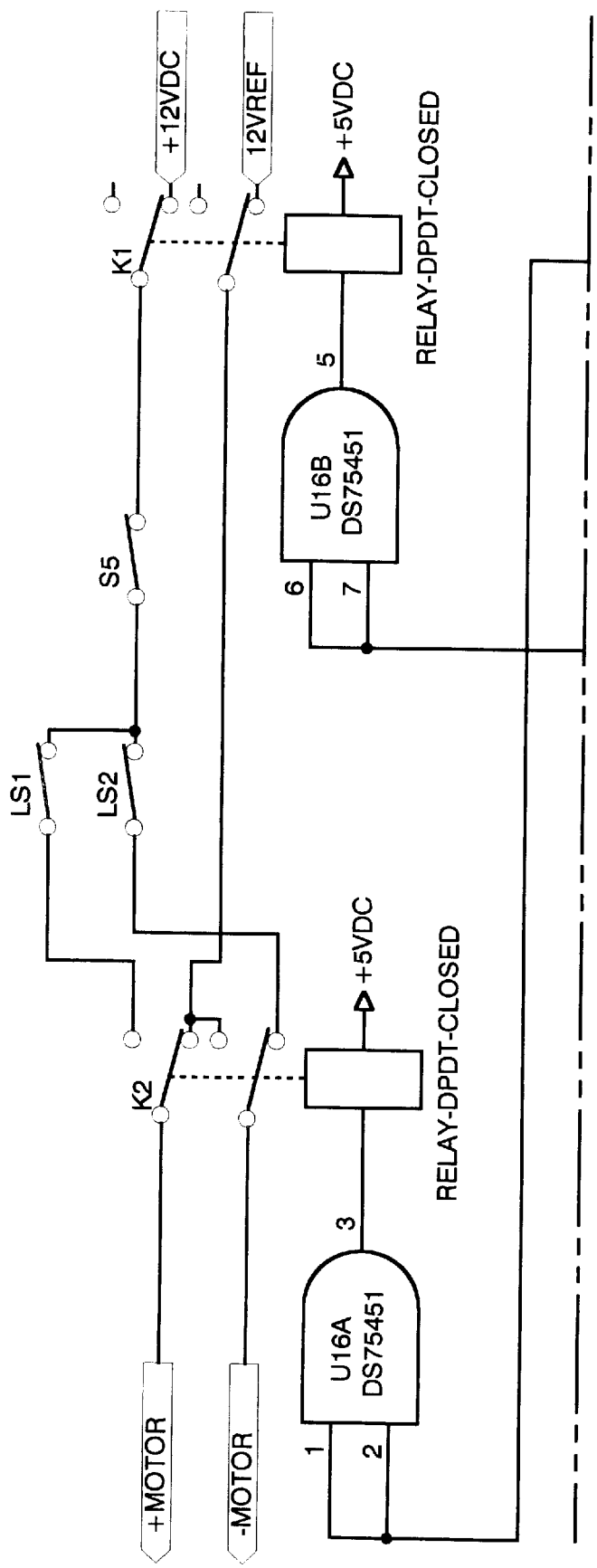
FIG. 6F1

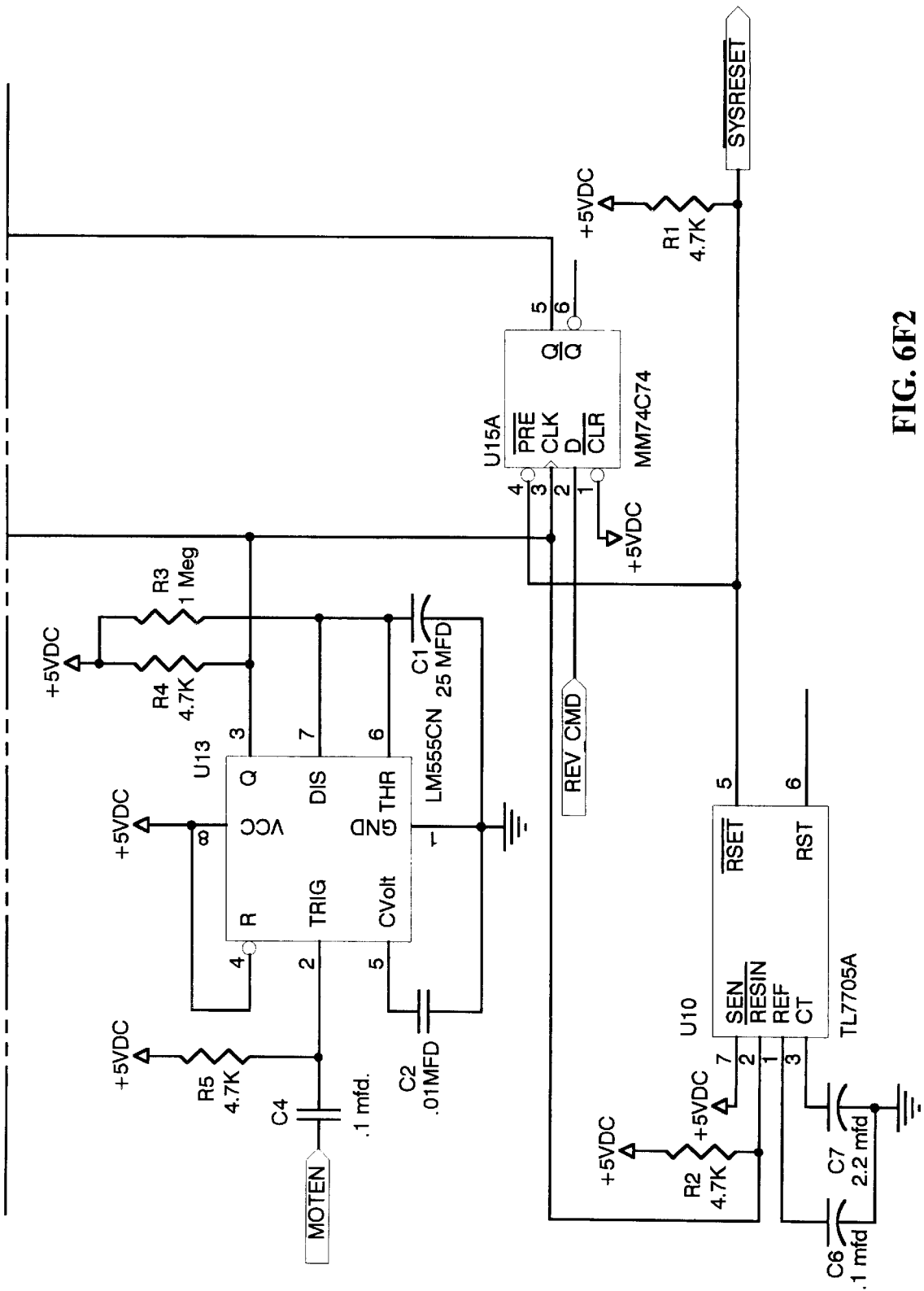
FIG. 6F2

|    | X1 | X2 | X3 | Y1 | Y2 | Y3 | Y4 |
|----|----|----|----|----|----|----|----|
| 1  | X  |    |    | X  |    |    |    |
| 2  |    | X  |    | X  |    |    |    |
| 3  |    |    | X  | X  |    |    |    |
| 4  | X  |    |    |    | X  |    |    |
| 5  |    | X  |    |    | X  |    |    |
| 6  |    |    | X  |    | X  |    |    |
| 7  | X  |    |    |    |    | X  |    |
| 8  |    | X  |    |    |    | X  |    |
| 9  |    |    | X  |    |    | X  |    |
| 10 | X  |    |    |    |    |    | X  |
| 11 |    | X  |    |    |    |    | X  |
| 12 |    |    | X  |    |    |    | X  |

FIG. 7

|    | 1 | 2 | 3 | 4 | 5 | 6 | 7 | 8 | 9 | 10 | 11 | 12 |
|----|---|---|---|---|---|---|---|---|---|----|----|----|
| DA | 1 | 0 | 1 | 0 | 1 | 0 | 1 | 0 | 1 | 0  | 1  | 0  |
| DB | 0 | 1 | 1 | 0 | 0 | 1 | 1 | 0 | 0 | 1  | 1  | 0  |
| DC | 0 | 0 | 0 | 1 | 1 | 1 | 1 | 0 | 0 | 0  | 0  | 1  |
| DD | 0 | 0 | 0 | 0 | 0 | 0 | 0 | 1 | 1 | 1  | 1  | 1  |

FIG. 8

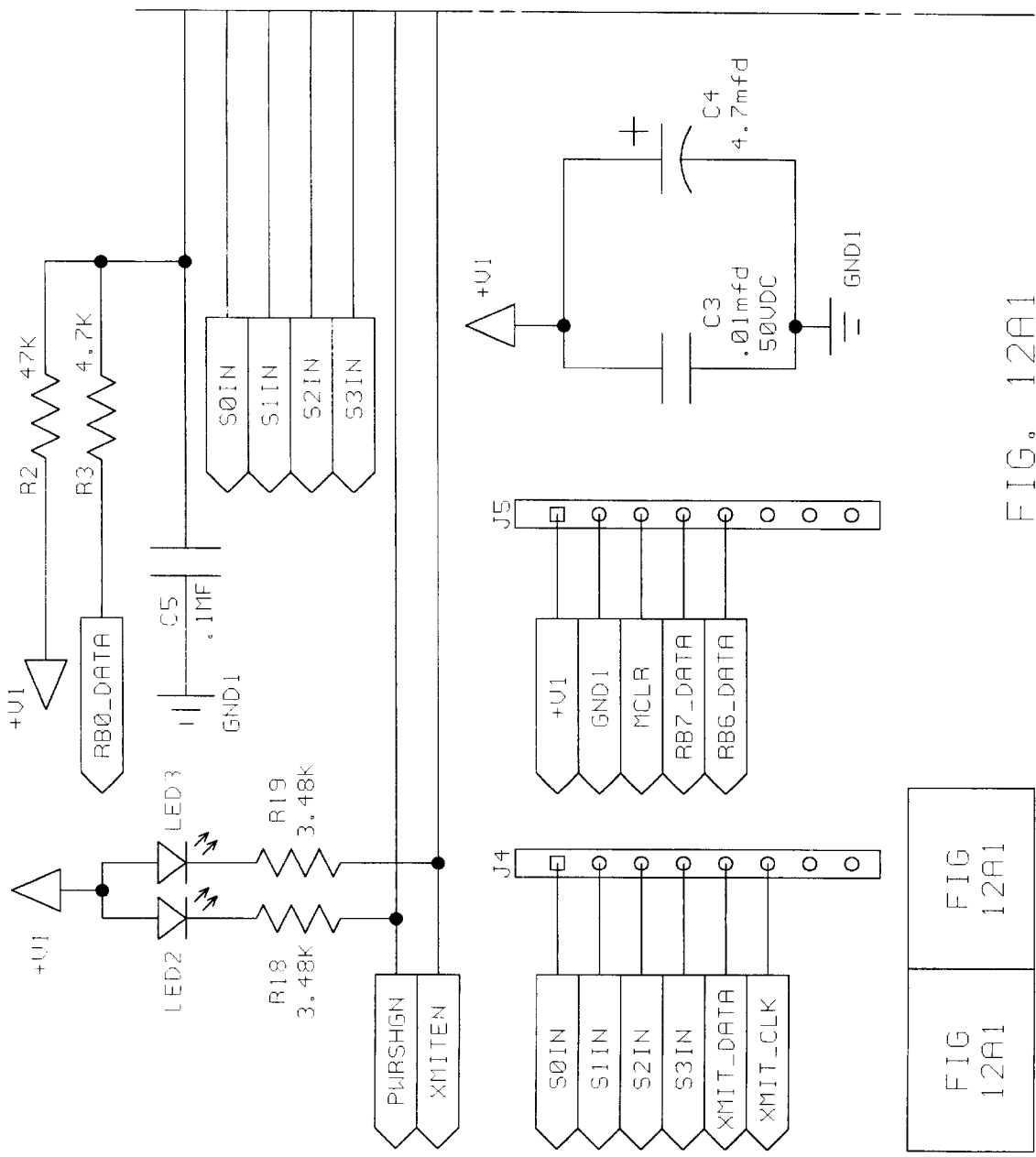
FIG. 12A1

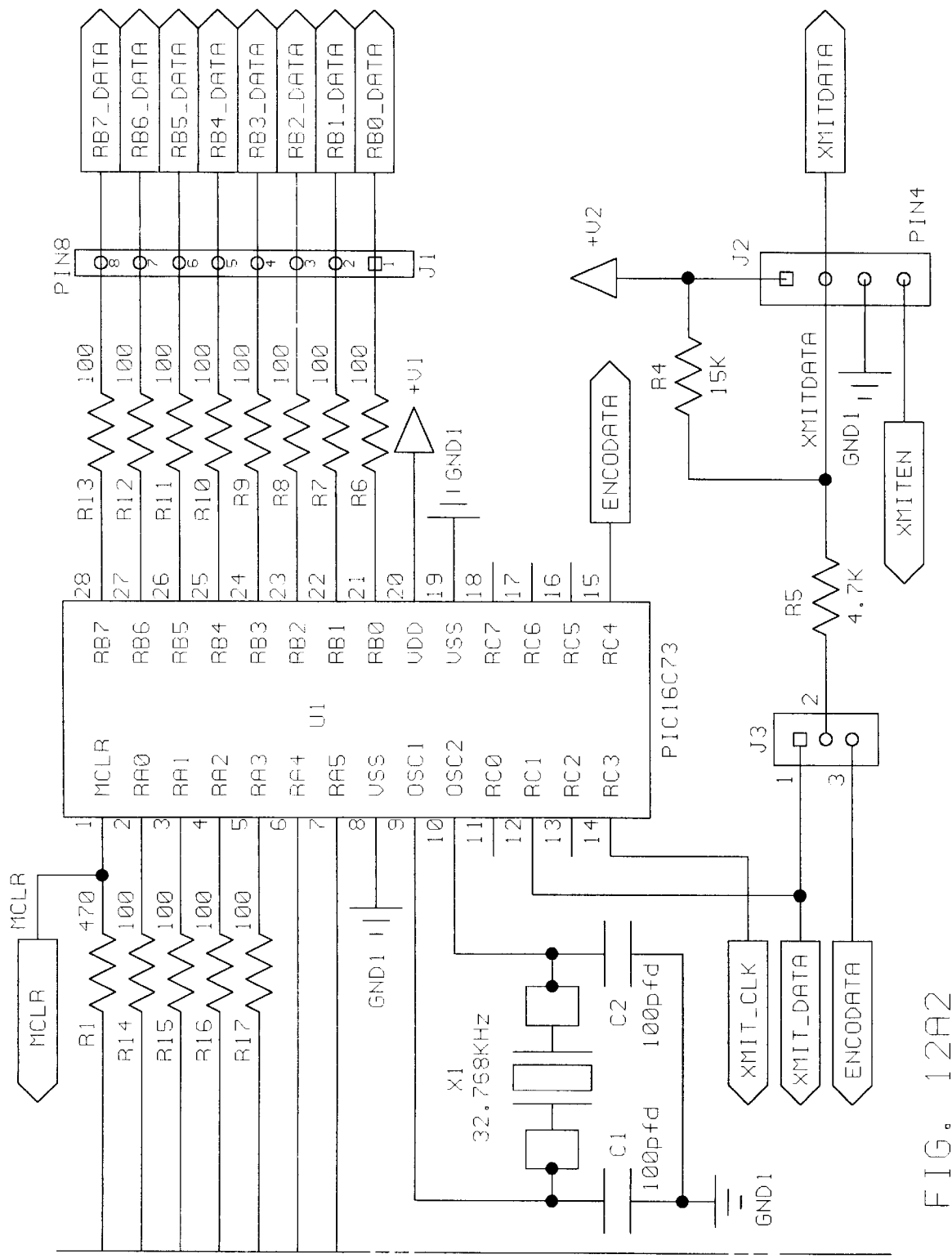
FIG. 12A2

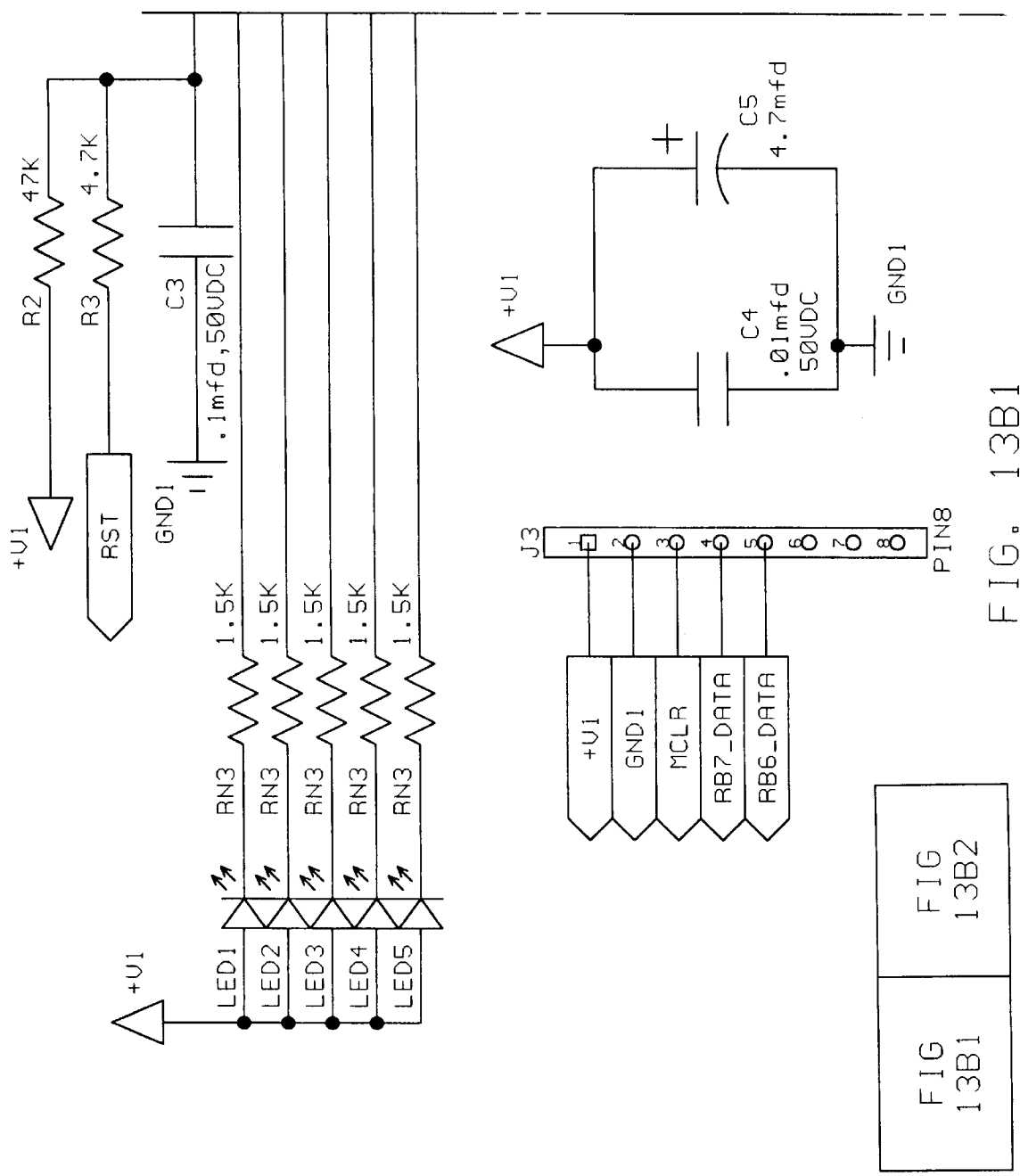
FIG. 13B1

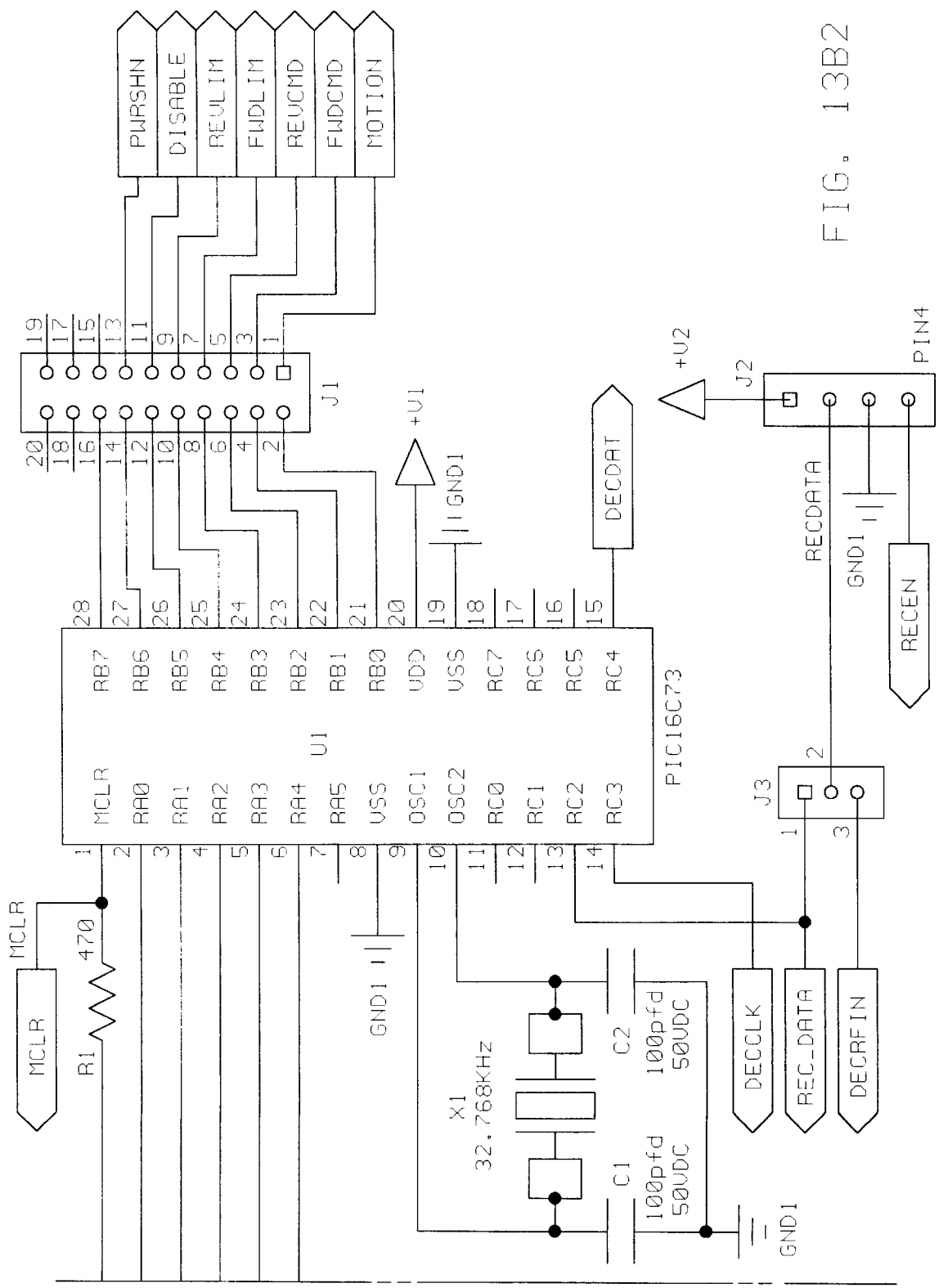
FIG. 13B2

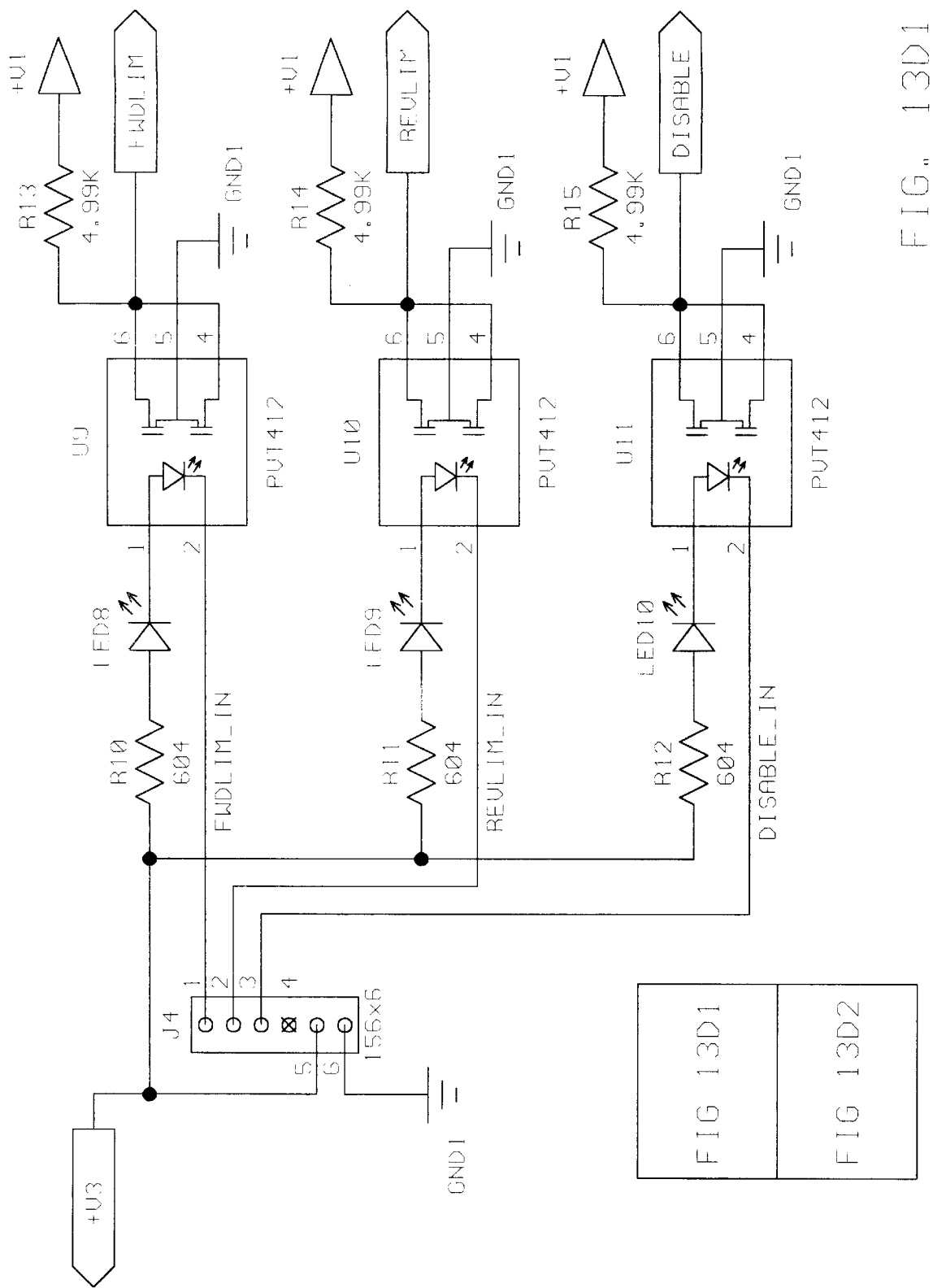

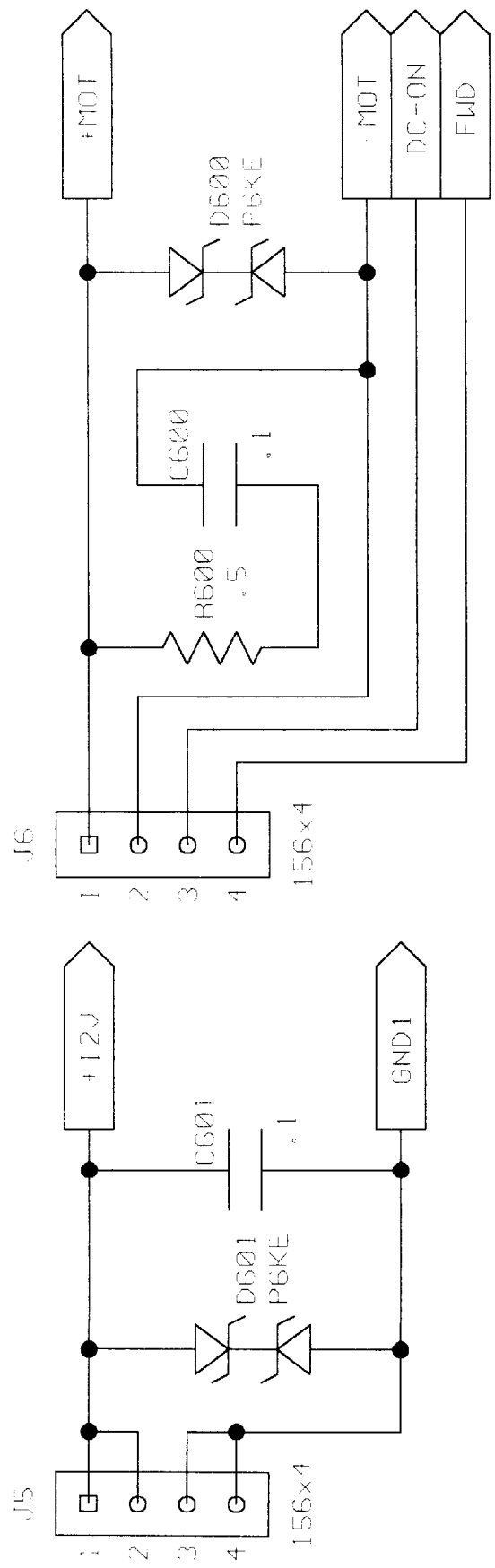
FIG. 13D2

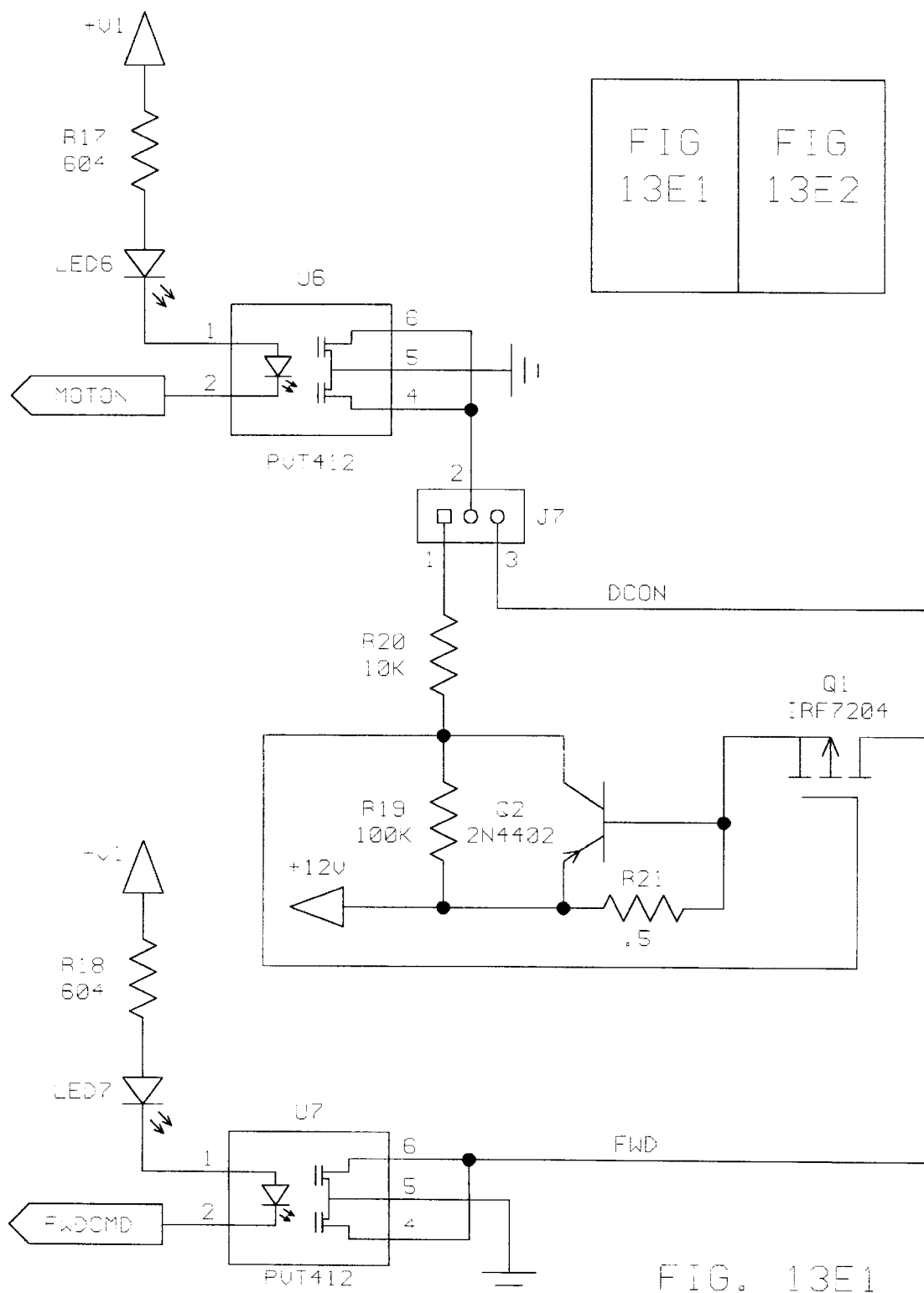
FIG. 13E1

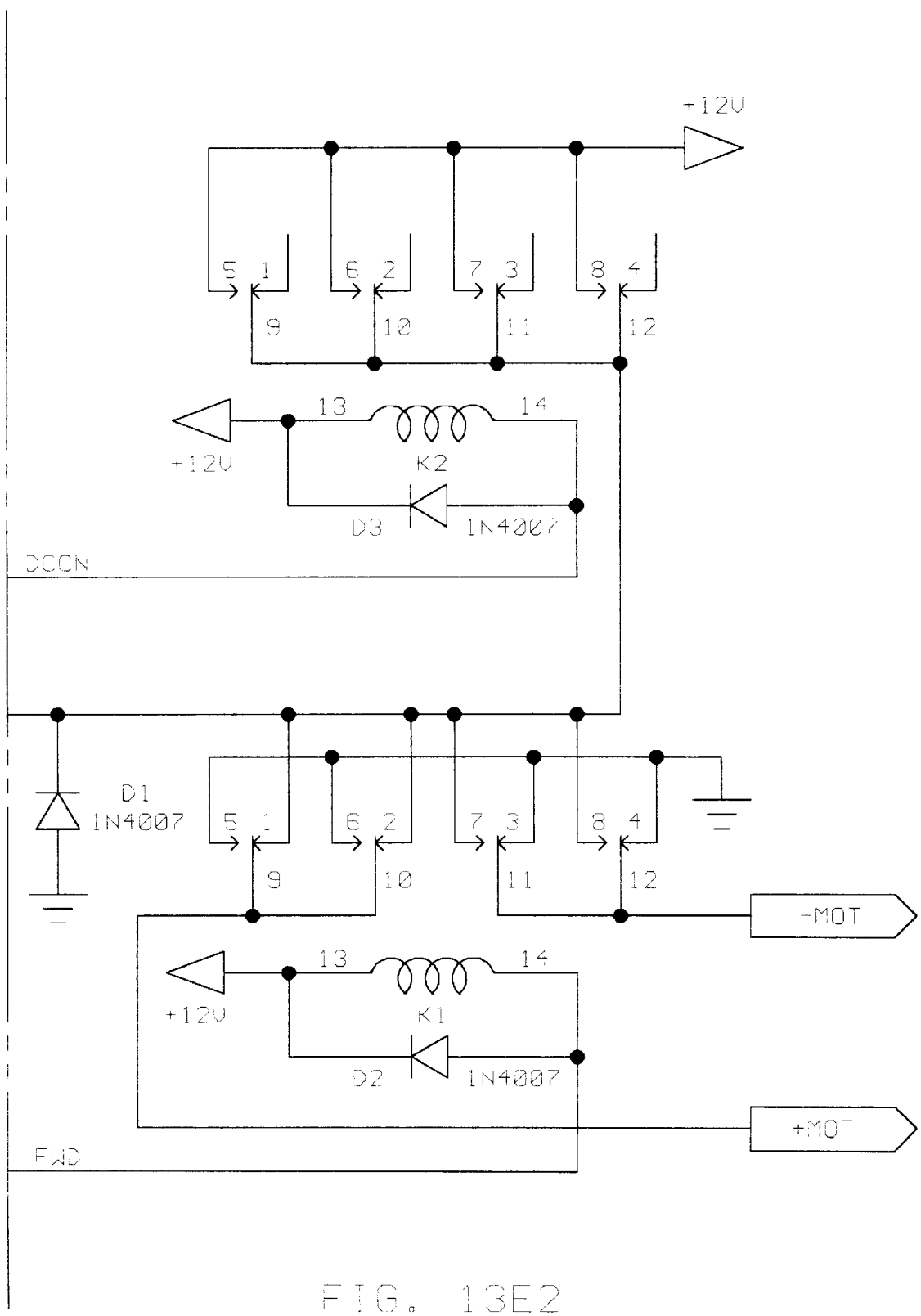
FIG. 13E2

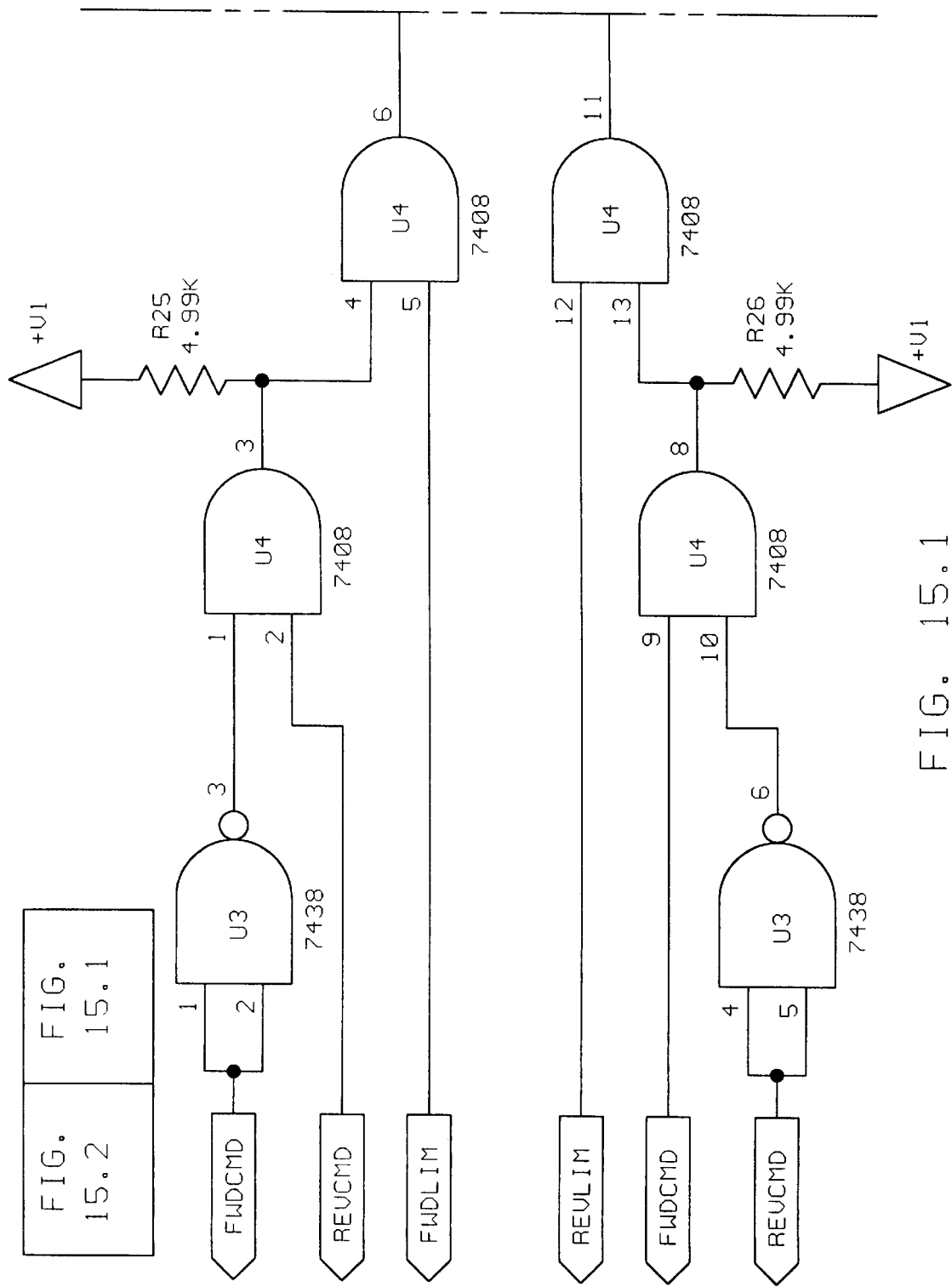
FIG. 15.1

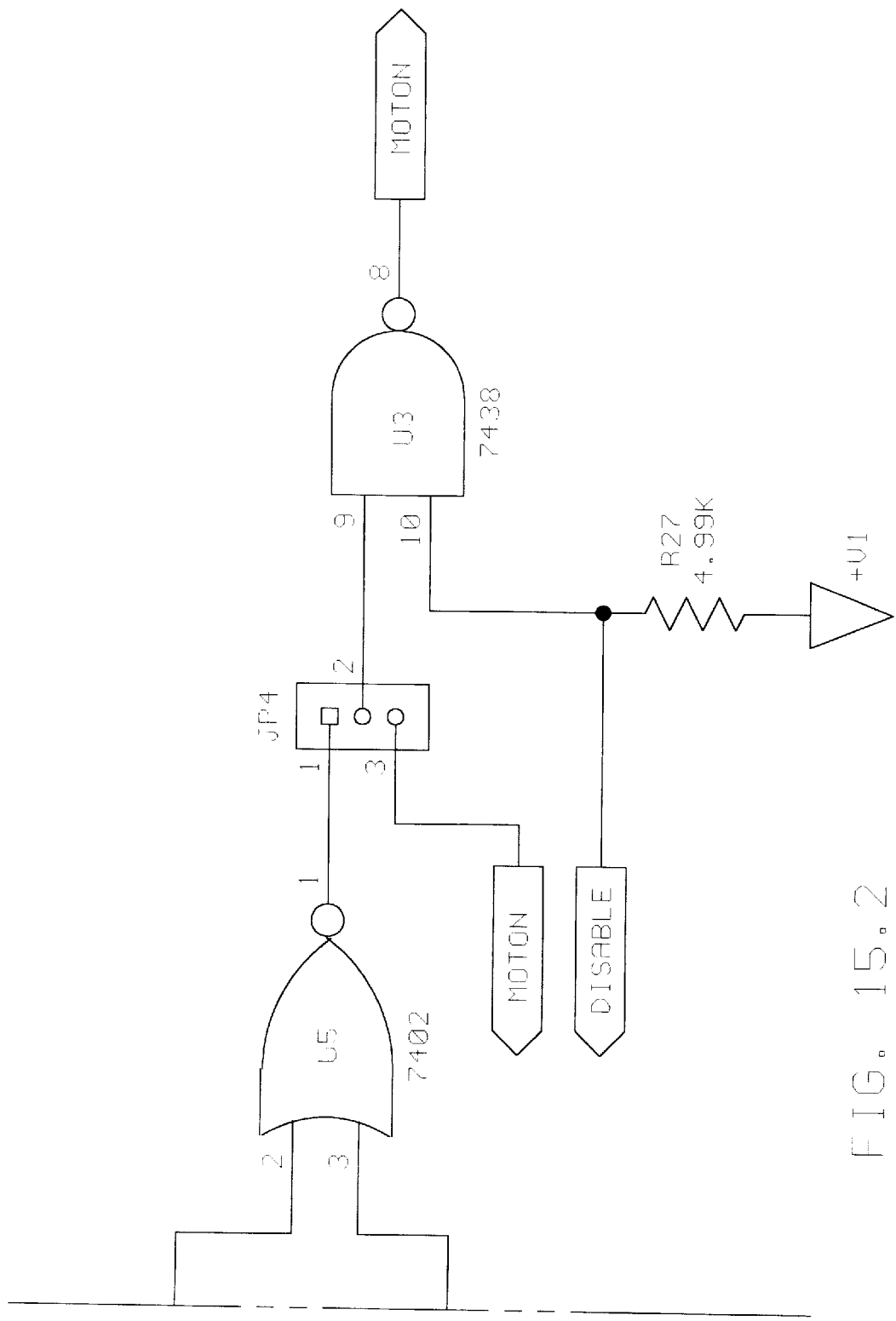
FIG. 15.2

VEHICLE ANTITHEFT SYSTEM CONTROLLING PARKING BRAKE

CROSS-REFERENCE TO RELATED APPLICATION

The benefit of provisional application No. 60/014,698 filed Apr. 1, 1996 is claimed. Provisional application No. 60/014,698 filed Apr. 1, 1996 is incorporated herein by reference.

TECHNICAL FIELD

The present invention relates to an antitheft system for use with vehicles such as automobiles.

BACKGROUND OF INVENTION

U.S. Pat. No. 3,552,518 (referred to subsequently as '518 and incorporated here by reference) shows an antitheft device utilizing the parking brake of a vehicle. As shown, for example, in '518, a parking brake will typically include a mechanism which can lock and release the brake. In '518, unlocking is accomplished using vacuum from the motor, but it is more common that unlocking is accomplished by manual movement of some release. In '518, means is provided which interferes with the unlocking, by selectable blocking of the vacuum line.

DISCLOSURE OF INVENTION

It is an object of the invention to provide a novel antitheft system that is simple to install and which makes use of equipment already present in most, if not all, vehicles such as automobiles.

Other objects of the invention will become apparent on the basis of the explanations of the invention to follow below.

This invention provides for a controlled locking and unlocking of the parking brake of a vehicle. The system engages the parking brake upon appropriate actuation by the user and will not release the parking brake until appropriate release by the user. Once the system has engaged the parking brake, the vehicle becomes immovable, and operation of the standard parking brake release system for the vehicle does not release the parking brake.

The parking brake of a vehicle is sometimes also referred to as the "emergency brake", or the "hand brake".

A vehicle antitheft device of the invention has an actuating means including a motor and controls connected with the motor. The controls have two limit states for the motor, a forward motor position and a reverse motor position. The controls issue commands to move the motor between the two limit states. The motor is connected to the parking brake of a vehicle in such a way that a locked state of the brake corresponds to one of the limit states of the motor, and an unlocked state of the brake corresponds to the other of the limit states.

According to another view of the invention, it is applied to a vehicle having a parking brake and a primary parking brake operating mechanism linked to the brake and operable between a lock state holding the brake in a locked state and a release state allowing the brake to be in a released state. In this scene, the invention provides a secondary parking brake operating mechanism which is linked to the brake and operable between a lock state holding the brake in a locked state and a release state allowing the brake to be in a released state. This is coupled with a security control on the operation of the secondary mechanism. The secondary mechanism is independent of the primary mechanism, in that, when the brake is in the locked state and both mechanisms are in their lock states, operation of the primary mechanism into the release state does not cause release of the brake, as long as the secondary mechanism remains in the lock state.

The invention additionally encompasses a vehicle parking brake operating method. According to this method, the brake is held in a locked state with two linkages, and released from the locked state only with the release of both linkages. Release of one of the linkages is under security control.

Security control may be by way of a key-operated mechanical lock, or may be accomplished by electrically operated hardware, under software or logic control, using processed signals according to a variety of systems for example as described below.

Among the advantages of the vehicle antitheft system of the invention, as compared to that described in the above-referenced U.S. Pat. No. 3,552,518, is the aspect that the present invention can be set remotely. That in '518 requires the presence of the driver in the vehicle, in order to be set. Setting of the parking brake in the present invention can be done away from the vehicle, using a remote control unit, as below described. For instance, a thief can be speeding away with the vehicle, and the owner can actuate the remote control unit, while standing at a location away from the vehicle, to set the parking brake. If greater distances are involved, pager technology, for instance, can be built in, to couple signals from the remote control unit into the main control unit.

BRIEF DESCRIPTION OF THE DRAWINGS

FIGS. 5.1 and 5.2 are a high level, or block, diagram of a remote control unit of an electrical system of the invention.

FIGS. 5A1–5G are detailed schematic diagrams of the blocks as indicated in FIG. 5.

FIG. 6 is a high level, or block, diagram of a main control unit of an electrical system of the invention.

FIGS. 6A–6G are detailed schematic diagrams of the blocks as indicated in FIG. 6.

FIGS. 7 and 8 are tables of signals in the remote control unit of FIG. 5.

FIGS. 12A–12D are detailed schematic diagrams of the blocks as indicated in FIG. 12.

FIGS. 13A–13I are detailed schematic diagrams of the blocks as indicated in FIG. 13.

FIG. 15 is a detailed schematic diagram of a portion of the main control unit of a third electrical system of the invention.

MODES OF THE INVENTION

MECHANICAL SYSTEM

Figure 1:
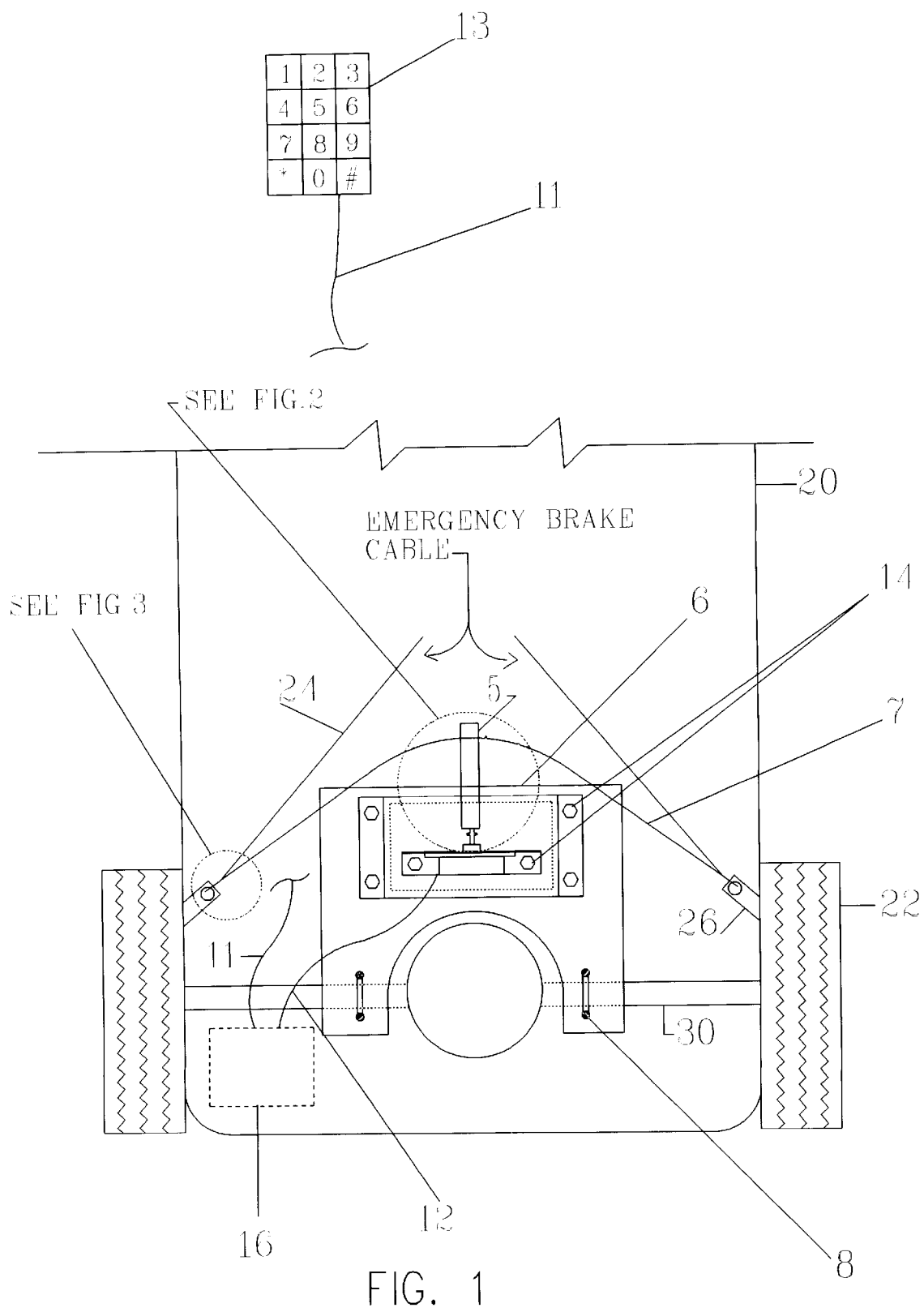
FIG. 1 is a bottom view of the rear end of a vehicle such as an automobile, including a mechanical system of the invention.

With reference first to FIG. 1, this is a schematic illustration of the back half of a vehicle 20 which contains a manufacturer-installed parking, or emergency, brake that can engage the rear wheels 22 when cable 24 pulls on lever tabs 26. Cable 24 is operated by a primary parking brake operating mechanism, for example that shown in the above-referenced U.S. Pat. No. 3,552,518 (its parts 14, 32, 38, etc.), which may, or may not contain a locking valve in its vacuum line. More commonly, cable 24 will be both pulled for setting the brake, and loosened for releasing the brake, by a mechanical pull or lever device operated by the driver of the vehicle.

FIG. 1 shows the interfacing of an antitheft system of the invention with the standard vehicle equipment described in the previous paragraph. The illustrated embodiment of the invention has an actuating means including a mechanical system, a secondary parking brake operating mechanism, which is centered on mounting plate 6, and an electrical security control system, which is centered on control box 16. Mounting plate 6 is secured to the rear axle housing 30 by U-bolts 8. Control box 16 is mounted an any appropriate location in the vehicle, for instance in a hidden compartment accessible from the trunk of the vehicle.

As indicated in FIG. 1, the mechanical system of the invention interfaces with the parking brake of the vehicle by way of a cable 7, which can pull on lever tabs 26 in unison with cable 24 or independently thereof. Bolts 14 mount the mechanism of the mechanical system to mounting plate 6. The mechanism, which is shown in detail in FIG. 2, includes a connecting block 5 to actuate cable 7. The mechanical system interfaces with the electrical system by way of wiring harness 12.

Figure 3:
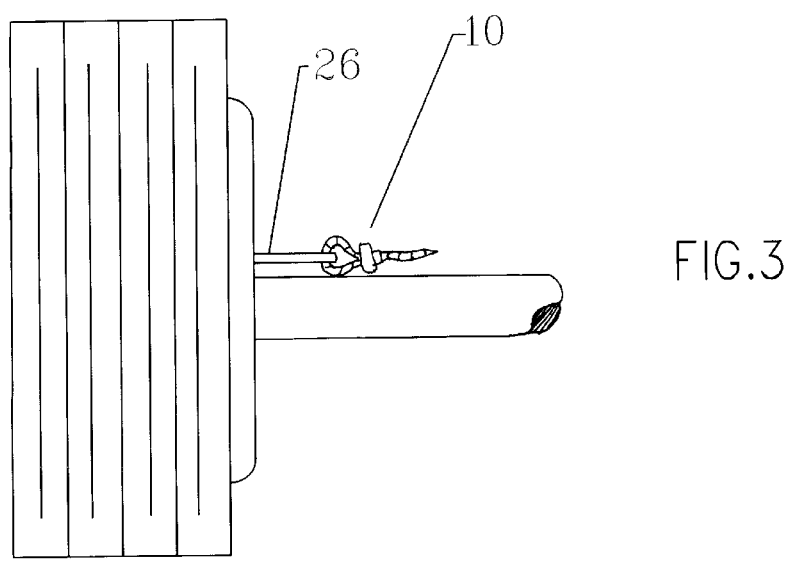
FIG. 3 is a detail rear view of a region of FIG. 1 as indicated in that FIG.

FIG. 3 shows an example for connecting cables 7 and 24 to lever tabs 26 using a cable clamp 10.

Figure 2:
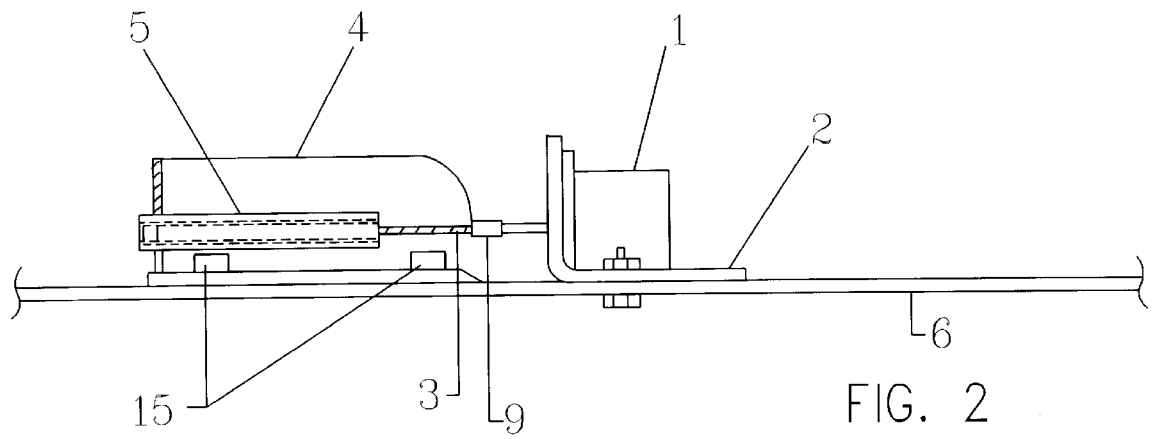
FIG. 2 is a detail side view of a region of FIG. 1 as indicated in that FIG.

Referring now to detail drawing FIG. 2, it will be seen that connecting block 5, which may be made of nylon, is internally threaded, so that it can be driven left and right in FIG. 2 by its engagement with threaded rod 3. When driven, connecting block 5 slides in a window formed in end of cover 4. Threaded rod 3 is driven by the shaft of DC motor 1 through universal coupling 9. Motor 1 sits on bracket 2, which is mounted to mounting plate 6.

Figure 4:
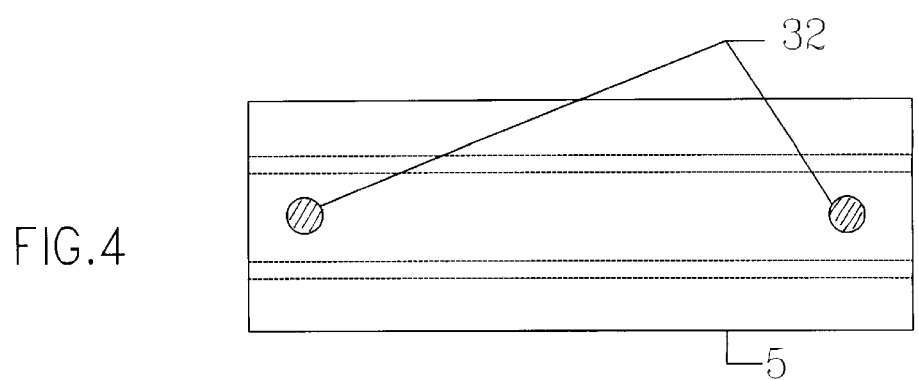
FIG. 4 a bottom view of a portion of FIG. 2.

Limits are placed on the movement of connecting block 5 by magnetic sensing switches 15, which sense permanent magnets 32 installed in the base of block 5, as shown in FIG. 4. Motor 1 is driven forwards, or in reverse, using a remote control unit, including the keypad 13 of FIG. 1. The remote control unit is shown connected by wiring harness 11 to a main control unit in box 16. Alternatively, or supplementally, the remote control unit may communicate with the main control unit by radio transmission. Further details of the operation of motor 1 will become apparent on the basis of the detailed description of the electrical systems of the invention below.

To operate the antitheft system of the invention, the user punches, for example, a pre-defined, secret 2-digit code into keypad 13. This turns motor 1 on, to move connecting block leftwards in FIG. 2, upwards in FIG. 1, to tension cable 7 to engage the parking brake. Motor power is shut off, when the permanent magnet on the bottom of the connecting block comes to the forward magnetic sensor 15. Release of tension on cable 24 from the driver's compartment of the vehicle cannot release the parking brake, if cable 7 has been tensioned to engage the parking brake. To remove tension on cable 7, the user inserts, for instance, a secret 4-digit code on the keypad. This turns the motor 1 on in the opposite direction, to move connecting block 5 rightwards in FIG. 2, downwards in FIG. 1, to take the tension off of cable 7. Release of tension on cable 24 will then release the parking brake. Rotation of the motor drive shaft in the opposite direction will cease, when the other permanent magnet on the bottom of the connecting block comes to the rear magnetic sensor 15.

Selection of thread pitch in the engagement of block 5 with rod 3, the physical locations of the magnetic sensors 15 and permanent magnets 32, and the rotational speed of the motor 1 provides latitude in how fast the parking brake is set and released. A delay, for example, of 35–45 seconds in the setting of the brake is of advantage, should a set-brake command be issued when the vehicle is moving, in which case there is a controlled stopping of the vehicle as the brake pressure steadily increases.

ELECTRICAL SYSTEM 1

The intent of the electrical systems of the invention is to remotely energize the DC motor 1 to engage or disengage the emergency brake system of an automobile.

FIGS. 5 and 6 illustrate an embodiment of an electrical system for the invention. FIG. 5 is a high-level diagram of the remote control unit of such system, while FIG. 6 is a high-level diagram of the main control unit of such system.

REMOTE CONTROL DETAIL

FIG. 5A1 shows keypad 13 of FIG. 1, while FIG. 5A2 shows the Keypad Encoder and Command Buffer of the remote control unit. As indicated in FIG. 5A1 and in the upper left corner of FIG. 5A2, keypad 13 of FIG. 1 provides contact closures in an X-Y matrix arrangement, for example as shown in the table of FIG. 7. The keypad has 12 keys and may be, for example, in the form of a telephone keypad with the numbers 0–9, and the symbols ★ and #. The table of FIG. 7 has a row for each of the 12 keys of the keypad and shows an X at the column positions which go low upon the pressing of the particular key.

As shown in FIG. 5A2, the X and Y leads of the keypad are connected to a Keyboard Encoder U1. An example of a suitable encoder is a 74C922 integrated circuit chip. Taking the instance of pressing the key for the number "one" on the keypad, FIG. 7 shows that the X1 lead will go low and the Y1 lead will go low. Scanning in the Encoder causes a latched output to appear on the data pins DA, DB, DC, and DD of the Encoder. The output of the Encoder at DA, DB, DC, and DD is binary as shown in the table of FIG. 8. The Data Ready (DRDY) pin will go high, indicating that data is ready on the data pins to be read by the following stages. The DRDY will return to zero when the key is released. The output of the AND gate U4A will go high to provide the signal KBSTROBE, when DRDY and the clock (CLK) are high. An example of a suitable AND gate is a 74C08 integrated circuit chip. At this time, the latched output of the Encoder is loaded into a parallel input, serial-out register U7, because the SYSLOAD signal is still low, as will become evident on the basis of further explanation of SYSLOAD below. An example of a suitable serial-out register is a 74HC165N integrated circuit chip.

The signal KBSTROBE triggers the Control Logic (as will be explained below with reference to FIG. 5D) to emit first a low SYSLOAD, to load the serial shift registers, and then a high SYSLOAD signal, to shift the data (System ID, Unit ID, and Command) out through the RF remote or a wire connection to the main control unit, as will be explained below in further detail.

Figure 5G:
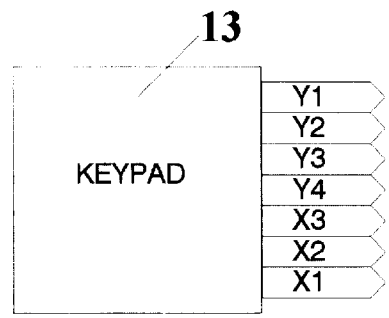
Figure 5G:
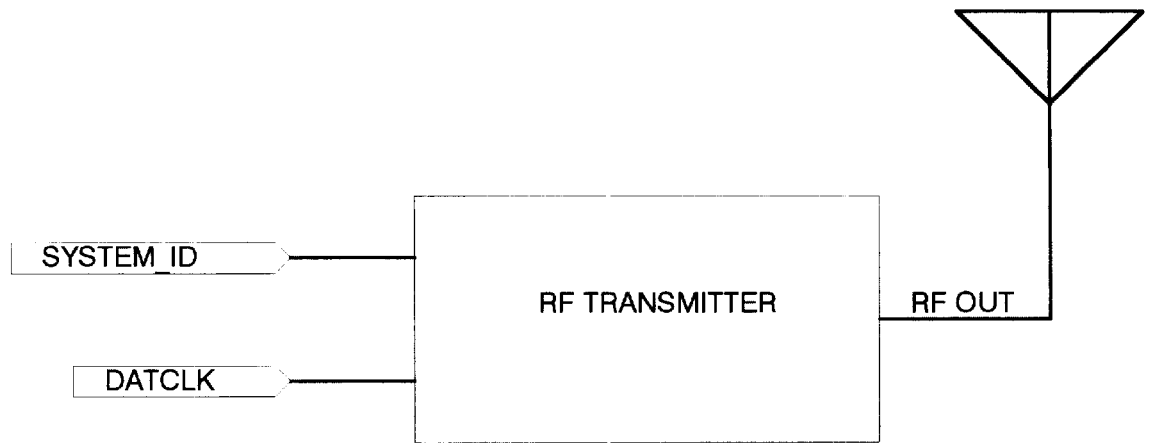
Figure 5B:
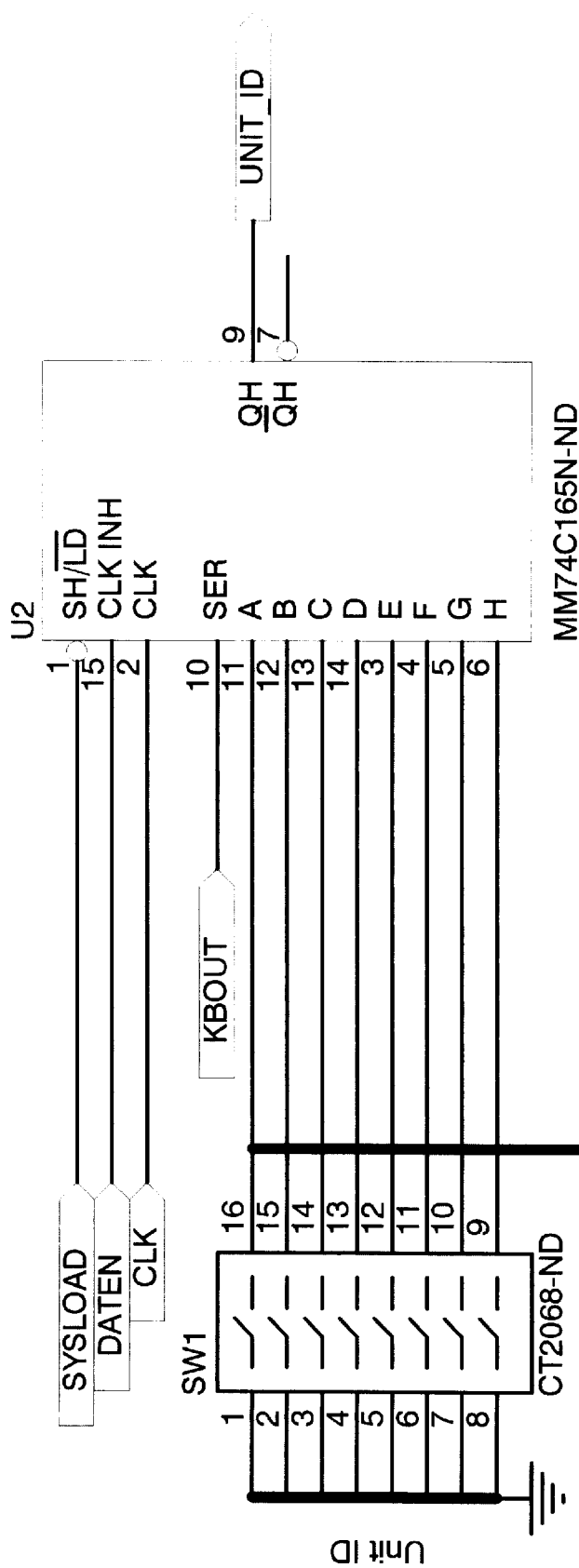
Figure 5C:
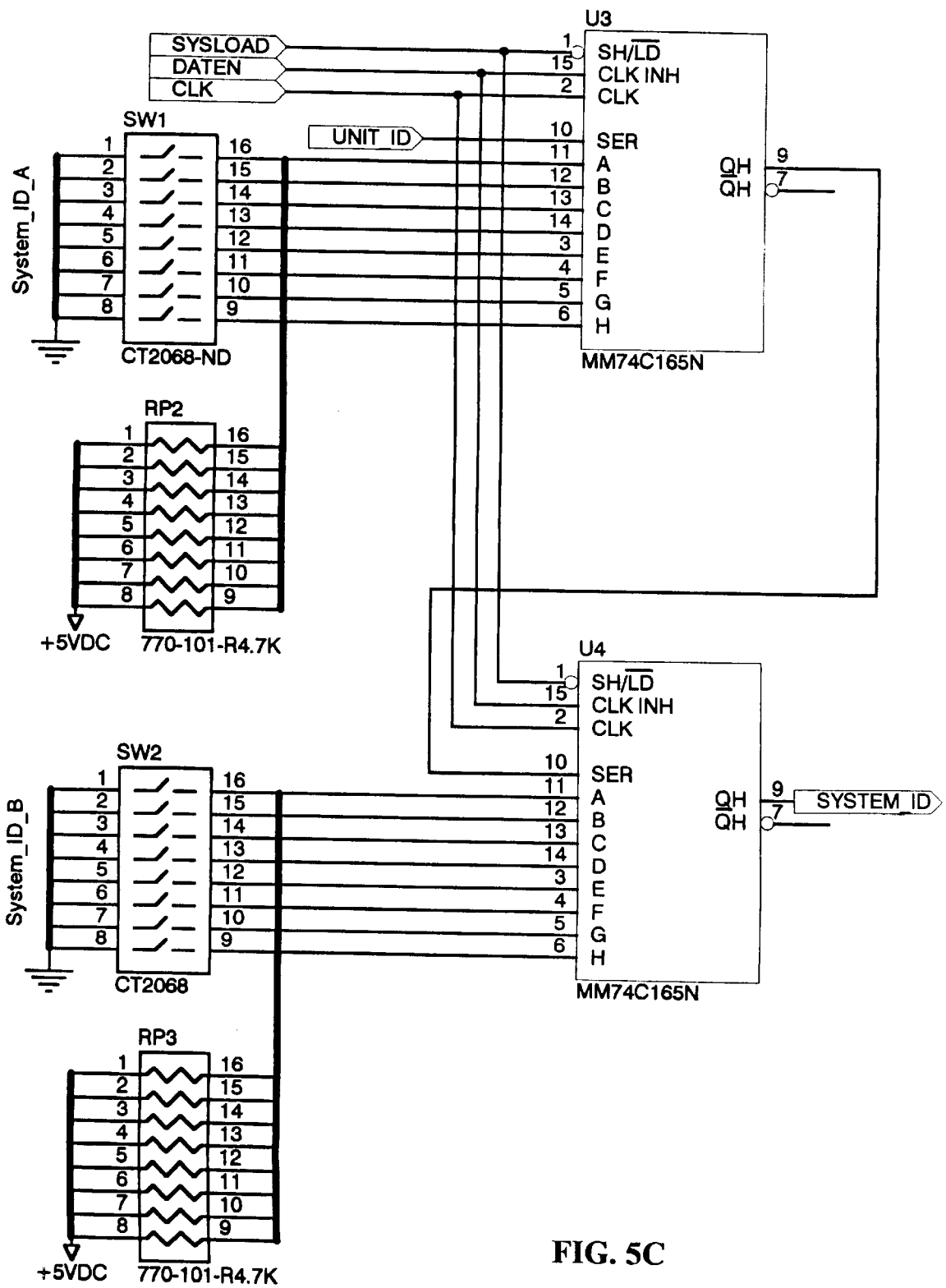

With reference next to FIGS. 5B and 5C, which show, respectively, the Unit-ID buffer and the System-ID Buffers of the remote control unit, the Parallel-Load 8-Bit Shift Registers, U2, U3, and U4, are loaded with the System and Unit ID when the SH/LD pins are low (SYSLOAD). An example of a suitable serial-out register for these registers is a 74HC165N integrated circuit chip. Additional shift registers may be added (by connecting the output QH to the serial input, SER, of the following stage) to lengthen the ID words. The Registers are comprised of D flip-flops with D inputs shown as A through H with a common clock and strobe signal. The inputs A through H of the registers are connected to DIP switches (a suitable example being a CT2068), or PROM's, so that when SYSLOAD is low the ID's are loaded in the flip-flops. In this example, the Unit ID is 8-bits long, and the System ID is 16-bits long. Serial shifting is inhibited while SYSLOAD is low. The KBOUT line from register U7, which holds the 4-bit command, is connected to the SER input of U2. The UNIT_ID is connected to U3, and the output of U3 is connected to the serial input of U4. The SYSTEM_ID is wired directly to RECDATA in the main control unit or is used to modulate a low level RF transmitter, this second option being shown in FIG. 5G. When SYSLOAD is high and DATEN is low, data is shifted out on the rising edge of the clock (DATCLK) signal. This will be explained in further detail below.

The low level RF transmitter of FIG. 5G is modulated by the data and by the clock signal DATCLK. The transmitter uses, for example, a frequency shift keying such that two frequencies are created by the logic high and low clock signals and two frequencies are produced by the logic high and low signals from the data. Each is used to modulate a carrier for infrared or RF emission. A suitable RF emission is in the Radio Control Radio Service band as defined by the Federal Communication Commission in the UHF band.

With reference, now, to FIG. 5D, which shows the Control Logic of the remote control unit, when the keypad is pressed, KBSTROBE will go high, as explained above with reference to FIG. 5A2. The flip-flop U9A will be cleared; in other words, the output Q of U9A will be forced to a logic low. The signal SYSLOAD will go low, since the complementary output of U9A is high and U9B is high. One clock cycle later, U9B output will go low. The SYSLOAD signal will go high. The SYSLOAD signal will have loaded all parallel load ID and command registers when the signal is low. The next clock cycle will force the output of U5A low on the rising edge of the clock. This will start the Data Clock counter U14 to count upwards from 0. A suitable example of the Data Clock counter U14 os a 74C193 integrated circuit chip.

The function of the Data Clock timing circuit is to allow the clock (CLK) signal to be gated to the up counter until all of the data has been shifted out of the serial registers. The SYSRESET signal (whose origin will be explained below) presets flip-flops U5A, U8A and B, U9A and B, and U13A to a high state. When KBSTROBE goes high (key pressed), U9A output will go low. The high complement output (pin 6) forces SYSLOAD to go low. One clock cycle later U9B will go low, forcing the SYSLOAD to go high. The SYSLOAD pulse is connected to all serial registers and is used to strobe data on the A through H lines into the internal registers. The UP counter U14 is loaded with 0 on the negative edge of SYSLOAD. When the DATEN signal is a logic low, the CLK signals are gated through the AND gate U6B to the binary UP/DOWN counter U14. The CO output will go low for one clock cycle after the counter has incremented from 0 to 15. This will set the output of U8A to a 1. After one clock cycle the second time, the second flip-flop U8B will be set low. The last D flip-flop U13 will change state on the second set of sixteen clock cycles. This will provide a low DONE signal to the System Reset U10. Subsequently, the SYSRESET line will go low forcing U5A output (pin 6) low, thus bringing DATEN high, disabling DATCLK, and disabling serial shifting in the registers of the Command and ID Buffers.

Figure 5F:
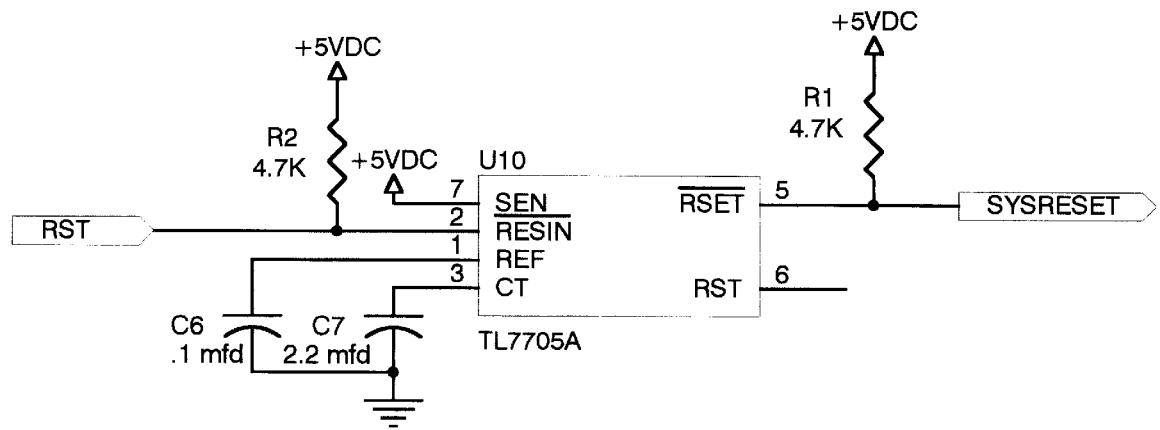
Figure 5E:
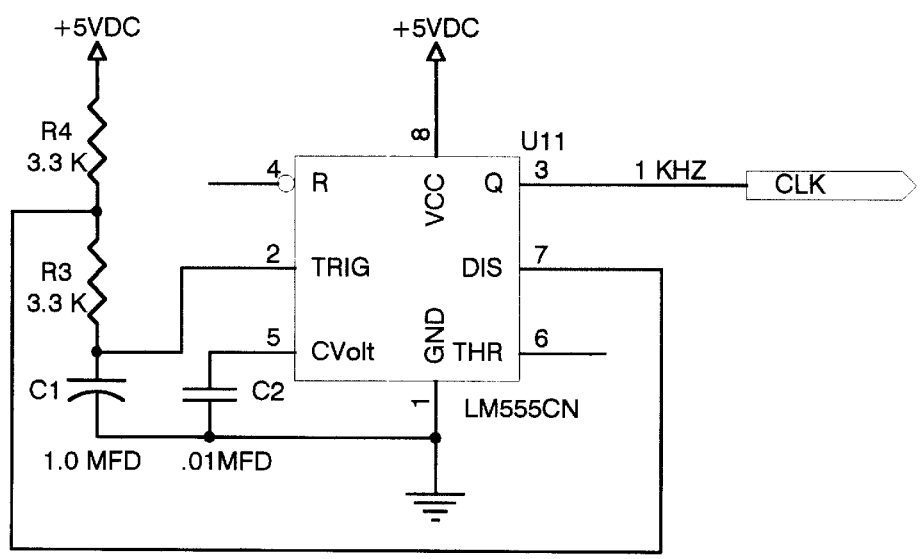

FIG. 5E shows the Clock U11 of the remote control unit. The Clock is an astable multivibrator LM555CN, by way of example. The frequency of the clock is dependent upon the passive components (resistors and capacitors) around U11. The particular components shown in FIG. 5E provide a frequency of the CLK signal of approximately 1 Kilohertz, this just being one of any number of suitable CLK frequencies.

FIG. 5F shows the system reset U10 of the remote control unit. The system reset is provided through a supply voltage supervisor U10, a suitable example being a TL7705A. During power-up, the RSET output is low for a delayed time dependent upon the passive components around U10. When RSET is low, then the signal SYSRESET is low, forcing the flip-flops to be preset to logic 1 outputs.

MAIN CONTROL DETAIL

Figure 6A:
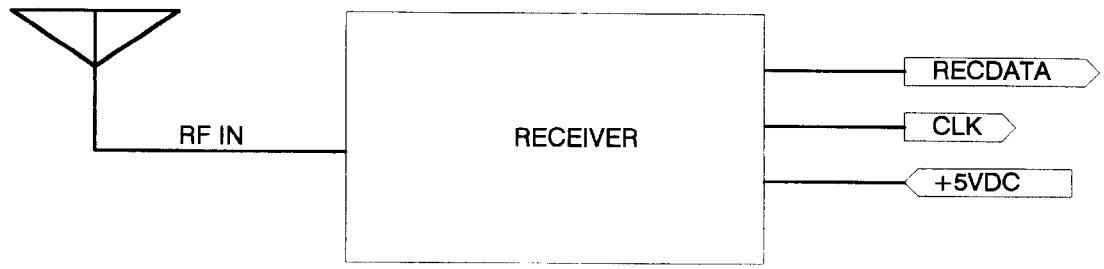

In the particular embodiment of the invention presented here, the main control unit is accessed using the remote control unit. With reference first to FIG. 6A, this shows an antenna which receives transmissions from the transmitter of the remote control unit. The incoming analog signal from the antenna is processed in the RECEIVER and output as two digital signals RECDATA and CLK. It will be noted, thus, that the main control unit does not have its own clock, but, rather, uses the clock of the remote control unit, in the form of the signal DATCLK. Rather than transmit RECDATA and CLK by radio transmission, the digital signals SYSTEM_ID and DATCLK may instead by directly hard-wired to main control unit to provide, respectively, the RECDATA and CLK signals for the main control unit.

Referring next to FIG. 6B, this shows the Main Command Buffer and Comparator of the main control unit. The data received is connected to U1 (RECDATA), an 8-bit Serial-In, Parallel-Out shift register. A suitable example of this register is a 74HC595N integrated circuit chip. The data is shifted into the register of U1 on the positive edge of the clock. This continues for receipt of 32 bits, until CLK ceases. The first 24 bits leave U1 on the COM_OUT line, and the last 8 bits, which contain the command, remain in U1 as its final latched output. Comparators U2 and U3 will compare the latched output of U1 to the Q inputs. The Q inputs are shown as SW3 and SW4 DIP switch inputs, although such can be additional registers loaded by a programmed device (PROM). SW3 is the encoded forward command. The output of U2 is low when the latched data on U1 matches SW3. This is the condition to force FWD_CMD low. Additionally, SW4 is encoded with the reverse command. The output of U3 (REV_CMD) is low when the reverse command has been latched by U1. As an example, if switch SW3 positions 1,4 and 7 and SW4 positions 2,3, and 8 are closed, the forward and reverse commands would be 86 hex and 79 hex, respectively. The output of U1, COM_OUT, is connected to the input of U4. While the clock signal is present on U1, data is serially clocked into second serial shift register U4 (FIG. 6C).

Figure 6C:
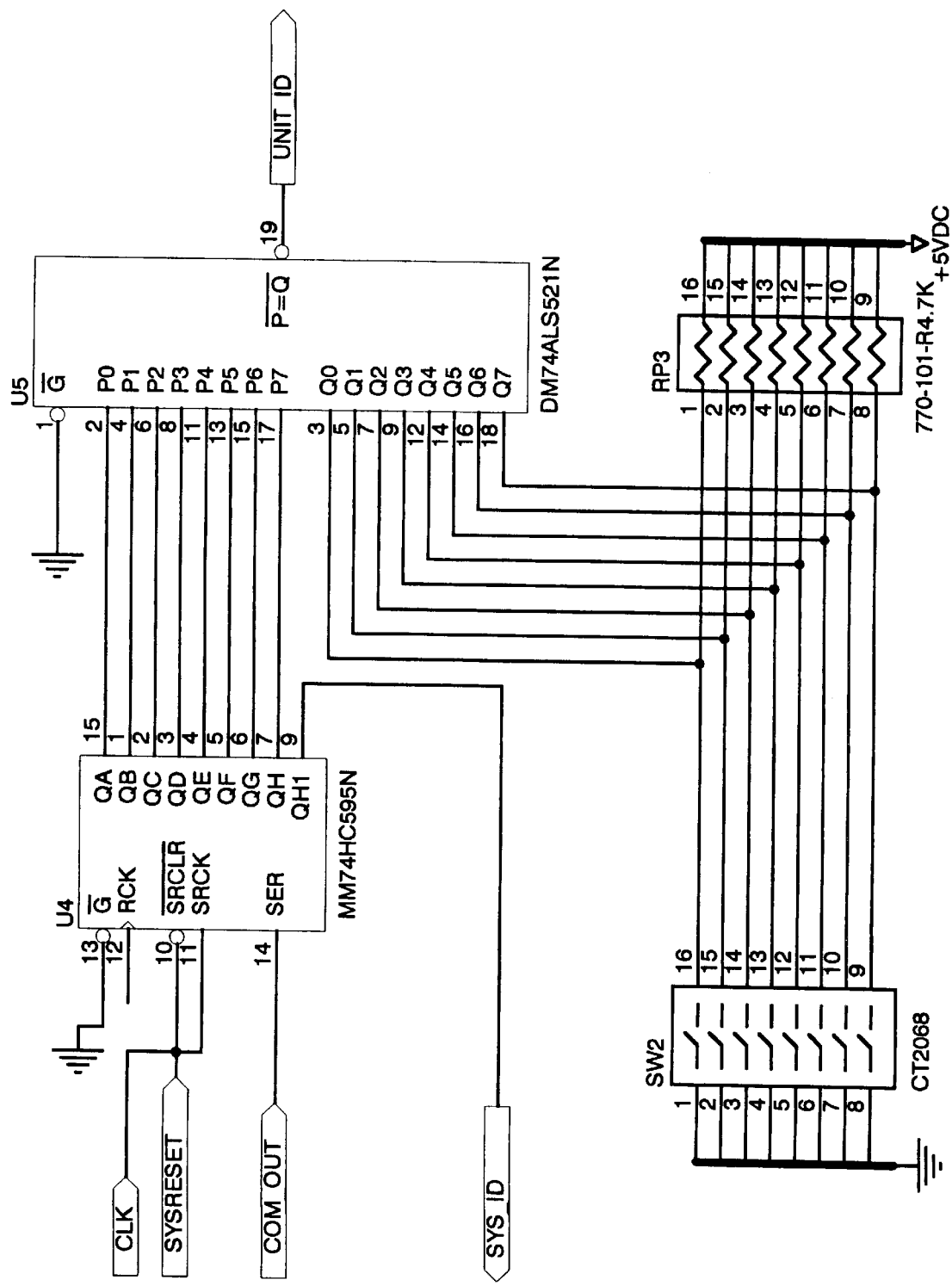

With reference now to FIGS. 6C and 6D, these show the Main Unit- and System-ID Buffers and Comparators. First, in FIG. 6C, the data from U1 on COM_OUT is connected to input SER of U4, an 8-bit Serial-In, Parallel-Out shift register. The data is shifted into the register on the positive edge of the clock. The device has a serial output QH1 used for cascading the first 16 bits of the signal RECDATA into registers U6 and U7 of FIG. 6D. The clock signal terminates after the last data bit is transmitted. The comparators U5, U8 and U9 will compare the latched outputs from U4, U6 and U7 to the Q inputs. The Q inputs are shown as DIP-switch inputs, although they can be from an additional register loaded by a programmed device. If the contents of U4, U6, and U7 agree with the Q inputs, then the outputs of the comparators U5, U8, and U9 will go to a logic low.

Figure 6E:
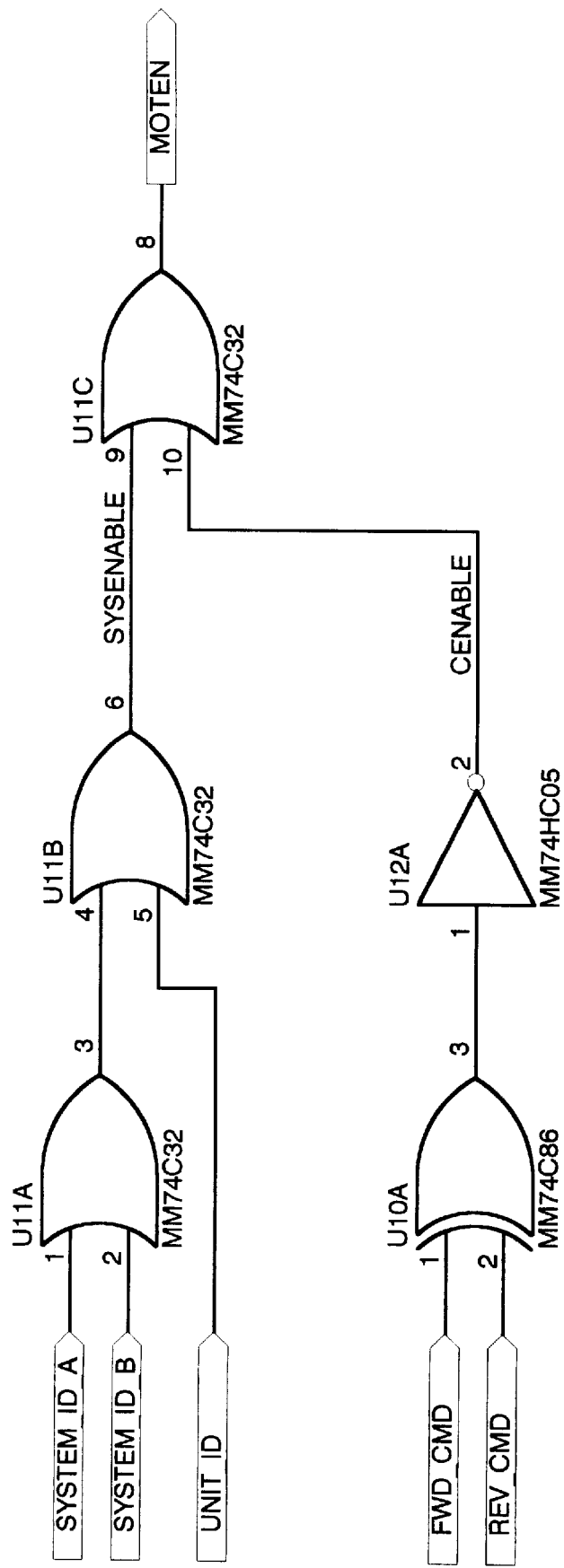

Referring now to FIG. 6E, this shows the Main Motor Drive Enable of the main control unit. The comparator outputs from the SYSTEM_ID_A and SYSTEM_ID_B are low when the 16 bits received are equal to the contents of switches SW1 and 2. The UNIT_ID is low when the received UNIT word matches SW3. Therefore, SYSENABLE in FIG. 6E is low when the main control unit has been properly addressed by the remote control unit. The CENABLE signal is low when the FWD_CMD or REV_CMD is low but not both. The MOTEN is low when SYSENABLE and CENABLE are low, indicating that the data is correct for the forward or reverse command received.

With reference next to the Main Motor Drive Unit, as shown in FIG. 6F, the signal MOTEN from FIG. 6E is applied to an astable multivibrator U13. The output at pin 3 is high when a negative going trigger pulse is at the input on pin 2. The output is low for approximately 30 seconds. Any additional trigger signals will not retrigger the multivibrator. This will preclude the system from processing two commands sent close together and will additionally limit energization of the motor to a time determined by the passive components around U13. The SYSRESET is produced by complementing the output of U13; this will reset the 8-bit shift registers U1, U4, U6, and U7.

Voltage is supplied to the motor by engaging relay K1 through S5. The switch S5 is a speed sensor that is open if the automobile is moving above 5 miles per hour. This is a safety feature which precludes setting of the antitheft device of the invention when the vehicle is significantly in motion. The forward motor current flows through limit switch S1. If REV_CMD is high and FWD_CMD low, K2 will not be energized, thereby allowing the proper polarity of voltage to be applied to the motor to cause the motor to move in the forward direction until the circuit is broken by LS1. When the reverse command has been received, then REV_CMD is low and relay K2 is energized, thereby causing the reverse polarity to be applied to the motor until the limit switch LS2 is broken. This is the condition shown in FIG. 6F. The limit switches LS1 or LS2 are open when the connecting block 5 (FIGS. 2 and 4) has moved the required distance forward or reverse respectively.

Figure 6G:
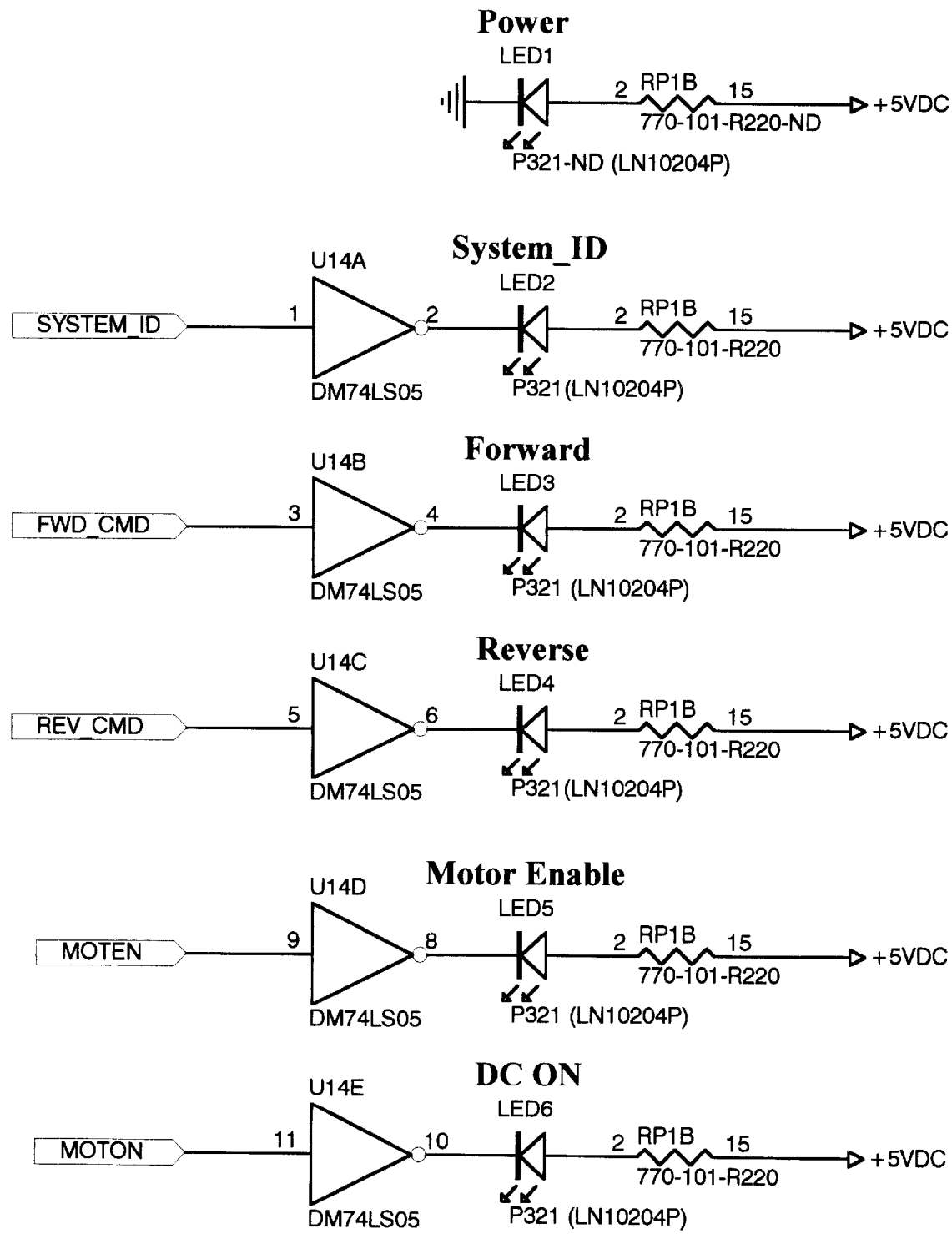

FIG. 6G shows indicator lamps which glow, for instance, when the signals MOTEN, REV_CMD, AND FWD_CMD are high, respectively, to indicate the condition of the system to the operator.

Figure 10:
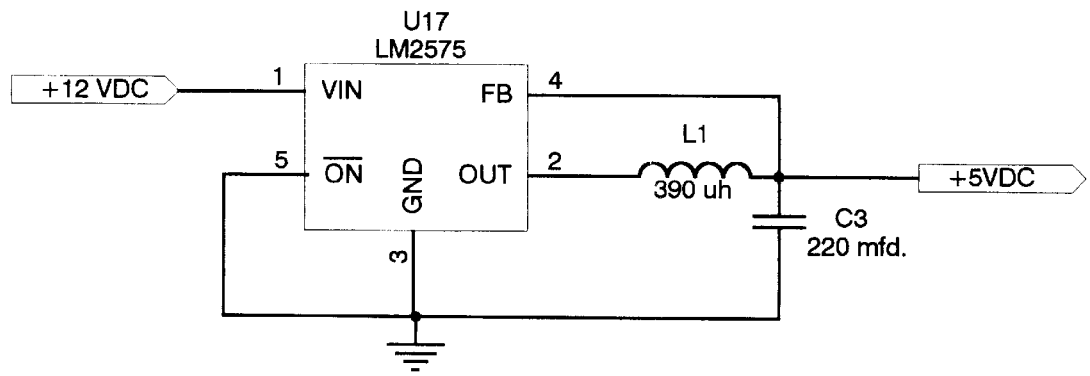
FIG. 10 is a power supply for the electrical system of FIGS. 5 and 6.

FIG. 10 shows a power supply for providing the 5-volt power from a 12-volt vehicle battery system for the various integrated circuit chips of the remote control unit and the main control unit. The power supply of FIG. 10 uses a Step Down Voltage Regulator, such as an LM2575, to convert the 12-volt DC source to a 5-volt supply. The regulator can accommodate a wide input voltage range. The inductor and capacitor filter network minimizes ripple from the switching supply.

For purposes of illustration, ELECTRICAL SYSTEM 1 as above disclosed uses the pressing of only one key per command. The system may be expanded so that multiple key strokes are required to activate a command. An additional set of storage registers and comparators is used for each additional key stroke used for a command. In other words, if there are four key strokes required to activate a command, then there will need to be four eight bit registers and comparators. After each command character is received, the contents of U1 in the remote control unit is strobed into an additional register. This is repeated until a special command termination key, such as the "*" key, is pressed. The termination key causes the system to enable the comparators to activate the motor.

ELECTRICAL SYSTEM 2

Figure 11:
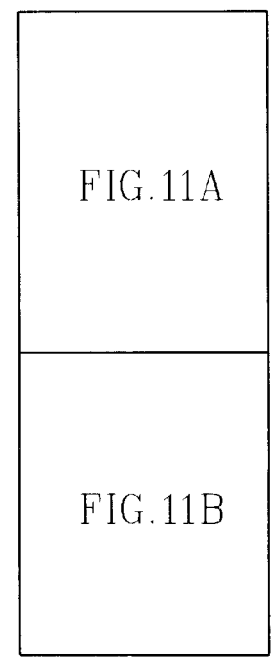
FIG. 11 shows the relationship of FIGS. 11A and 11B to one another.
Figure 11A:
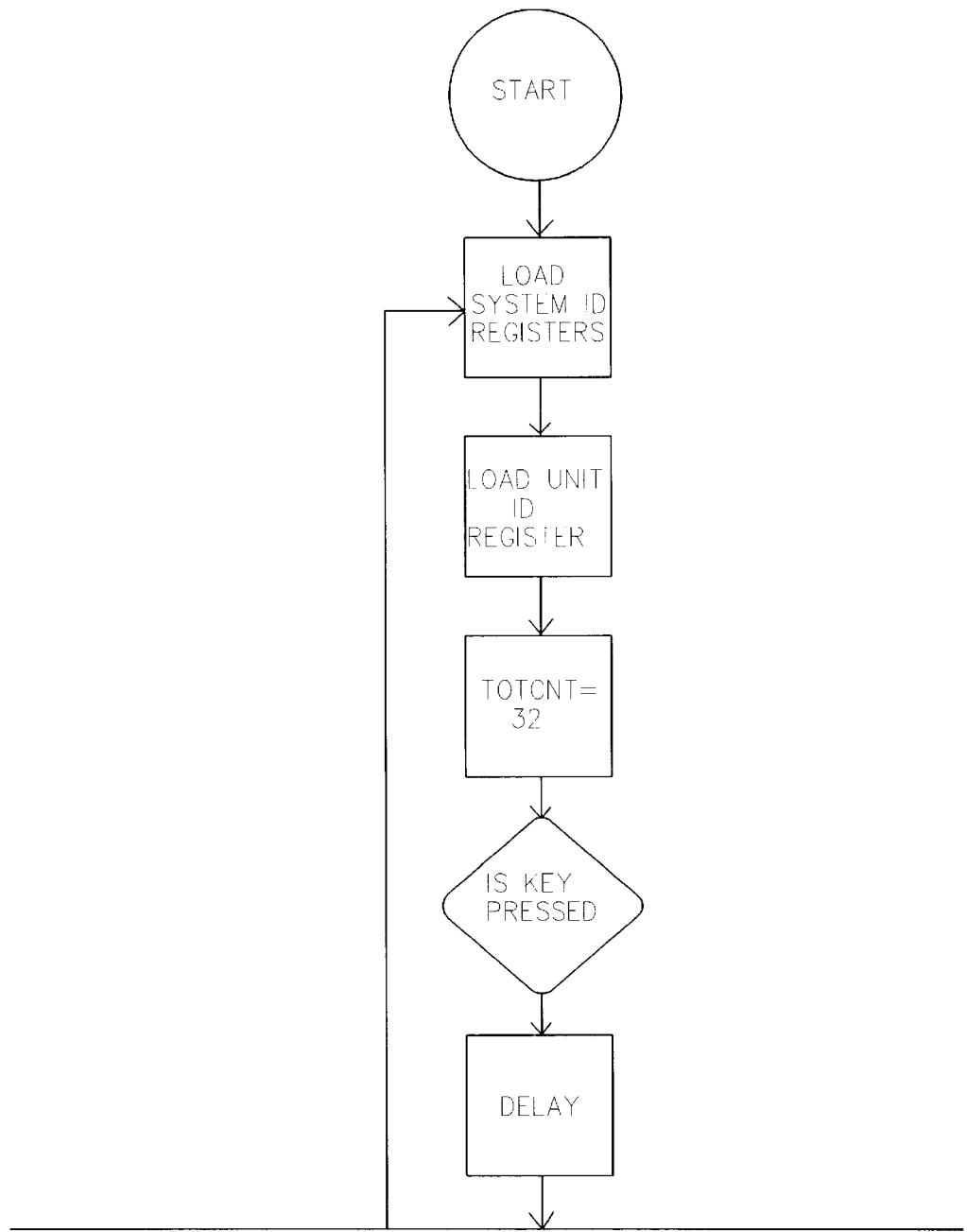
FIGS. 11A and 11B show a program flowchart for the remote control unit of a second electrical system of the invention.
Figure 11B:
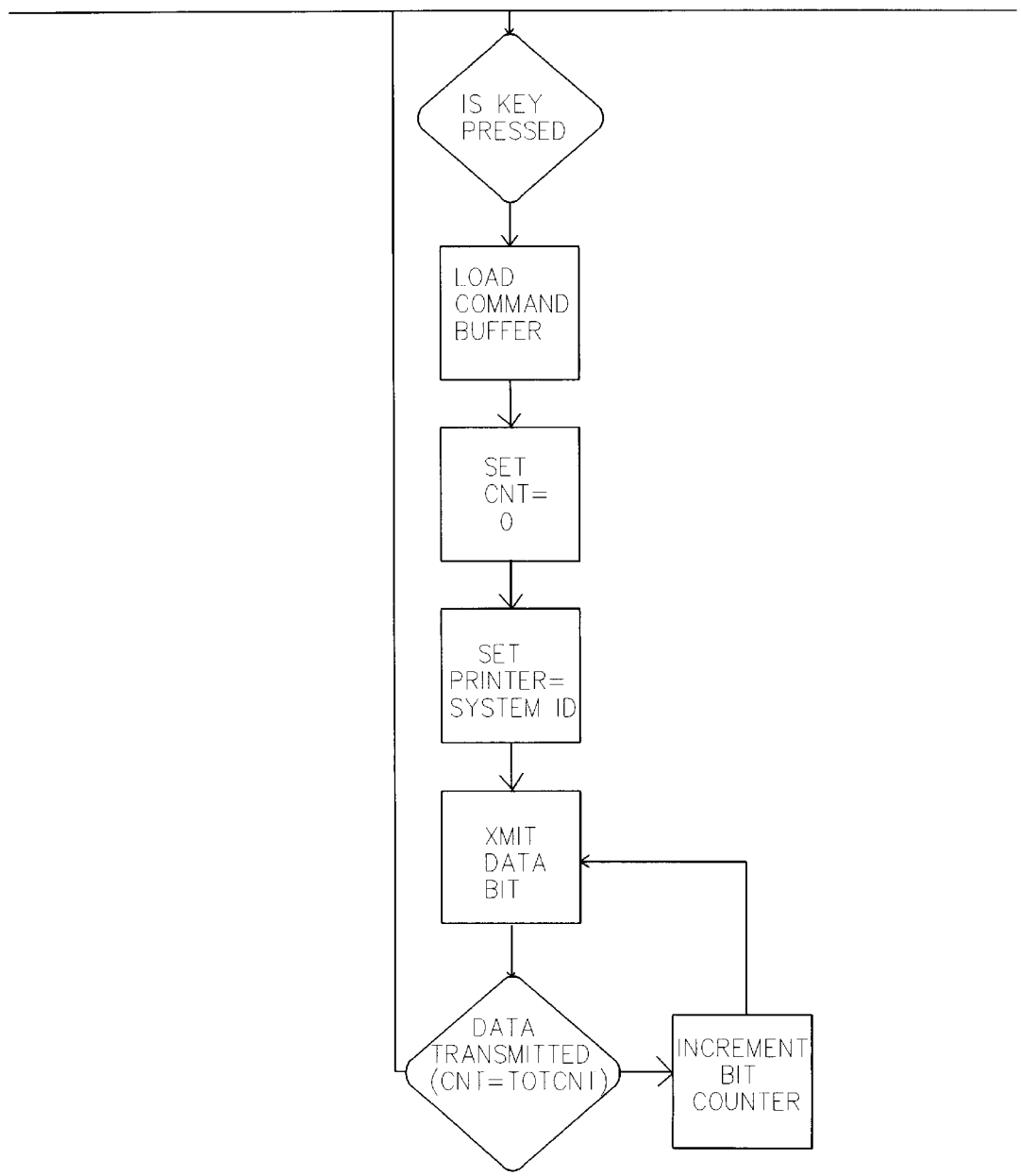

While the logic circuit of ELECTRICAL SYSTEM 1 represents one mode of carrying out the electrical part of the invention, it is also possible to use microcontrollers in the remote control unit and in the main control unit as single tasking machines. The programs may be written in "C" language to facilitate system maintenance in the future. A simplified flow diagram of the program within the Main Unit is illustrated in the flow diagram of FIGS. 9–9B, while FIGS. 11–11B show the diagram for the remote control unit.

Figure 12:
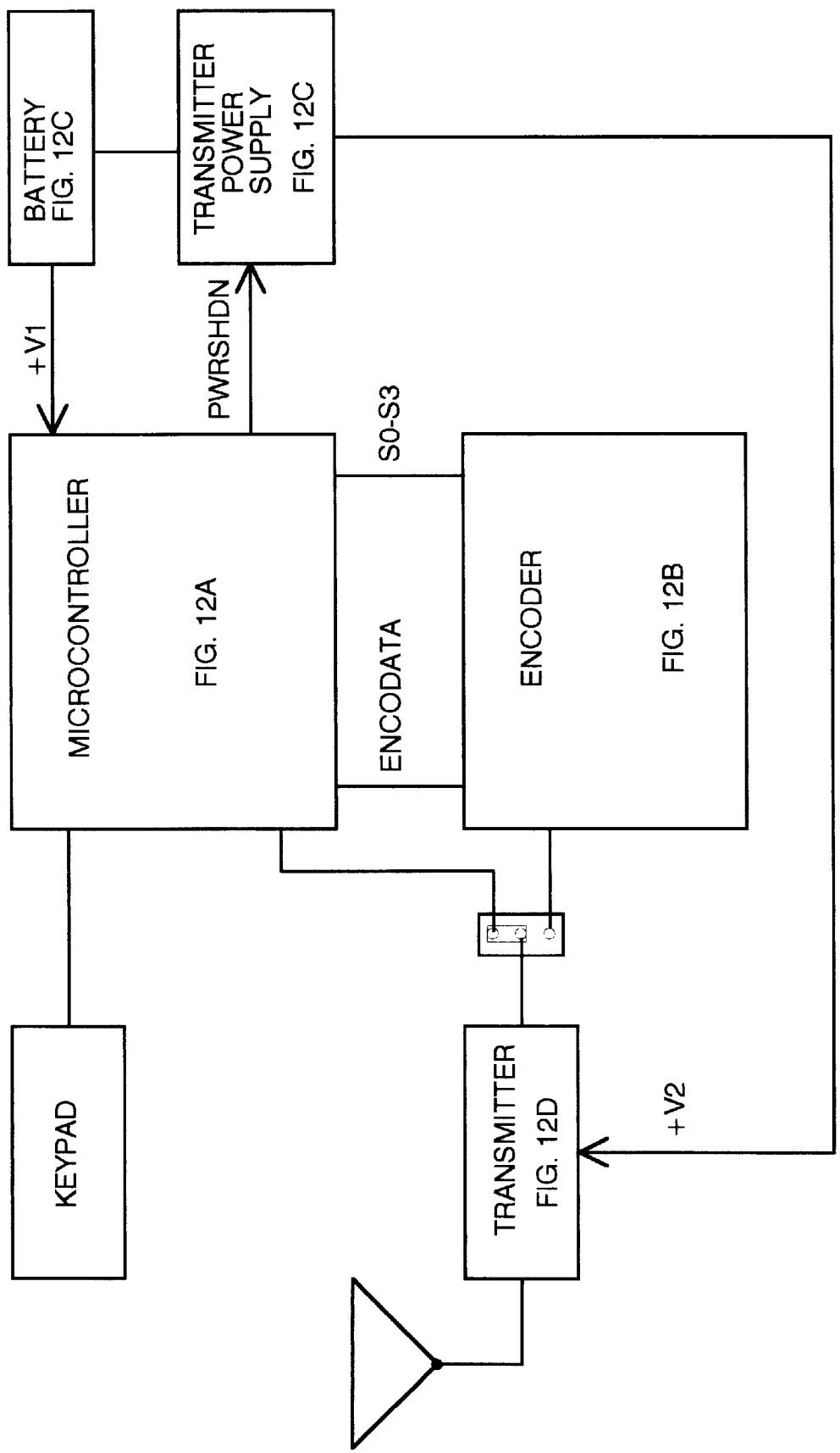
FIG. 12 is a high level, or block, diagram of a remote control unit of a second electrical system of the invention.
Figure 13:
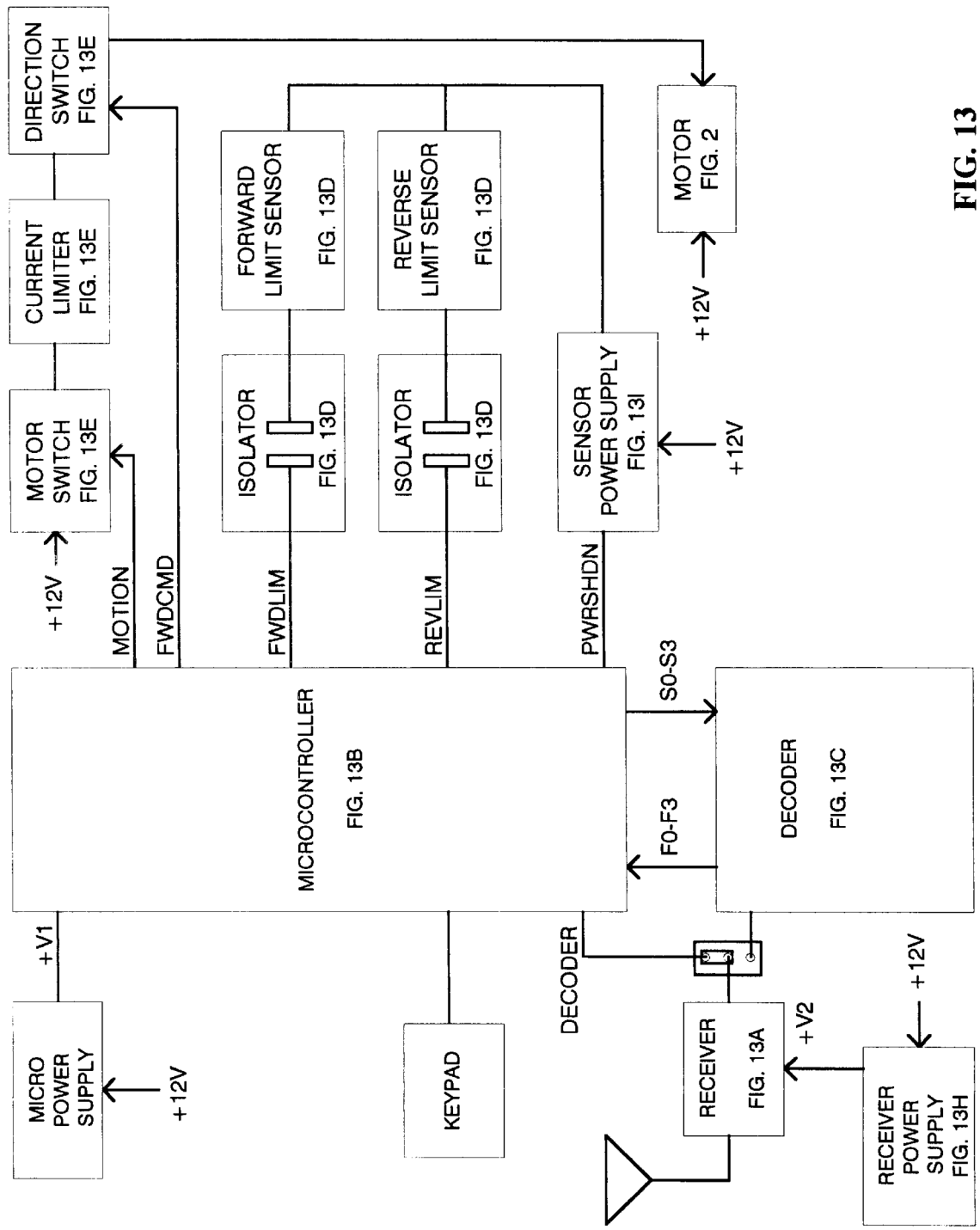
FIG. 13 is a high level, or block, diagram of a main control unit of a second electrical system of the invention.

The micro-controller-based system, like the logic circuit of the previous system, uses remote and main control units. With reference to FIG. 12, the remote control unit contains a keypad, micro-controller, encoder, power supplies, and transmitter. Further details concerning the remote control unit will be explained below in the section REMOTE CONTROL DETAIL. With reference to FIG. 13, the main control unit has a receiver, micro-controller, decoder, isolated limit switches, motor drive components including motor switch, current limiter, and direction switch, optionally a keypad, and three power supplies. Further details concerning the main control unit will be explained below in the section MAIN CONTROL DETAIL.

REMOTE CONTROL DETAIL

With reference to FIG. 12A, chip U1 of the remote control unit is a micro-controller, in this example an integrated circuit PIC16C73 manufactured by Microchip Technology Inc. of Chandler, Ariz. Operating speed of the microcontroller set on the basis of the circuit connected across the ports OSC1 and 2, including a 32.768 kHz crystal.

A keypad like that in ELECTRICAL SYSTEM 1 is used in this embodiment also. Its presence is indicated in FIG. 12A by the labeled connectors RB0_DATA to RB6_DATA joined to header J1. The possibility of a larger keypad is provided by the labeled connector RB7_DATA. The labeled connectors RB0_DATA through RB7_DATA from the keypad connect each through 100 ohm resistors to pins 21 to 28 of the micro-controller, thus ports RB0 to RB7.

Exactly the same keypad coding may be used for ELECTRICAL SYSTEM 2 as used in ELECTRICAL SYSTEM 1, FIGS. 7 and 8. Unlike the case for ELECTRICAL SYSTEM 1, where an encoder (U1 in FIG. 5A2) is used to remove any minute bounce or noise in the contacting of the keys, here, the keys are connected directly to the micro-controller, and coding and bounce are handled by suitable software. Bounce may be handled, for instance, for software-directed multiple reading of the line connected through a port of the micro-controller, until the reading has stabilized. Software for the coding may be accomplished by a programmer following the guidelines of FIGS. 7 and 8.

For extended battery life, a wake-up mode of operation may be used, such that the micro-controller becomes active upon sensing a key stroke. See Microchip's application note AN528 of 1993, by Stan D'Souza, DS00528B, entitled "Implementing Wake-Up on Key Stroke", which is incorporated here by reference. FIG. 12A shows line RB0_DATA from the keypad as a representative one of the lines connected to the MCLR port of the micro-controller in the manner taught in AN528. The use of this one line RB0_DATA can be sufficient, if the user is instructed to press one of the keys affecting RB0_DATA, rather than just any key.

Each key stroke leads, under software control, to output of a unique 4-bit code on ports RA0_RA3 of the micro-controller. These four signals making up the code pass in parallel through 100 ohm resistors to the connectors labeled S0IN to S3IN in FIG. 12A. These may appear as well on header J4, and, before transmission, may be further processed for encryption.

The problem is that, if the messages sent to the main unit have repeatable bit patterns, the device may be capable of being reverse engineered by people using scanners. Microchip's Code Hopping devices (encoder/decoder) are a solution to this problem. They use a bit pattern that will not repeat in several years. Thus, communication between remote control unit and main control unit in embodiments utilizing this technology has varying digital words. This technology is described in the following publications of Microchip, all incorporated here by reference: Technical Brief TB001, "Secure Learning RKE Systems Using KeeLoq Encoders", by Chris R. Burger, DS9100A, 1996; Technical Brief TB003, "An Introduction to KeeLoq Code Hopping", by Kobus Marneweck, DS91002A, 1996; product data HCS300, "KeeLoq Code Hopping Encoder", DS21137D, 1996; product data HCS360, "KeeLoq Code Hopping Encoder", DS40152B, 1996; product data HCS509, "KeeLoq Code Hopping Decoder", DS40152B, 1996; and U.S. Pat. No. 5,517,187. This technology can either be applied using integrated circuit hardware or else by software by embedding the Code Hopping algorithm in the micro-controllers. The circuitry disclosed here can handle both alternatives.

Other encrypters can be used, such as National Semiconductors' Rolling Code Generator. The intent is to encrypt the message to disallow improper use of the security device.

A characteristic of the encoders/decoders of these encrypters is that the encoders and decoders to be paired are initially operated in a mode wherein they "learn" one another. This is explained in the Microchip literature incorporated by reference. This increases the degree of security, because then only an encoder which has learned a particular decoder can be used to communicate with that encoder.

Figure 12B:
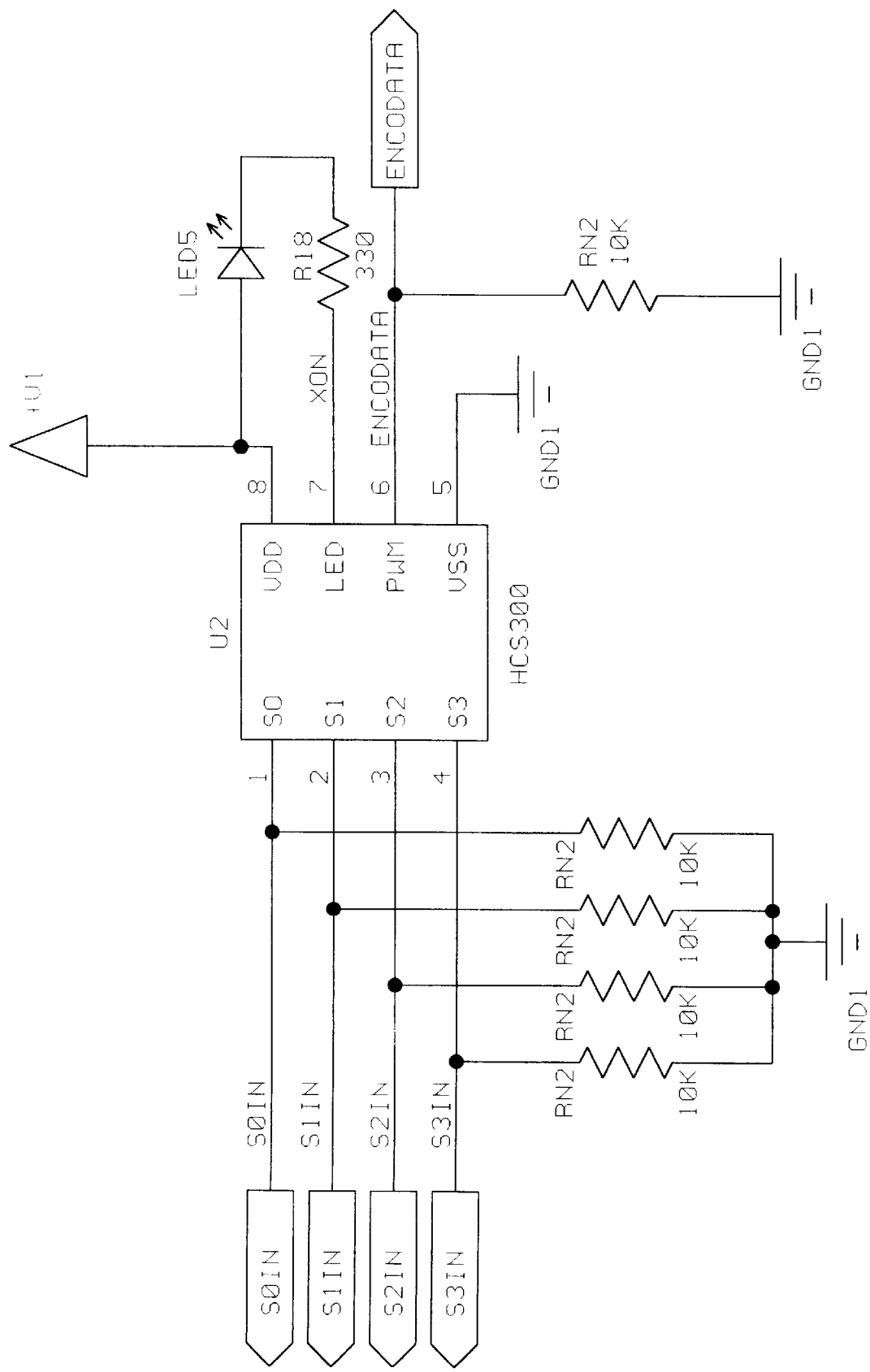

FIG. 12B shows the micro-controller data being fed into an HCS3XX Microchip encoder, for instance an HCS300, or an HCS360, from connectors S0 to S3IN leading to ports S0 to S3, pins 1–4. The encrypted data leaves serially from the pulse width modulation port PWM, pin 6, through the connector labeled ENCODATA. The encrypted data also appears as a pulse width modulated digital signal in the form of infrared (IR) radiation emitted from diode LED5, which may be received directly by an IR receiver in a main control unit.

In the case of the HCS300 chip, the signal ENCODATA can be made to issue in two modes: in transmission format (PWM) as explained in Section 4.1 of the above referenced DS21137D, or in synchronous transmission mode as explained in Section 4.2 of the same publication.

Referring back to FIG. 12A, the serial signal ENCODATA can concomitantly be used in two ways. It can modulate the transmitter directly using transmission format (PWM). This is enabled when header J3's pins 2 and 3 are jumpered. The second method allows the PIC micro-controller chip 16C73 to modulate the transmitter after the encoder is read serially, enabled when J1's pins 1 and 2 are jumpered.

In this second method, the signal ENCODATA is fed in synchronous transmission mode into port RC4 at pin 15 of the micro-controller chip U1, where it is processed by software from pulse width digital data into digital data where the 1's and 0's are encoded by voltage level, and then further processed by software and emitted as a serial, pulse width modulated, digital signal at port RC1, pin 12. One reason for choosing to run the signal from the HCS300 through the micro-controller, before sending it to the transmitter, is that one can use software to change the baud rate of the signal to a speed more suitable for the transmitter. Other signal processing, such as adding additional information to the signal, then also becomes possible as required.

As explained in the above referenced publication DS21137D, the synchronous transmission mode of the HCS300 chip is activated when S1 or S2 is set, or held high, when S2 or S3 logic level goes low. Reference FIG. 4.3 in DS21137, synchronous transmission mode. The code word is shifted out of the device on the falling edge of a clock signal (clock is applied to S2 or S3 pins) Reference section 4.2, synchronous transmission mode, in DS21137. The code word consists of 18 bits sync counter, 16 bits of data, 26 bits serial number, 4 bits for button code, 2 padding and 16 bits reserved. Reference FIG. 4—4: Transmission Word Format during synchronous transmission mode.

With reference to FIG. 12A, a suitable transmitter is connected to pin 2 of header J2, to receive the signal XMITDATA. Pin 4 of J2 receives an enable/disable logic signal XMITEN from the micro-controller's port RA5 at pin 7, to provide control of transmissions from the transmitter by turning the transmitter on and off. XMITEN has a status light LED3 connected to it, so that it is visible whether it is energized or not. XMITEN may, or may not, be used, depending on the particular transmitter chosen.

The transmitter is preferably a low level transmitter and is modulated by the data. The data fed to the transmitter is used to modulate a carrier for RF emission. An infrared emission may, as well be used in the transmitter, although, as indicated above, infrared emission may be done directly from an LED attached to the HCS encoder chip in the circuit of FIG. 12B. A suitable RF region is in the UHF band between 260–470 Megahertz as defined by the Federal Communication Commission. The method of modulation is pulse width modulation, although other modulation techniques may be used. The repetition is less than 2.5 Kilo-baud (bits per second). In other words the carrier is gated on and off by the pulse width modulation data.

Power, data, ground, and control may thus be supplied for the transmitter through plug J2. Voltage is supplied on pin 1, ground is on pin 3. The data is supplied on pin 2. Pin 4 supplies an additional line for transmitter control when required. The transmitter has, for instance, a pulse width modulation 8 millisecond repetition rate. A logic low transmission is a pulse width of 2 milliseconds. A six millisecond pulse represents a logic high transmission.

Figure 12C:
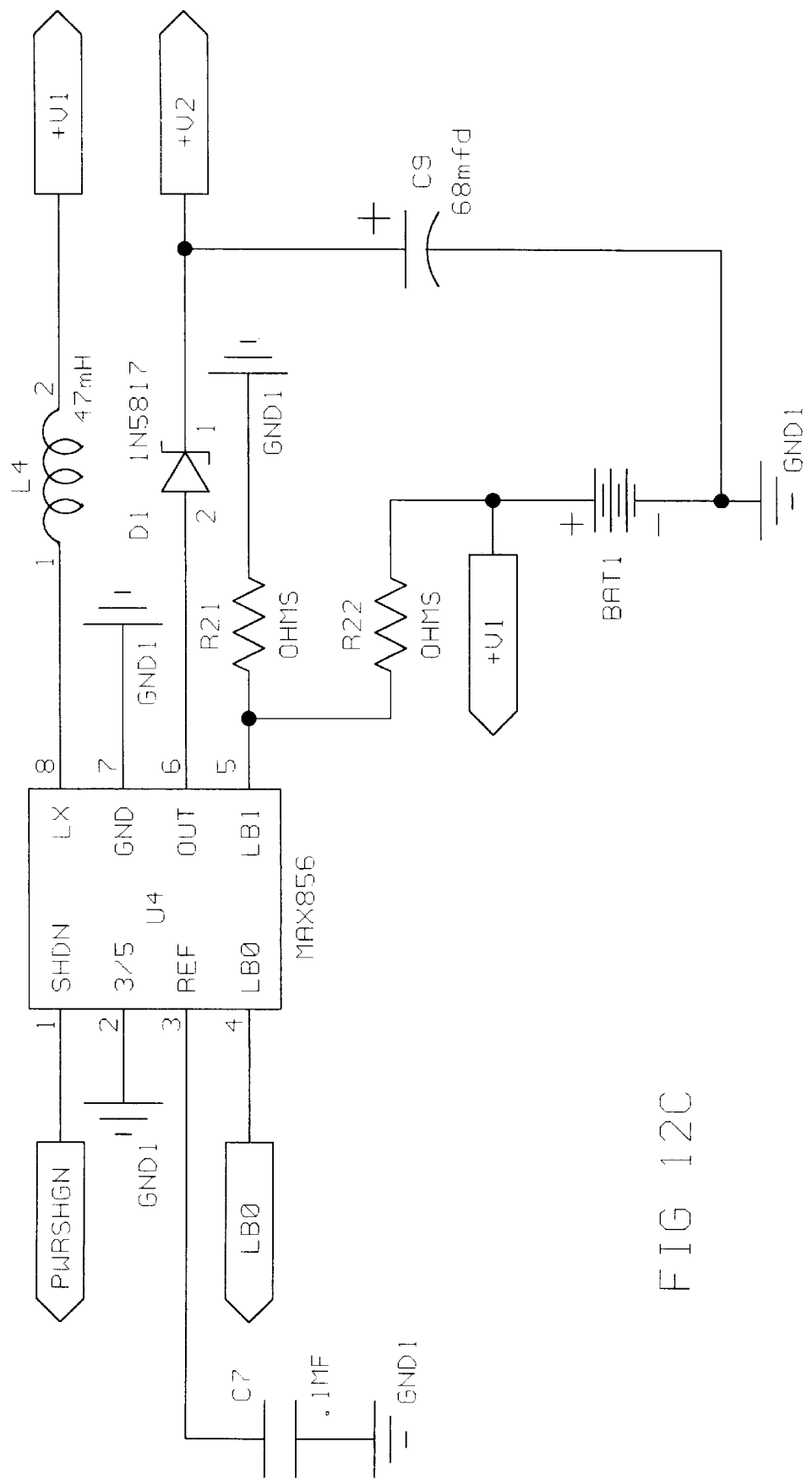
Figure 12D:
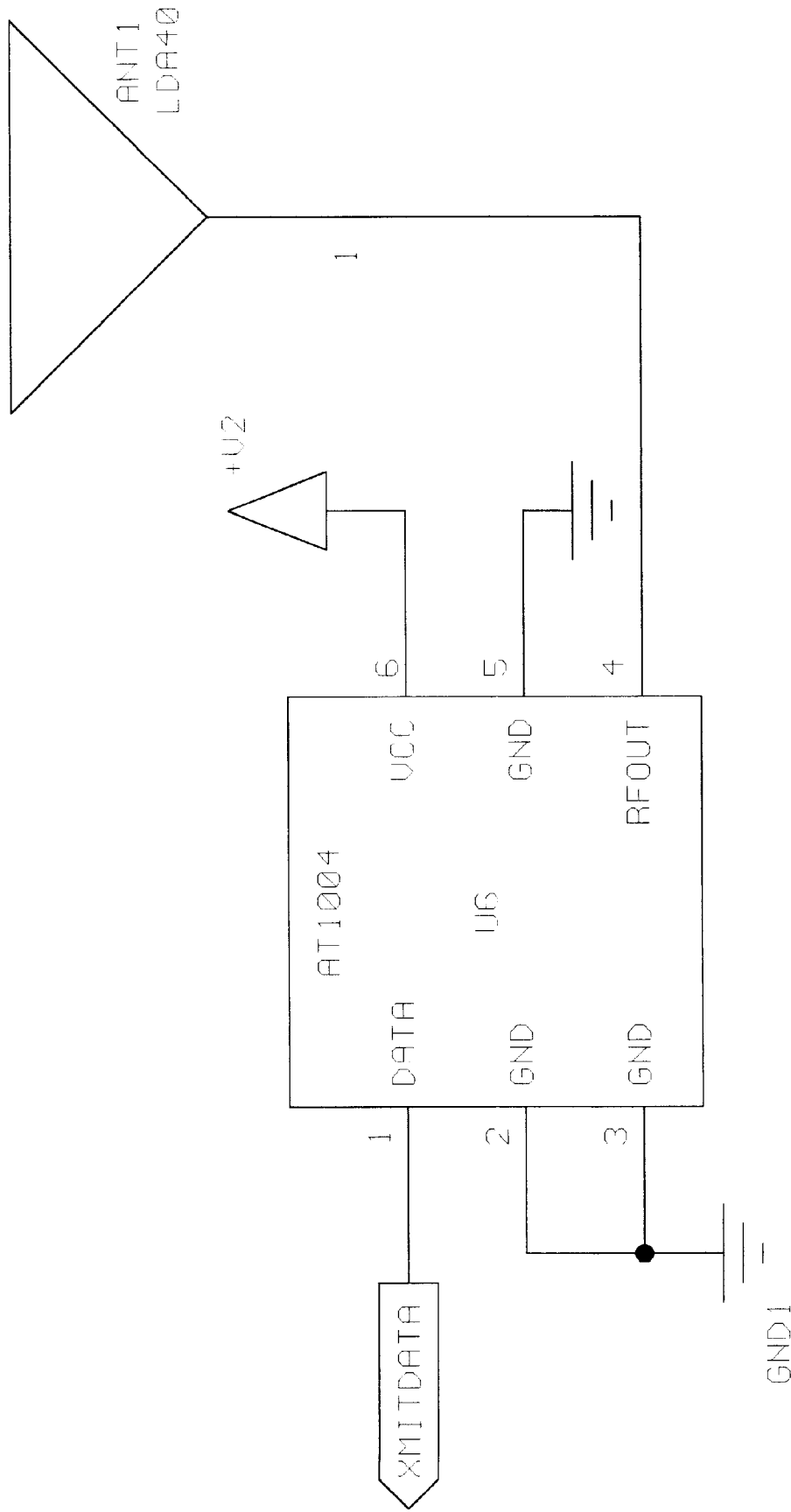

In FIG. 12D, transmitter U5 received the XMITDATA signal from FIG. 12A. A suitable transmitter is a 303.825 MHz Transmitter Module AT1004 of RF Monolithics, Inc., Dallas, Tex. This is a transmitter in compliance with Part 15 of the FCC regulations. The XMITDATA line from FIG. 12A is connected in FIG. 12D to the DATA port of the transmitter, at pin 1. Supply voltage is fed through pin 6, while pins 2, 3 and 5 are grounded. The chip's RFOUT port, pin 4, is connected to a suitable antenna ANT1, such as chip antenna LDA40 of Murata Co., Tokyo, Japan.

A power supply for the remote control unit is shown in FIG. 12C. The power supply makes use of a MAX856 DC—DC Converter manufactured by Maxim Integrated Products, Sunnyvale, Calif. The converter is basically hooked up and operated according to the published instructions of the manufacturer. BAT1 may be in the range 2.5–6 volts, suitable for providing +V1 for driving the PIC microcontroller U1 and the HCS encoder U2. The voltage +V2 for driving the transmitter is taken from the OUT port of the converter, through a Schottky diode 1N5817. Port LBO provides a low battery indicator. Signal PWRSHGN is supplied from port RA4 of the micro-controller to turn the converter on and off, in order that power may be conserved when it is not needed. The power shutdown signal line PWRSHGN has a status light LED2 connected to it, to make visible whether it is energized or not. As shown in FIG. 12A, the V1 supply has decoupling capacitors C3 and C4 connected to it, in order to drain-off ripple or other disturbances.

MAIN CONTROL DETAIL

The main control unit first receives the data from the remote control unit and decodes it in a decoder chip. A micro-controller then reads the output of the decoder and sends a forward or reverse command to the motor operating the parking brake.

Figure 13A:
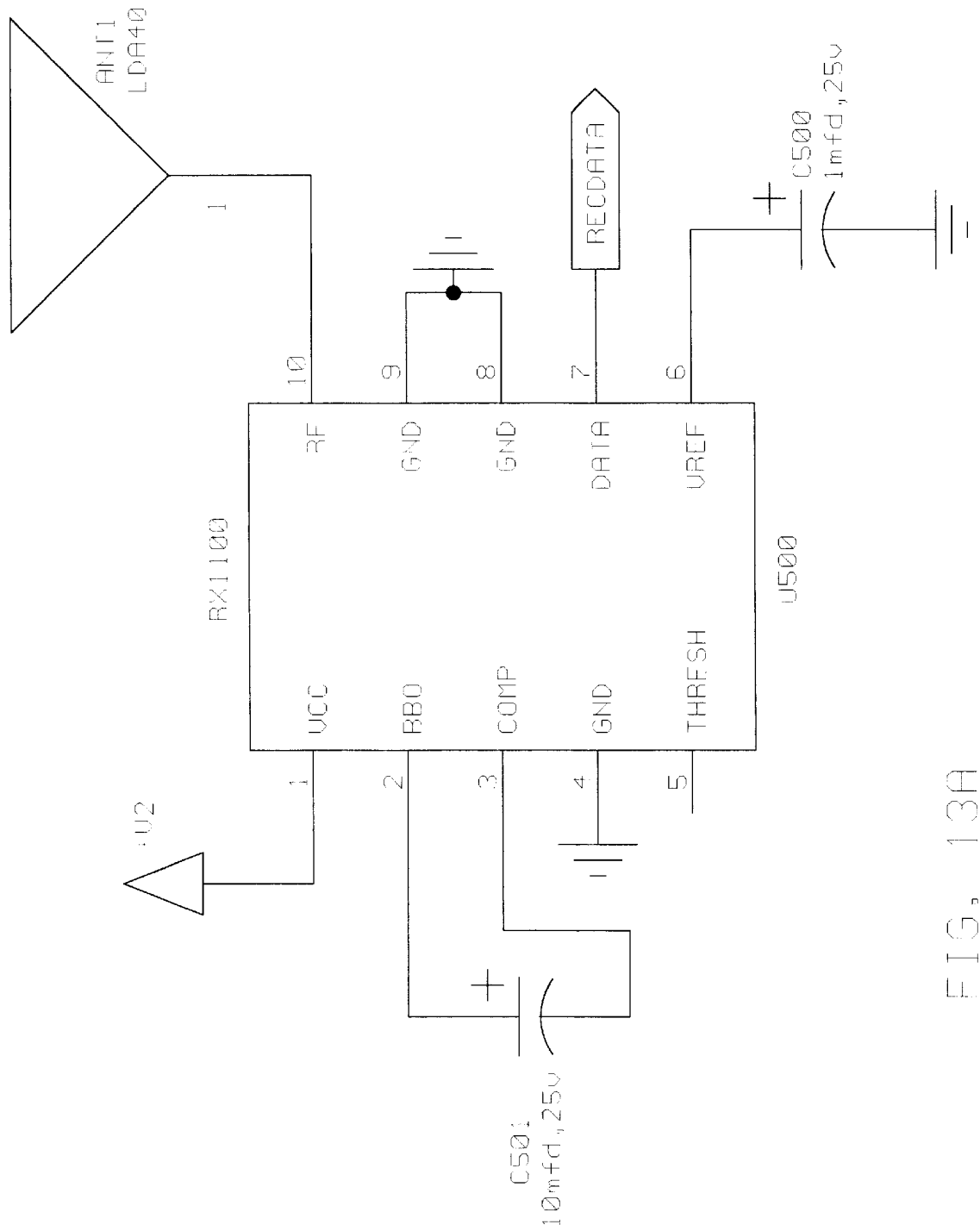

Referring first to FIG. 13A, receiver U500 receives the transmitted signal from transmitter U5 of FIG. 12D through chip antenna ANT, also an LDA40, connected to port RF at pin 10.

A suitable receiver is an IC, such as the UHF chip identified as the ASH (amplifier-sequenced hybrid) Receiver RX1100 manufactured by RF Monolithics, Inc., Dallas, Tex. The output of the receiver is at the DATA port, pin 7, in the form of a TTL data word RECDATA that is Pulse Width Modulated. A logic 0 is created when the pulse width is twice as long as a logic 1 pulse.

Referring next to FIG. 13B, plug J2 is analogous to plug J2 in FIG. 12A. Pin 2 receives the signal RECDATA from the receiver of FIG. 13a. As indicated in FIG. 13B, pin 1 of J2 can supply power to the receiver, pin 3 ground, and pin 4 is for a receiver enable signal RECEN, if such is desired.

With further reference to the bottom of FIG. 13B, the input from the receiver goes from pin 2 on J2 to pin 2 on header JP1, where it can be sent in either of two directions. If pin 2 on JP1 is jumpered to pin 1 of JP1, the data from the receiver is sent to pin 13, port RC2 on micro-controller U1. This is for the case that software for decoding the data is obtained from Microchip Technology Inc., Chandler, Ariz., for allowing the micro-controller to decode the signal.

The microcontroller U1 of FIG. 13B is the same PIC16C73 used in the remote control unit. The chip receives the data from the receiver serially on port RC2 in the Pulse Width Capture Mode. Reference section 10.1, Capture Mode, in the PIC16C73 manual as published by Microchip. The capture event starts on the rising edge of the pulse.

Figure 13C:
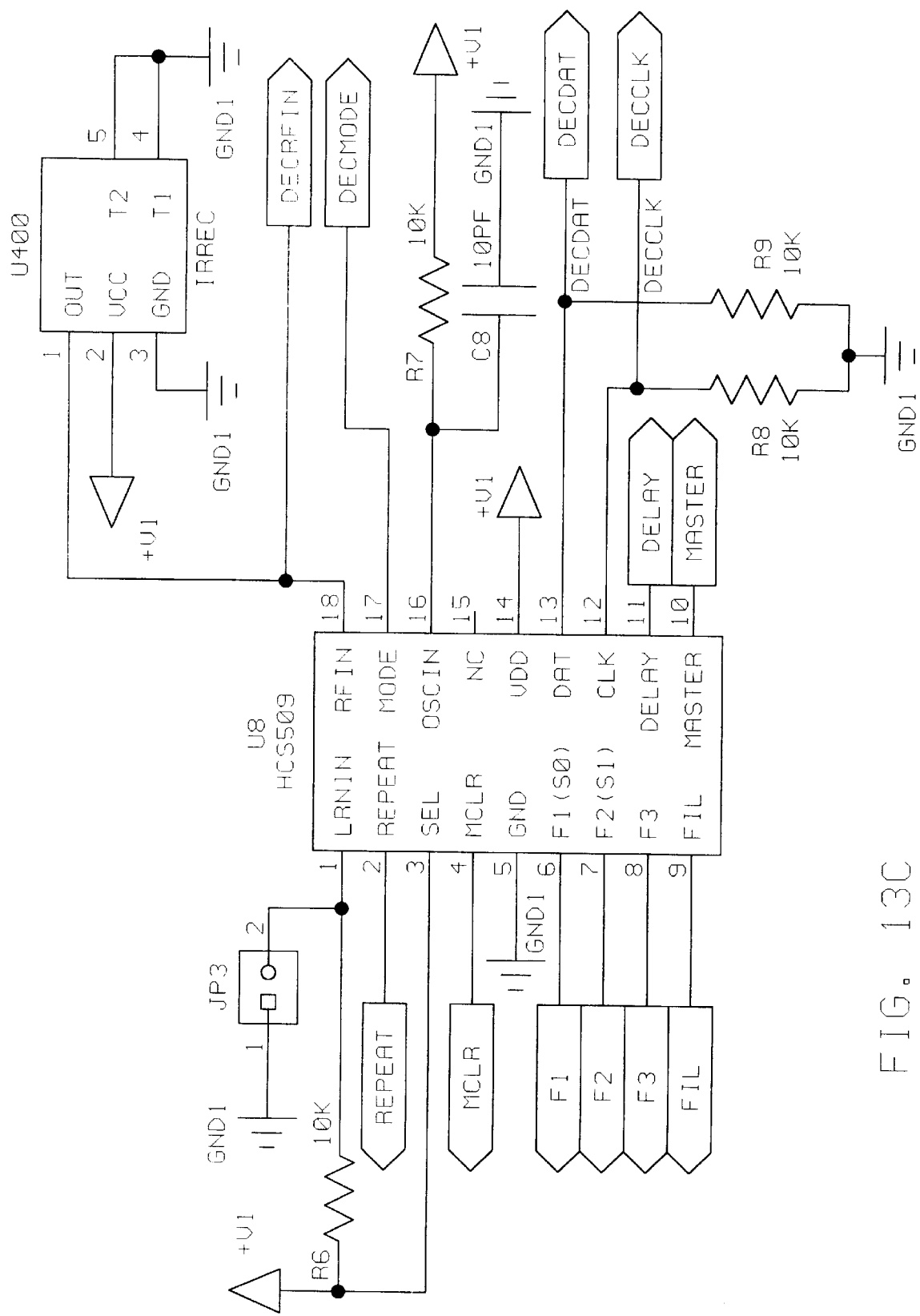

Alternatively, by jumpering pin 2 of JP1 to pin 3, the incoming data may be sent as signal DECRFIN to the decoding chip U8 of FIG. 13C. Referring to FIG. 13C, the signal DECRFIN is introduced into port RFIN at pin 18 of chip U8. U8 is, for example, the HCS509 KeeLoq Code Hopping Decoder manufactured by Microchip Technology Inc., Chandler, Ariz. U8 has previously learned the particular encoder (U2 of FIG. 12B) being used with it, by operation with the LRNIN port of U8 low for 10 seconds, by jumpering of pins 1 and 2 of header JP3. In U8, the incoming RF signal is decoded using hardware, rather than software in the micro-controller.

Alternatively, infrared receiver U400, IRREC, may receive a transmission directly from the IR transmitter LEDS of FIG. 12B, which signal is fed from the OUT port of U400 into the RFIN port of U8 at pin 18. U400 may, for example, be a chip LT1060 of Litton Industries, Sunnyvale, Calif.

As used in an example of the invention, upon receipt of a valid, transmitted word, the MASTER port at pin 10 goes high, and a digital 3-bit signal at ports F1 to F3 on U8 corresponding to the particular command input at the keypad of the remote control unit.

Referring now back to FIG. 13B, one will note that the leads to pins 2 to 5 of micro-controller U1 have been labeled F1, F2, F3, and MASTER, respectively. This indicates that there are printed circuit leads (not shown) short circuiting pins 2 to 5 of the micro, respectively, to pins 6–8 and 10 of the decoder. This brings a parallel, 3-bit signal corresponding to a particular keypad command into the micro-controller U8.

Figure 9:
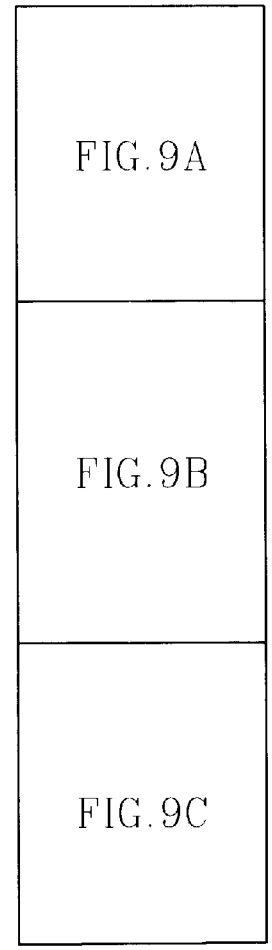
FIG. 9 shows the relationship of FIGS. 9A and 9B to one another.
Figure 9A:
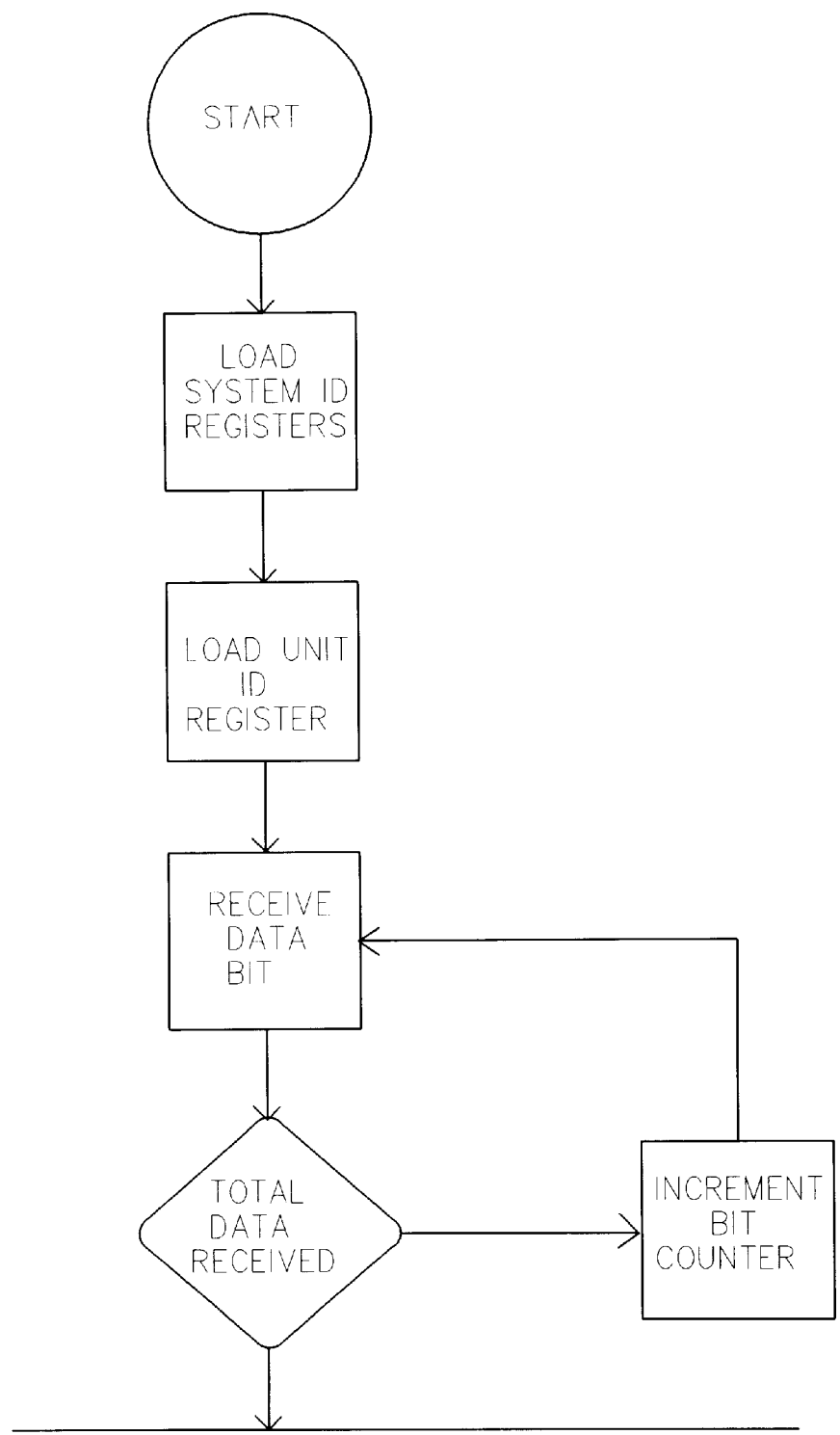
FIGS. 9A, 9B and 9C show a program flowchart for the main control unit of a second electrical system of the invention.
Figure 9B:
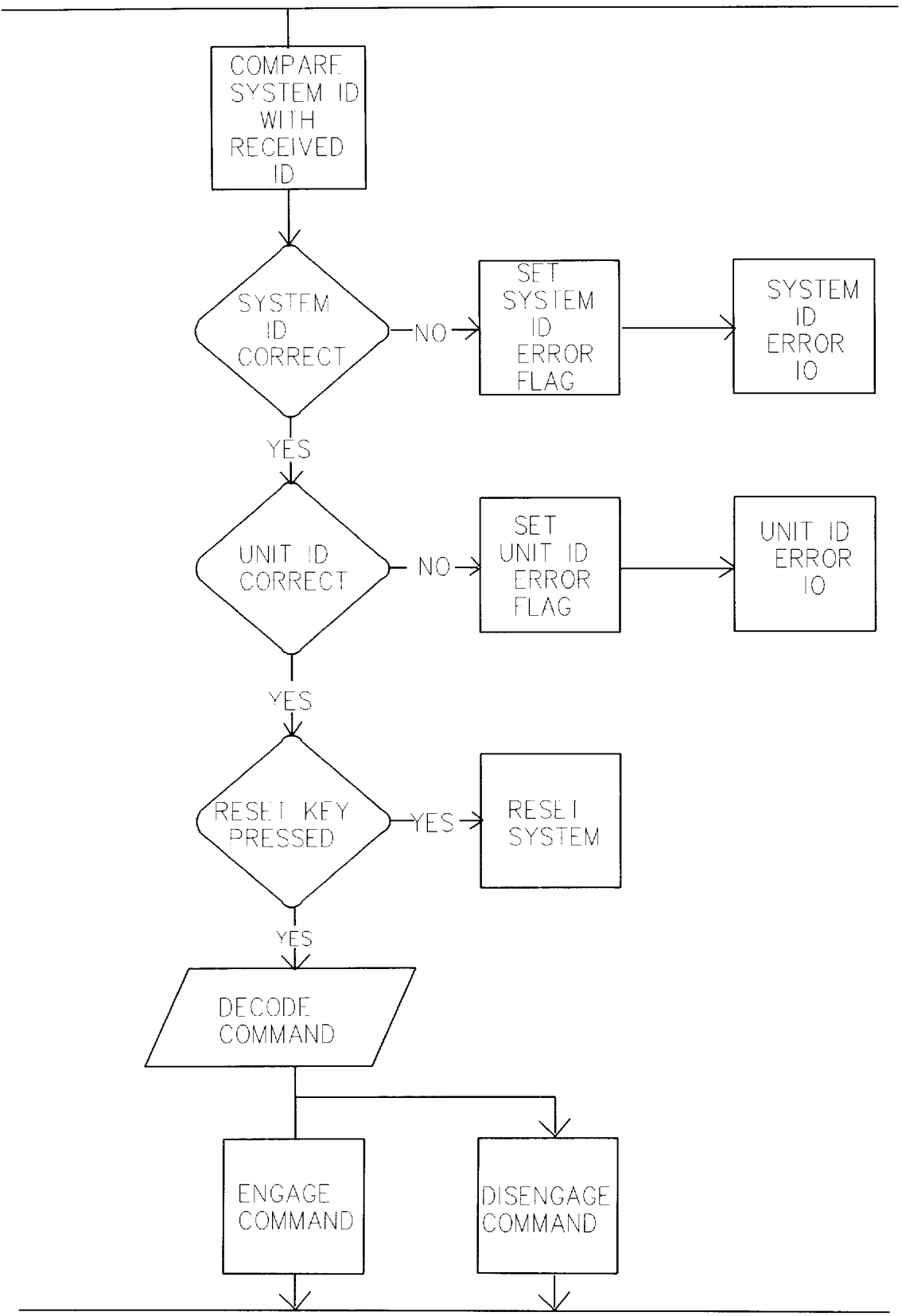
Figure 9C:
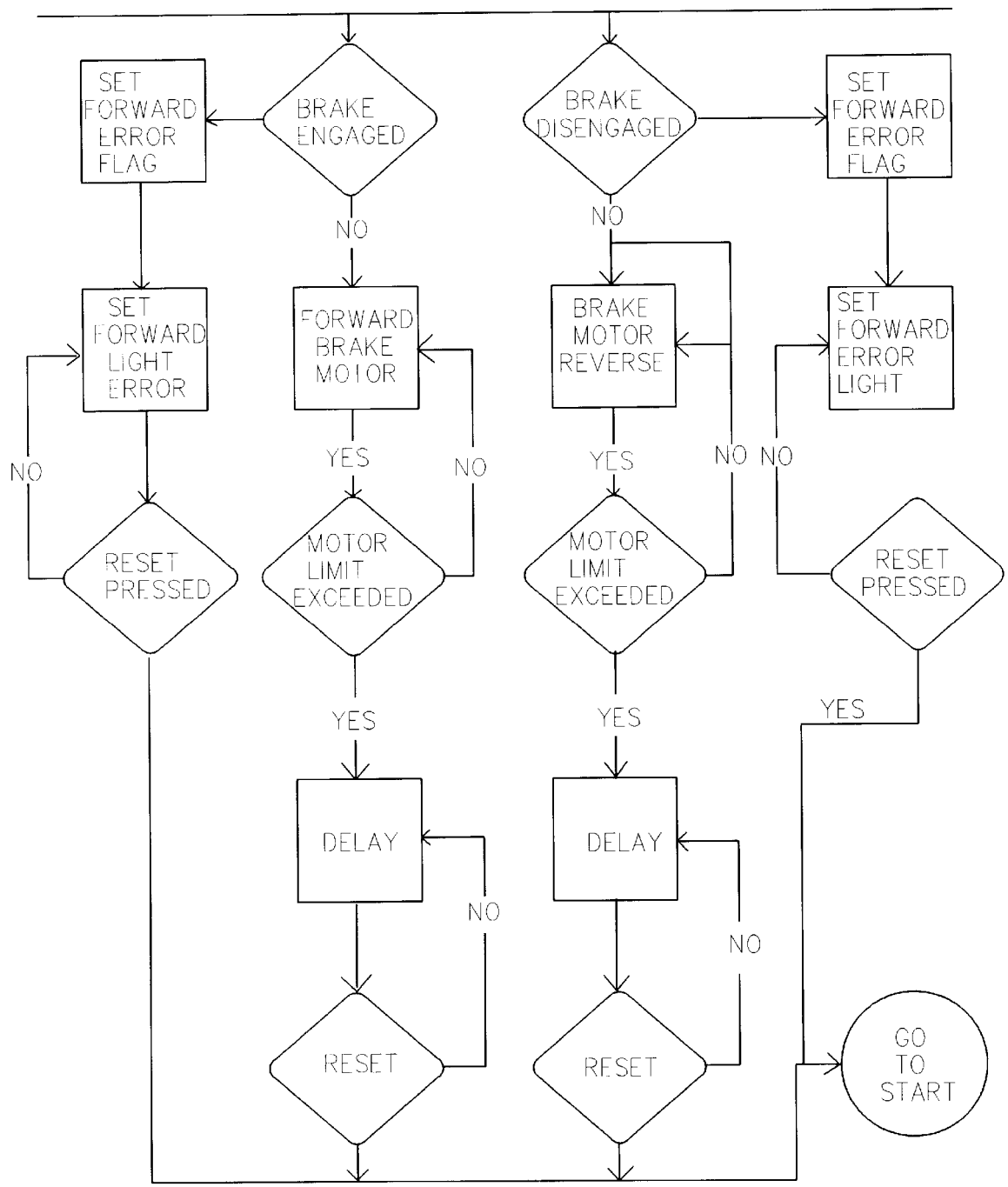

Suitable software, operating basically according to the principles set forth in FIG. 9, in the micro-controller U8 or in additional ROM (not shown) processes the information at micro-controller pins 2–4 and outputs the signals PWRSHN, DISABLE, REVCMD, FWDCMD, and MOTON, for controlling motor 1 of FIG. 2. As indicated in FIG. 13B, ports RB0 to RB6, pins 21–27, are involved in the control of the motor. These ports are connected to header J1 of FIG. 13B. The signals passing through J1 go through the poles which are physically directly opposite; thus, pole 2 is connected to pole 1, pole 4 to pole 3, etc.

Figure 13F:
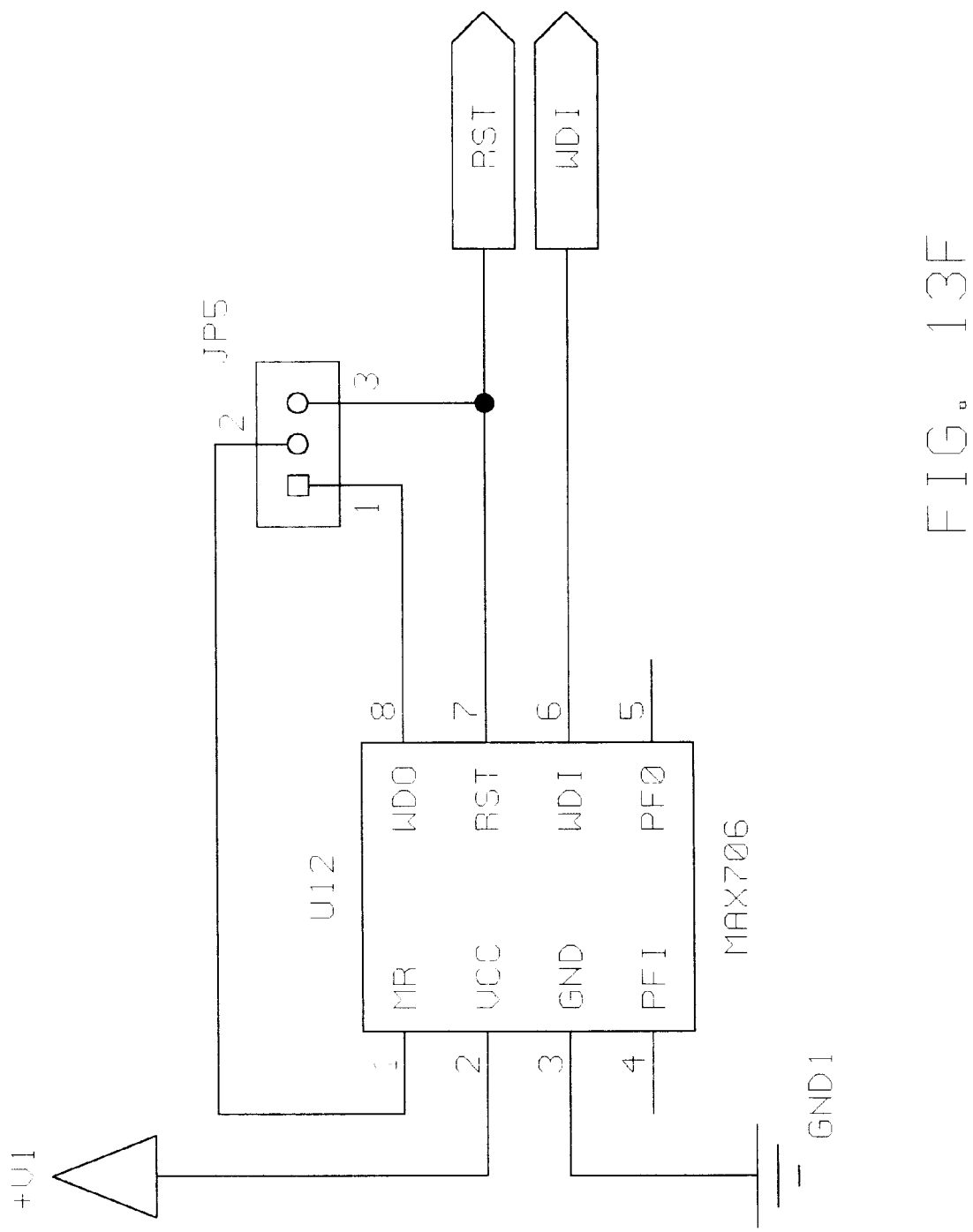

In an example of how a command signal is acted on, such is initiated by PWRSHN going low. PWRSHN stands for "power shut down" and may be alternatively referred to herein as PWRSHDN OR PWRSHGN. When PWRSHN goes low, the power V3 to the limit switch system in FIG. 13D is turned on. This happens due to the hookup of the power supply for V3, as shown in FIG. 13F, to be discussed below.

Referring to FIG. 13D, whether the motor is at its forward limit or at its reverse limit is then determined. The sensors, such as magnetic sensors 15 in FIG. 2, or Hall effect switches, are connected across pins 5 and 6 of header J4. When the motor has moved the block 5 of FIG. 2 to the forward or reverse limit, respectively, the sensor output FWDLIM_IN on pin 1 of header J4 or REVLIM_IN on pin 2 will go low, to turn-on the corresponding LED in the optical isolator.

The limit switches are read through optical isolators U9 and U10. Isolator U11 services a disable switch, for providing a signal to turn everything off, through micro-controller control, if desired. Corresponding signals FWDLIM, REVLIM, and DISABLE are sent from the isolator outputs to the micro-controller pins 24–26. Thus, these switches are scanned by the micro-controller. The switch limit signals, FWDLIM and REVLIM, are low when the extreme position of the motor has been accomplished. The microcontroller, under software control, will shut the power and direction circuitry off, for instance if FWDLIM is low, and a command to move forward is received.

If neither magnet and sensor is aligned, if FWDLIM is low and a reverse command is received, or if REVLIM is low and move forward is received, the micro-controller issues a low MOTON. The motor will move the brake cable, in the direction commanded from the remote control unit, until alignment of the pertinent magnet and sensor is achieved. The FWDLIM or REVLIM is pulled low. The limit condition is connected to a port on the microcontroller. For example, when REVLIM goes low, the motor has attained the maximum reverse direction. The micro-controller will poll the input and when it senses that REVLIM has gone low, the motor will be turned off by allowing MOTON to go high.

FIG. 13E shows the motor drive system. Two alternatives to control the motor are provided, based upon electrical demands of the motor. Transistor Q1 can supply power to the motor, or relay K2 can be switched to power the relay. Selection of transistor or relay is done by corresponding jumpering at header J7. Direction of the motor is controlled by relay K1. An active-low FWDCMD from the micro-controller activates K1. Otherwise, the motor is normally connected for movement in reverse direction. It will thus be noted that the REVCMD signal of FIG. 13B is not used in this embodiment of the invention; REVCMD is, however, provided in FIG. 13B, should it be desired to fashion an embodiment in which REVCMD would be affirmatively used. Alternately to K1, a solid state bridge power MOSFET may be used.

A low MOTON (Motor On command) data line from the micro-controller energizes the motor. The sequence followed is selecting the direction first and then MOTON is made active to energize the motor. This allows best relay contact reliability.

Q1 allows current limiting to the motor. The total load current flows through R21 (0.5 ohm). When the voltage drop approaches approximately 0.6 volts, Q2 will turn on, forcing the gate of Q1 high, thus Q1 is turned off (Motor current is turned off).

The leads –MOT and +MOT of FIG. 13E are connected to the corresponding leads in the bottom right of FIG. 13D. The motor itself is connected to pins 1 and 2 of header J6 in FIG. 13D. The vehicle 12 V battery is connected to header J5 in the lower left of FIG. 13D, and the flags labeled +12 V and GND1 supply that voltage throughout the system, for instance to the power supplies of FIGS. 13G–13I and to the motor drive in FIG. 13E.

FIG. 13F shows a reset device for providing the reset signal RST to the micro-controller of FIG. 13B. The reset device is based on a MAX706 chip manufactured by Maxim Integrated Products, Sunnyvale, Calif. The device may operate on the basis of watching for events, such as low voltage, requiring a reset signal, using the watch dog input signal and a jumpering of pins 1 and 2 of header JP5. Alternatively, reset may be initiated by a pushbutton (not shown) closure of pins 2 and 3 of JP5.

Three switching power supplies are used for the main control unit. Each uses a MAX761 DC—DC Converter manufactured by Maxim Integrated Products, Sunnyvale, Calif. The converters are basically hooked up and operated according to the published instructions of the manufacturer. One is a supply that regulates 12 VDC to 5 VDC, V1, for the micro-controller, one for the receiver voltage V2, and one regulates the 12 VDC to 5, V3, for the limit switches. The limit switches, in particular, are external to the box 16 of FIG. 1, and are, therefore, most likely to get abused. The supplies are short circuit protected, with thermistor-controlled shutdown.

Figure 13G:
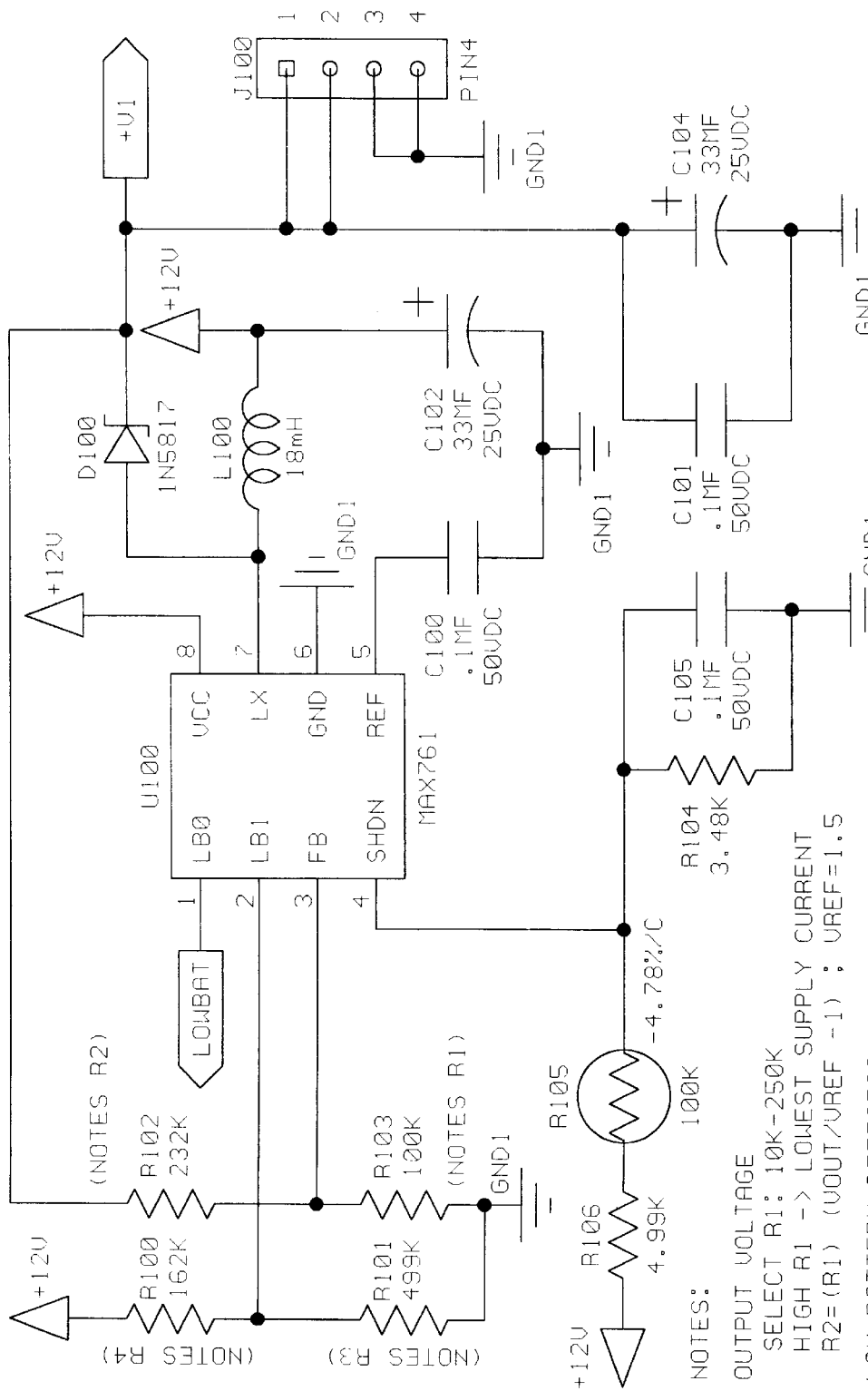

With reference to FIG. 13G, the main micro-controller and accessories are powered by the U100-based, MAX761, DC/DC switching supply. The supply converts the 12 volt supply down to 5 volts for the logic and microcontroller. The thermistor R105 is provided to shut the power down in the event of high temperatures (due to a failed component).

Figure 13H:
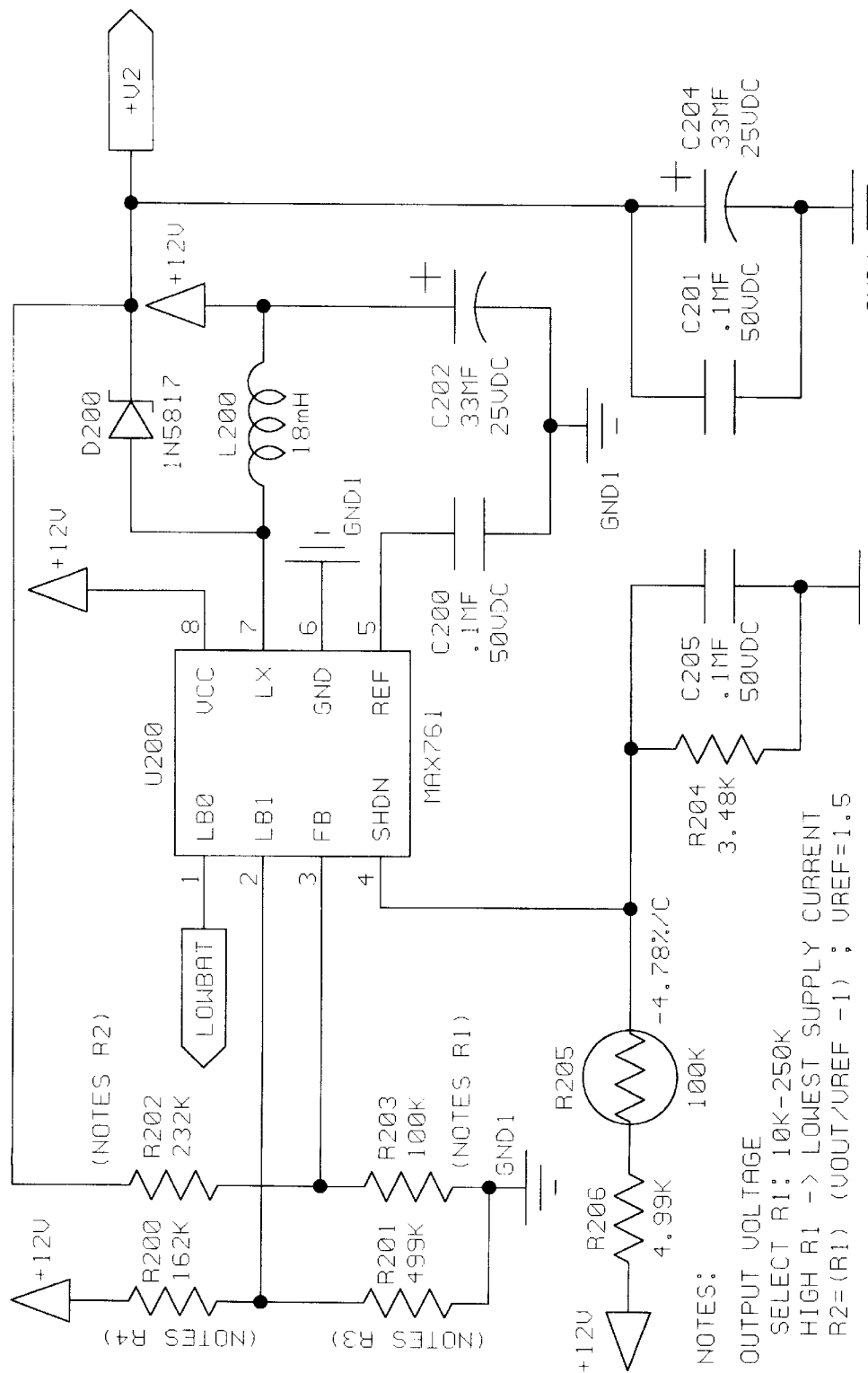
Figure 13I:
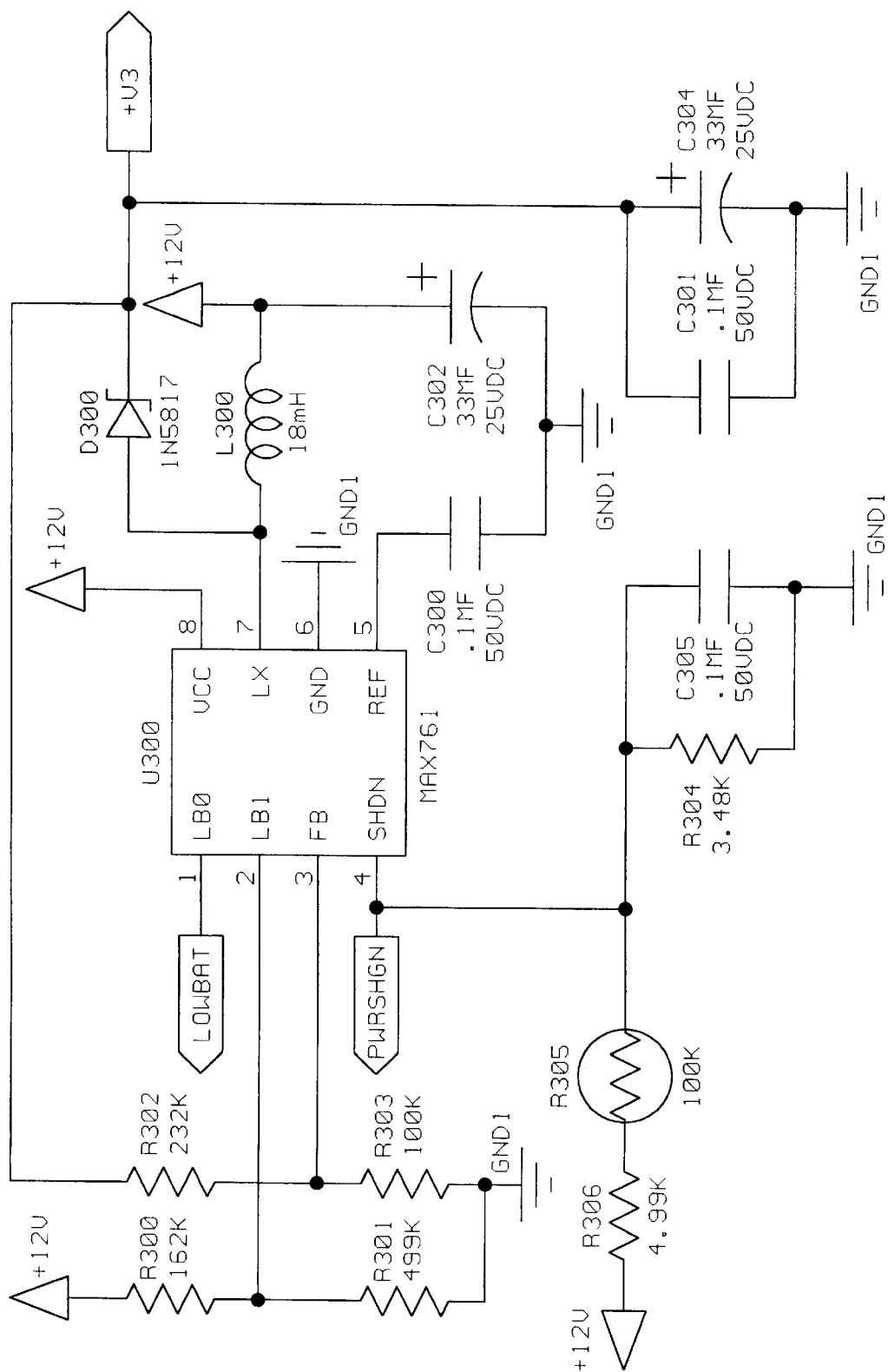

The receiver and limit switches are powered by the U200 and U300 chips of FIGS. 13H and 13I. These are also DC/DC switching supplies based on the MAX761 chip and likewise are short circuit protected. Particularly in the case of the limit switches, since the power is exiting the main unit housing to external sensors, this supply should be isolated from the main supply. As shown in FIG. 13I, the limit switch power supply is controlled from the micro-controller, by the PWRSHGN signal.

OPERATING PROCEDURES

In contrast to the case in ELECTRICAL SYSTEM 1, a Unit ID and a System ID are not needed when encoders and decoders are used which are uniquely paired to one another, having gone through an initialization process wherein they learn one another.

According to one operating procedure for ELECTRICAL SYSTEM 2, a keypad having one key labeled "lock" or with a symbolic equivalent of "lock" and one key labeled "unlock" or with its symbolic equivalent would be used. This would provide effective protection, as long as the thief did not first steal a remote control unit already having a learned relationship to the encoder in the main control unit.

An operating procedure offering additional security uses a numbered keypad, such as that shown in FIG. 1. Pressing a preselected one of the keys is recognized by the software in the micro-controller as requiring issue and transmission of a lock command. Alternatively, the code of the key itself might be transmitted to the main control unit and software in the main micro-controller would recognize that code as requiring issue of the lock command. In the case of unlocking, a PIN number of four keystrokes is required, this adding additional security against the case in which a thief might obtain a learned encoder. The micro-controller software in the remote control unit issues an unlock command only if the correct PIN number is received. If three incorrect PIN numbers are made in a row, the software refuses to consider any more PIN numbers, unless the micro-controller is reset by the owner following technical instructions or by a technician. As in the case of locking, the PIN number may also be sent first to the micro-controller of the main control unit, before being checked for validity.

ELECTRICAL SYSTEM 3

Encoding/decoding encrypter systems, such as the HCS chips of Microchip used in ELECTRICAL SYSTEM 2 involve paired encoders and decoders that have learned one another, so that only a learned encoder can communicate with a particular decoder. This permits the opportunity for simplifying parts, or all, of ELECTRICAL SYSTEM 2.

Figure 14:
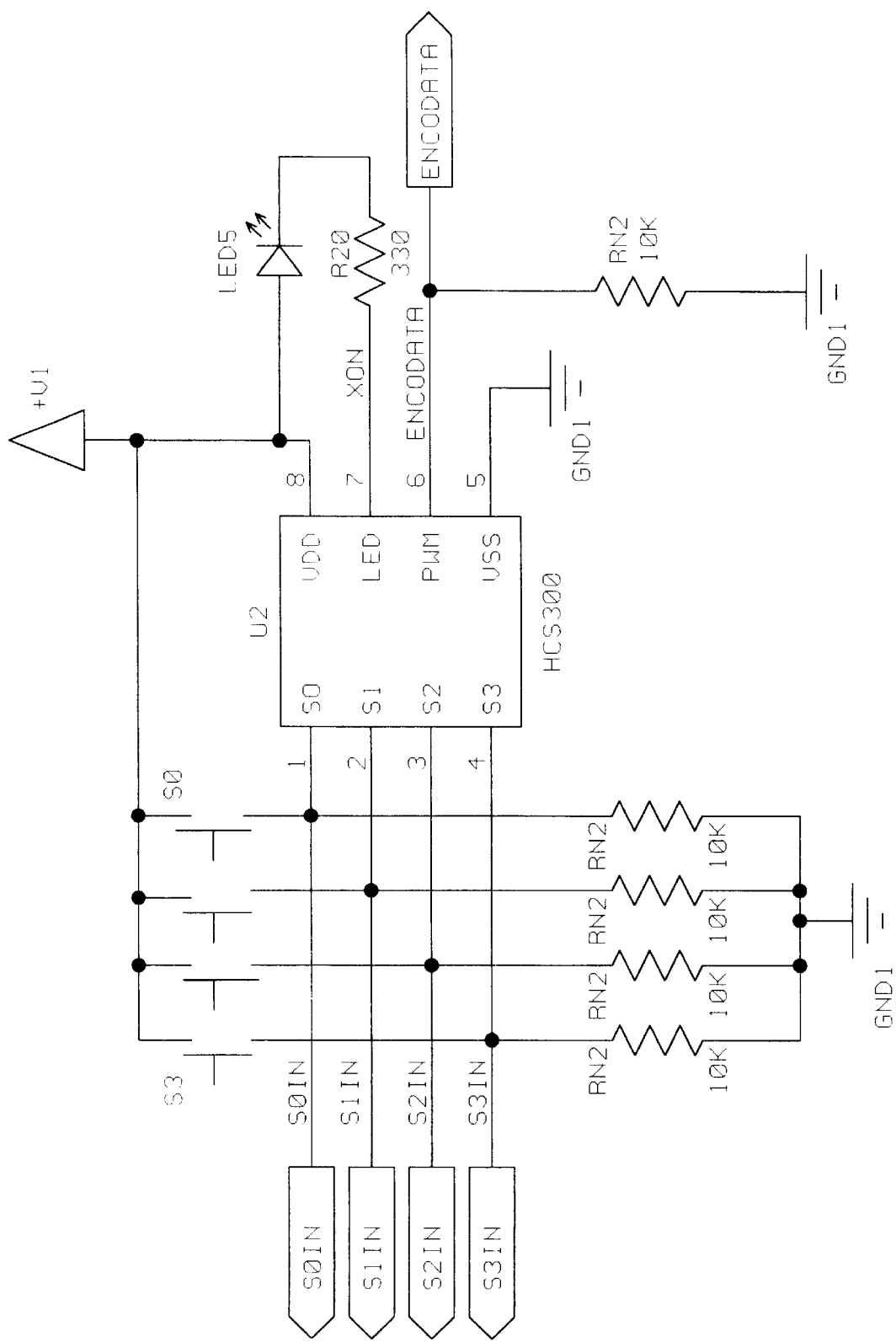
FIG. 14 is a detailed schematic diagram of the remote control unit of a third electrical system of the invention.

With reference to FIG. 14, there is shown a remote control unit for ELECTRICAL SYSTEM 3, which eliminates the micro-controller in the remote control unit of ELECTRICAL SYSTEM 2. In FIG. 14, a four-key keypad S0–S3 is used. The command for motor forward, for instance, might be the pressing of key S0. That would create a high signal S0IN at pin 1 of the encoder chip U2. The encoded information is then presented for transmission by an RF transmitter on pin 6 or by an infrared transmitter, LED5, on pin 7. The transmitted word may then be decoded using the decoder of FIG. 13C to present the command as a 3-bit binary number on ports F1 to F3 of U8, which can lead to motor actuation based on the rest of the components of ELECTRICAL SYSTEM 2. Alternatively, the 3-bit number can be retained by latches (not shown) and the 3-bit number processed into the corresponding motor movement by a logic system such as that shown in FIG. 15. In FIG. 15, one of the 3 bits provides REVCMD, one for FWDCMD, and one for DISABLE. REVLIM and FWDLIM come from FIG. 13E.

ELECTRICAL SYSTEM 4

The circuitry can also be miniaturized in a PLD (a programmable logic device chip), such as a PAL (programmable array logic chip) or a PLA (programmable logic array chip). For information on these, see THE ART OF ELECTRONICS, Second Edition, by Horowitz and Hill, Cambridge University Press, New York 1989.

There follows, now, the claims. It is to be understood that the above are preferred modes of carrying out the invention and that various changes and alterations can be made without departing from the spirit and broader aspects of the invention as defined by the claims set forth below and by the range of equivalency allowed by law.

What is claimed is:

1. A vehicle antitheft device, comprising an actuating means including a motor and controls connected with the motor, the controls containing two limit states of the motor in the form of a forward motor position and a reverse motor position, the controls issuing commands to move the motor between the two limit states, and means for connecting the motor of the actuating means to a parking brake such that a locked state of the brake corresponds to one of the limit states and an unlocked state of the brake corresponds to the other of the limit states.

2. A device as claimed in claim 1, the controls comprising a remote control unit and a main control unit.

3. A device as claimed in claim 2, the remote control unit comprising a keypad and means for transmitting data, including a keypad command, to the main control unit.

4. A device as claimed in claim 2, the main control unit comprising a receiver and means for controlled processing of data received by the receiver into input to a system for controlling the motor.

5. A device as claimed in claim 2, the controls including a micro-controller.

6. A device as claimed in claim 5, the controls including learned encoder/decoder pairs, with communication between remote control unit and main control unit having varying digital words.

7. A device as claimed in claim 2, the controls including learned encoder/decoder pairs, with communication between remote control unit and main control unit having varying digital words.

8. A device as claimed in claim 7, the controls further including means requiring introduction of correct PIN numbers, in order to obtain motor movement.

9. A device as claimed in claim 1, the brake remaining in the locked state as long as the motor is in the corresponding limit state.

10. A device as claimed in claim 1, for combination with a primary parking brake operating mechanism for operating the parking brake in unison with, or independently of, the vehicle antitheft device, release of the primary mechanism not releasing the brake, if the motor is in its limit state corresponding to the locked state of the brake.

11. A device as claimed in claim 1, the controls including position sensors corresponding to the limit states.

12. A device as claimed in claim 11, the controls further providing a time limit on motor movement.

13. In a vehicle having a parking brake and a primary parking brake operating mechanism linked by cable to the brake and operable between a lock state holding the brake in a locked state and a release state allowing the brake to be in a released state, the improvement in the form of a vehicle antitheft device comprising a secondary parking brake operating mechanism which is linked to the brake and operable between a lock state holding the brake in a locked state and a release state allowing the brake to be in a released state, and a security control on the operation of the secondary mechanism, the secondary mechanism being independent of the primary mechanism, in that, when the brake is in the locked state and both mechanisms are in their lock states, operation of the primary mechanism into the release state does not cause release of the brake, as long as the secondary mechanism remains in the lock state.

14. A device as claimed in claim 13, the security control comprising a remote control unit and a main control unit.

15. A device as claimed in claim 14, the remote control unit comprising a keypad and means for transmitting data, including a keypad command, to the main control unit.

16. A device as claimed in claim 14, the main control unit comprising a receiver and means for controlled processing of data received by the receiver into input to a system for controlling the secondary mechanism.

17. A device as claimed in claim 14, the security control including a micro-controller.

18. A device as claimed in claim 17, the security control including learned encoder/decoder pairs, with communication between remote control unit and main control unit having varying digital words.

19. A device as claimed in claim 14, the controls including learned encoder/decoder pairs, with communication between remote control unit and main control unit having varying digital words.

20. A vehicle parking brake operating method, comprising holding the brake in a locked state with two cable linkages, and releasing the brake from the locked state only with the release of both linkages, release of one of the linkages being under security control.

21. A method as claimed in claim 20, further comprising, for security control, transmitting and receiving a command, a unit ID, and a system ID.

22. A method as claimed in claim 20, further comprising, for security control, transmitting and receiving a varying digital word.

23. A vehicle antitheft device, comprising: a mechanical system means attachable to a vehicle parking brake, for setting and releasing the brake; and an electrical system means capable of causing the mechanical system means to set the brake from locations remote to the vehicle, the mechanical system means including a motor and linkage keeping the motor connected to the parking brake when and after the parking brake has been set.

24. In a vehicle having a parking brake and a primary parking brake operating mechanism linked to the brake and operable between a lock state holding the brake in a locked state and a release state allowing the brake to be in a released state, the improvement in the form of a vehicle antitheft device comprising a secondary parking brake operating mechanism which is linked to the brake and operable between a lock state holding the brake in a locked state and a release state allowing the brake to be in a released state, and a security control on the operation of the secondary mechanism, the secondary mechanism being independent of the primary mechanism, in that, when the brake is in the locked state and both mechanisms are in their lock states, operation of the primary mechanism into the release state does not cause release of the brake, as long as the secondary mechanism remains in the lock state, and in that the secondary mechanism can be operated to set the brake independently of the primary mechanism.

25. A device as claimed in claim 24, the security control comprising a remote control unit and a main control unit, the remote control unit comprising a keypad and means for transmitting data, including a keypad command, to the main control unit, the main control unit comprising a receiver and means for controlled processing of data received by the receiver into input to a system for controlling the motor.

26. A device as claimed in claim 25, the security control precluding setting of the brake by the secondary mechanism at speeds above a limit speed.

* * * * *